(12) United States Patent
Agrawal

(10) Patent No.: US 9,345,111 B2
(45) Date of Patent: May 17, 2016

(54) MANAGING STREETLIGHTS

(71) Applicant: Cimcon Lighting, Inc., Westford, MA (US)

(72) Inventor: Anil Agrawal, Westford, MA (US)

(73) Assignee: CIMCON Lighting, Inc., Billerica, MA (US)

( * ) Notice: Subject to any disclaimer, the term of this patent is extended or adjusted under 35 U.S.C. 154(b) by 44 days.

(21) Appl. No.: 14/215,411

(22) Filed: Mar. 17, 2014

(65) Prior Publication Data

US 2014/0197745 A1 Jul. 17, 2014

Related U.S. Application Data

(63) Continuation of application No. 13/744,290, filed on Jan. 17, 2013, now Pat. No. 8,674,629.

(60) Provisional application No. 61/588,569, filed on Jan. 19, 2012, provisional application No. 61/587,568, (Continued)

(51) Int. Cl.
*H05B 37/00* (2006.01)
*H05B 37/02* (2006.01)
(Continued)

(52) U.S. Cl.
CPC ............ *H05B 37/0227* (2013.01); *F21V 19/00* (2013.01); *G06F 17/30241* (2013.01); (Continued)

(58) Field of Classification Search
CPC . G06Q 30/0205; G06F 3/0481; G06F 3/0482; G06F 17/00; G06F 17/30241; G06F 17/30554; G06F 11/2002; G06F 12/00; G06F 17/30; G06F 19/32; G06F 3/013; G06F 3/033; G06F 3/041; G06F 3/048

USPC ......... 315/88, 89, 90, 93, 120, 119, 121, 129, 315/130, 131, 132, 133, 185 R, 192, 292, 315/293, 294, 295, 291, 297, 299, 300, 301, 315/302, 307, 312, 360, 361

See application file for complete search history.

(56) References Cited

U.S. PATENT DOCUMENTS 3,187,294 A 6/1965 Hallam et al.
3,584,228 A 6/1971 Kenyon et al.
(Continued)

FOREIGN PATENT DOCUMENTS

JP 2009-140855 6/2009
WO WO 2011/146695 11/2011

OTHER PUBLICATIONS

U.S. Appl. No. 14/046,422, filed Oct. 4, 2013, Streetlight Controllers.
(Continued)

*Primary Examiner* — Douglas W Owens
*Assistant Examiner* — Jianzi Chen
(74) *Attorney, Agent, or Firm* — Fish & Richardson P.C.

(57) ABSTRACT

This disclosure describes systems and techniques for managing streetlights. The subject matter included in this document is embodied in a method that includes receiving, at a computing device, information representative of a location and status of a streetlight included in a network of streetlights. The method also includes presenting a representation of the streetlight in a graphical user-interface in accordance with the received location and status information, and receiving information representing a selection of the streetlight for inclusion in a group of streetlights from the network. The method further includes initiating delivery of one or more control signals to the group of streetlights.

20 Claims, 57 Drawing Sheets

Related U.S. Application Data filed on Jan. 17, 2012, provisional application No. 61/588,572, filed on Jan. 19, 2012, provisional application No. 61/587,567, filed on Jan. 17, 2012, provisional application No. 61/587,563, filed on Jan. 17, 2012.

(51) Int. Cl.
  *H05B 37/03* (2006.01)
  *F21V 19/00* (2006.01)
  *G06F 17/30* (2006.01)

(52) U.S. Cl.
  CPC ............... *H05B37/00* (2013.01); *H05B 37/02* (2013.01); *H05B 37/0272* (2013.01); *H05B 37/03* (2013.01); *H05B 37/034* (2013.01); *Y02B 20/72* (2013.01)

(56) References Cited

U.S. PATENT DOCUMENTS

| | | | |
|---|---|---|---|
| 4,477,143 A | 10/1984 | Taylor | |
| 4,580,099 A | 4/1986 | Zetti | |
| 5,095,502 A | 3/1992 | Finzel | |
| 5,479,159 A | 12/1995 | Kelly et al. | |
| 5,593,318 A | 1/1997 | Bilson et al. | |
| 6,452,339 B1 | 9/2002 | Morrissey et al. | |
| 7,333,903 B2 | 2/2008 | Walters et al. | |
| 7,529,594 B2 | 5/2009 | Walters et al. | |
| 7,546,167 B2 | 6/2009 | Walters et al. | |
| 7,546,168 B2 | 6/2009 | Walters et al. | |
| 7,634,598 B2 | 12/2009 | Kim et al. | |
| 7,761,260 B2 | 7/2010 | Walters et al. | |
| 7,825,793 B1 | 11/2010 | Spillman et al. | |
| 7,911,359 B2 | 3/2011 | Walters et al. | |
| 8,010,319 B2 | 8/2011 | Walters et al. | |
| 8,140,276 B2 | 3/2012 | Walters et al. | |
| 8,235,564 B2 | 8/2012 | Jeong | |
| 8,260,575 B2 | 9/2012 | Walters et al. | |
| 8,588,942 B2 | 11/2013 | Agrawal | |
| 8,674,629 B2 | 3/2014 | Agrawal | |
| 2003/0197723 A1 | 10/2003 | Young et al. | |
| 2005/0248299 A1 | 11/2005 | Chemel et al. | |
| 2007/0085701 A1 | 4/2007 | Walters et al. | |
| 2008/0175216 A1 | 7/2008 | Nasco | |
| 2009/0003931 A1 | 1/2009 | Christensen et al. | |
| 2009/0050785 A1 | 2/2009 | Flaherty | |
| 2010/0287081 A1 | 11/2010 | Walters et al. | |
| 2011/0194856 A1 | 8/2011 | Sabarwal et al. | |
| 2011/0249430 A1 | 10/2011 | Stamatatos et al. | |
| 2012/0062123 A1 | 3/2012 | Jarrell et al. | |
| 2013/0038221 A1 | 2/2013 | Cleland et al. | |
| 2013/0181609 A1 | 7/2013 | Agrawal | |
| 2013/0181614 A1 | 7/2013 | Agrawal | |
| 2013/0181636 A1 | 7/2013 | Agrawal | |

OTHER PUBLICATIONS

U.S. Appl. No. 13/744,304, filed Jan. 17, 2013, Fault Management for Streetlights.
International Search Report and Written Opinion, PCT/US2013/021957, Apr. 25, 2013, 11 pages.

CSI JOHN SMITH
HOME > ALARMS

MIMICS STATUS TRENDS REPORTS ALARMS DASHBOARD USERS SLCs CONTROLS SETTINGS MAINTENANCE ASSETS PCBPLC LOGOUT HELP

| ☐ DATE - TIME | SLC NAME | CHANNEL | CHANNEL VALUE | ALARM TYPE | PRIORITY | ACK | ACK BY | TREND | LIVE TREND |
|---|---|---|---|---|---|---|---|---|---|
| ☐ 7/18/2011 1:56:10 AM | SLC 1 | MODE | 0 | OUTER LOW | NORMAL | ☒ | | ☒ | ☒ |
| ☐ 6/25/2011 7:29:10 PM | SLC 1 | COMMUNICATION | OFF | ABNORMAL | NORMAL | ☒ | | ☒ | ☒ |
| ☐ 6/25/2011 7:29:10 PM | SLC 1 | VOLTAGE | 23 | LOW LOW | NORMAL | ☒ | | ☒ | ☒ |
| ☐ 6/25/2011 7:29:10 PM | SLC 1 | CURRENT | 5 | LOW LOW | NORMAL | ✓ | JSMITH | ☒ | ☒ |
| ☐ 6/25/2011 7:29:10 PM | SLC 1 | KILOWATT | 6 | OUTER LOW | NORMAL | ☒ | | ☒ | ☒ |
| ☐ 6/25/2011 7:29:10 PM | SLC 1 | CUMULATIVE KWH | 122 | HIGH | NORMAL | ☒ | | ☒ | ☒ |
| ☐ 6/25/2011 7:29:10 PM | SLC 1 | BURN HOURS | 7 | LOW | LOW | ✓ | JSMITH | ☒ | ☒ |
| ☐ 6/25/2011 7:29:10 PM | SLC 1 | POWER FACTOR | 8 | LOW | CRITICAL | ☒ | JSMITH | ☒ | ☒ |
| ☐ 6/25/2011 7:29:10 PM | SLC 1 | LAMP STEADY CURR | 18 | LOW | CRITICAL | ☒ | | ☒ | ☒ |
| ☐ 6/25/2011 7:29:10 PM | SLC 1 | MODE | 0 | OUTER LOW | NORMAL | ☒ | | ☒ | ☒ |
| ☐ 6/25/2011 6:59:10 PM | SLC 1 | PHOTOCELL STATUS | ON | NORMAL | NORMAL | ☒ | | ☒ | ☒ |
| ☐ 6/25/2011 6:59:10 PM | SLC 1 | LAMP CYCLING | ON | NORMAL | NORMAL | ✓ | JSMITH | ☒ | ☒ |
| ☐ 6/25/2011 6:59:10 PM | SLC 1 | BALLAST | ON | NORMAL | NORMAL | ☒ | | ☒ | ☒ |
| ☐ 6/25/2011 6:59:10 PM | SLC 1 | PHOTOCELL FEEDBACK | OFF | NORMAL | NORMAL | ☒ | | ☒ | ☒ |
| ☐ 6/25/2011 6:59:10 PM | SLC 1 | LED CONDITION | ON | NORMAL | NORMAL | ☒ | | ☒ | ☒ |

ACKNOWLEDGE   PAGE SIZE 25   PAGE 3 OF 6  << < > >> 1

| | | | | | | | | | | | | | | | | | | | | | |
|---|---|---|---|---|---|---|---|---|---|---|---|---|---|---|---|---|---|---|---|---|---|
| 4 | SLC 4 | 09/20/2012 13:48:00 | CENTERLINE RD, VIRGIN ISLANDS NATIONAL PARK, ST JOHN USVI | ○ | ○ | ○ | ○ | ○ | ○ | ○ | ○ | ⊙ | ○ | ○ | ○ | 75 | 80 | 85 | 90 | 95 | 100 110 115 MANUAL |
| 5 | SLC 5 | 09/20/2012 15:20:00 | CENTERLINE RD, VIRGIN ISLANDS NATIONAL PARK, ST JOHN USVI | ○ | ○ | ○ | ○ | ○ | ○ | ○ | ○ | ○ | ○ | ○ | ○ | 75 | 80 | 85 | 90 | 95 | 100 110 115 ASTRO CLOCK |
| 6 | SLC 6 | 09/20/2012 15:20:00 | CENTERLINE RD, VIRGIN ISLANDS NATIONAL PARK, ST JOHN USVI | ○ | ○ | ○ | ○ | ○ | ○ | ○ | ○ | ○ | ○ | ○ | ○ | 75 | 80 | 85 | 90 | 95 | 100 110 115 ASTRO CLOCK |
| 7 | SLC 7 | 09/20/2012 15:20:00 | CENTERLINE RD, VIRGIN ISLANDS NATIONAL PARK, ST JOHN USVI | ○ | ○ | ○ | ○ | ○ | ○ | ○ | ○ | ○ | ○ | ○ | ○ | 75 | 80 | 85 | 90 | 95 | 100 110 115 ASTRO CLOCK |
| 8 | SLC 8 | 09/20/2012 15:20:00 | CENTERLINE RD, VIRGIN ISLANDS NATIONAL PARK, ST JOHN USVI | ○ | ○ | ○ | ○ | ○ | ○ | ○ | ○ | ○ | ○ | ○ | ○ | 75 | 80 | 85 | 90 | 95 | 100 110 115 ASTRO CLOCK |
| 9 | SLC 9 | 09/20/2012 15:20:00 | CENTERLINE RD, VIRGIN ISLANDS NATIONAL PARK, ST JOHN USVI | ○ | ○ | ○ | ○ | ○ | ○ | ○ | ○ | ○ | ○ | ○ | ○ | 75 | 80 | 85 | 90 | 95 | 100 110 115 ASTRO CLOCK |
| 10 | SLC 10 | 09/20/2012 15:20:00 | CENTERLINE RD, VIRGIN ISLANDS NATIONAL PARK, ST JOHN USVI | ○ | ○ | ○ | ○ | ○ | ○ | ○ | ○ | ○ | ○ | ○ | ○ | 75 | 80 | 85 | 90 | 95 | 100 110 115 ASTRO CLOCK |

FIG. 12 (Cont.)

| COMMAND | SEND DATE - TIME | DETAILS | GATEWAY NAME | STATUS | COMMAND NAME |
|---|---|---|---|---|---|
| ☐ SWITCH SLC ON/OFF COMMAND. | 12/27/2011 18:03:57 | ENTIRE GROUP | CENTER LINE RD | SENDING IN PROGRESS | 12/27 18:2 ON/OFF_CENTER LINE RD_F |
| ☐ PHOTOCELL COMMAND. | 12/27/2011 17:44:30 | SLC 5 | CENTER LINE RD | SENDING IN PROGRESS | 12/27 17:43 PSC_CENTER LINE RD_P |
| ☐ PHOTOCELL COMMAND. | 12/27/2011 17:44:30 | SLC 4 | CENTER LINE RD | SENDING IN PROGRESS | 12/27 17:43 PSC_CENTER LINE RD_P |
| ☐ PHOTOCELL COMMAND. | 12/27/2011 17:44:30 | SLC 3 | CENTER LINE RD | SENDING IN PROGRESS | 12/27 17:43 PSC_CENTER LINE RD_P |
| ☐ PHOTOCELL COMMAND. | 12/27/2011 17:44:30 | SLC 2 | CENTER LINE RD | SENDING IN PROGRESS | 12/27 17:43 PSC_CENTER LINE RD_P |
| ☐ PHOTOCELL COMMAND. | 12/27/2011 17:44:30 | SLC 1 | CENTER LINE RD | SENDING IN PROGRESS | 12/27 17:43 PSC_CENTER LINE RD_P |
| ☐ MODE CONFIGURATION COMMAND. | 12/27/2011 17:44:30 | SLC 5 | CENTER LINE RD | SENDING IN PROGRESS | 12/27 17:44 SM_PHOTOCELL |
| ☐ MODE CONFIGURATION COMMAND. | 12/27/2011 17:44:30 | SLC 4 | CENTER LINE RD | SENDING IN PROGRESS | 12/27 17:44 SM_PHOTOCELL |
| ☐ MODE CONFIGURATION COMMAND. | 12/27/2011 17:44:30 | SLC 3 | CENTER LINE RD | SENDING IN PROGRESS | 12/27 17:44 SM_PHOTOCELL |
| ☐ MODE CONFIGURATION COMMAND. | 12/27/2011 17:44:30 | SLC 2 | CENTER LINE RD | SENDING IN PROGRESS | 12/27 17:44 SM_PHOTOCELL |
| ☐ MODE CONFIGURATION COMMAND. | 12/27/2011 17:44:30 | SLC 1 | CENTER LINE RD | SENDING IN PROGRESS | 12/27 17:44 SM_PHOTOCELL |
| ☐ GATEWAY REGISTRATION COMMAND. | 12/27/2011 14:18:28 | ENTIRE GROUP | N SHORE RD | SENDING IN PROGRESS | REGISTRATION |
| ☐ GATEWAY REGISTRATION COMMAND. | 12/27/2011 14:18:10 | ENTIRE GROUP | N SHORE RD | SENDING IN PROGRESS | REGISTRATION |
| ☐ GET GATEWAY VERSION COMMAND. | 12/27/2011 14:17:56 | ENTIRE GROUP | N SHORE RD | SENDING IN PROGRESS | 12/27 14:17 GGV_DCU_N SHORE RD_F |
| ☐ GET GATEWAY VERSION COMMAND. | 12/27/2011 14:17:52 | ENTIRE GROUP | N SHORE RD | SENDING IN PROGRESS | 12/27 14:17 GGV_DCU_N SHORE RD_F |
| ☐ CLOCK SYNCHRONIZATION COMMAND. | 12/27/2011 11:10:40 | ENTIRE GROUP | CENTER LINE RD | SENDING IN PROGRESS | 12/27 11:10 GGV_CENTER LINE RD_F |
| ☐ SWITCH SLC ON/OFF COMMAND. | 10/21/2011 17:37:30 | SLC 7 | N SHORE RD | SENDING IN PROGRESS | MIMIC ON/OFF |
| ☐ GET ADAPTIVE DIMMING PARAMETERS COMMAND. | 10/20/2011 17:35:36 | SLC 8 | N SHORE RD | SENDING IN PROGRESS | 10/20 17:35 GAD_N SHORE RD_P |
| ☐ GET ADAPTIVE DIMMING PARAMETERS COMMAND. | 10/20/2011 17:35:36 | SLC 9 | N SHORE RD | SENDING IN PROGRESS | 10/20 17:35 GAD_N SHORE RD_P |
| ☐ GET ADAPTIVE DIMMING PARAMETERS COMMAND. | 10/20/2011 17:35:36 | SLC 3 | CENTER LINE RD | SENDING IN PROGRESS | 10/20 17:35 GAD_CENTER LINE RD_P |
| ☐ GET ADAPTIVE DIMMING PARAMETERS COMMAND. | 10/20/2011 17:35:36 | SLC 7 | N SHORE RD | SENDING IN PROGRESS | 10/20 17:35 GAD_N SHORE RD_P |
| ☐ GET ADAPTIVE DIMMING PARAMETERS COMMAND. | 10/20/2011 17:35:36 | SLC 1 | CENTER LINE RD | SENDING IN PROGRESS | 10/20 17:35 GAD_CENTER LINE RD_P |

FIG. 16A

SELECT COMMAND: [SET/GET MODE ▶]  SELECT GATEWAY: [CENTERLINE ROAD ▶]  [📤 EXPORT TO EXCEL] [🖨 PRINT] [✖ CLOSE]

[▶] [🔒 APPLY]

EXCEPTIONS REPORT: 10/19/2012

GATEWAY: CENTERLINE ROAD

| SLC NO. | SLC NAME | SET MODE | SET COMMAND DATE | GET MODE | GET COMMAND DATE |
|---|---|---|---|---|---|
| 1 | SLC 1 | MANUAL | 09/19/2012 20:08:18 PM | PHOTOCELL | 10/18/2012 22:34:42 PM |
| 2 | SLC 2 | MANUAL | 09/18/2012 19:33:22 PM | PHOTOCELL | 10/19/2012 16:03:45 PM |
| 3 | SLC 3 | MANUAL | 09/18/2012 19:35:24 PM | PHOTOCELL | 10/19/2012 16:03:45 PM |
| 4 | SLC 4 | MANUAL | 09/18/2012 19:36:14 PM | PHOTOCELL | 10/19/2012 16:03:45 PM |
| 5 | SLC 5 | MANUAL | 09/18/2012 19:37:32 PM | PHOTOCELL | 10/19/2012 16:03:45 PM |
| 6 | SLC 6 | MANUAL | 09/18/2012 19:38:23 PM | PHOTOCELL | 10/19/2012 16:03:45 PM |
| 7 | SLC 7 | MANUAL | 09/18/2012 19:39:24 PM | PHOTOCELL | 10/19/2012 16:03:45 PM |
| 8 | SLC 8 | MANUAL | 09/18/2012 19:40:09 PM | PHOTOCELL | 10/19/2012 16:03:45 PM |
| 9 | SLC 9 | MANUAL | 09/18/2012 19:47:44 PM | PHOTOCELL | 10/19/2012 16:03:45 PM |
| 10 | SLC 10 | MANUAL | 09/19/2012 20:09:49 PM | PHOTOCELL | 10/19/2012 16:03:45 PM |

12

PAGE 1 OF 1 [1] [▲]

| GATEWAY/USERS | O'WILLIAM | JSMITH | L'DURANCE | MSMITH | NBROWN | ROBERT | TKELLY |
|---|---|---|---|---|---|---|---|
| CENTER LINE RD | ✓ | ✓ | ✗ | ✓ | ✓ | ✓ | ✓ |
| JOHN HEAD RD | ✓ | ✓ | ✗ | ✓ | ✓ | ✓ | ✓ |
| N SHORE RD | ✓ | ✓ | ✗ | ✗ | ✗ | ✗ | ✓ |
| MG ROAD | ✓ | ✓ | ✗ | ✓ | ✓ | ✓ | ✓ |
| GS HIGHWAY | ✓ | ✓ | ✗ | ✗ | ✗ | ✗ | ✓ |
| SENT MERRY PARK | | | | | | | |

GATEWAY DEVICE SECURITY MATRIX

FIG. 29

SELECT OPTION: ○ SHOW NORMAL SCHEDULE  ● SHOW DIMMING OVERRIDE
SET SCHEDULE CONFIGURATION

| | SUN DEC 02, 2012 | MON DEC 03, 2012 | TUE DEC 04, 2012 | WED DEC 05, 2012 | THU DEC 06, 2012 | FRI DEC 07, 2012 | SAT DEC 08, 2012 |
|---|---|---|---|---|---|---|---|
| 12 AM - 01 AM | 0% MOTION BASED 12:00 - 03:00 | 0% MOTION BASED 12:00 - 03:00 | 0% MOTION BASED 12:00 - 03:00 | 0% MOTION BASED 12:00 - 03:00 | 0% MOTION BASED 12:00 - 03:00 | 0% MOTION BASED 12:00 - 03:00 | 0% MOTION BASED 12:00 - 03:00 |
| 01 AM - 02 AM | | | | | | | |
| 02 AM - 03 AM | | | | | | | |
| 03 AM - 04 AM | 50% 03:00 - 06:15 | 50% 03:00 - 06:15 | 50% 03:00 - 06:15 | 50% 03:00 - 06:15 | 50% 03:00 - 06:15 | 50% 03:00 - 06:15 | 50% 03:00 - 06:15 |
| 04 AM - 05 AM | | | | | | | |
| 05 AM - 06 AM | | | | | | | |
| 06 AM - 07 AM | | | | | | | |
| 07 AM - 08 AM | | | | | | | |
| 08 AM - 09 AM | | | | | | | |
| 09 AM - 10 AM | | | | | | | |
| 10 AM - 11 AM | | | | | | | |
| 11 AM - 12 PM | | | | | | | |
| 12 PM - 01 PM | | | | | | | |
| 01 PM - 02 PM | | | | | | | |
| 02 PM - 03 PM | | | | | | | |
| 03 PM - 04 PM | | | | | | | |
| 04 PM - 05 PM | | | | | | | |
| 05 PM - 06 PM | | | | | | | |
| 06 PM - 07 PM | | | | | | | |
| 07 PM - 08 PM | 0% 07:00 - 11:59 | 0% 07:00 - 11:59 | 0% 07:00 - 11:59 | 0% 07:00 - 11:59 | 0% 07:00 - 11:59 | 0% 07:00 - 11:59 | 0% 07:00 - 11:59 |
| 08 PM - 09 PM | | | | | | | |
| 09 PM - 10 PM | | | | | | | |
| 10 PM - 11 PM | | | | | | | |
| 11 PM - 12 PM | | | | | | | |

FIG. 32

CSI ADMINISTRATOR
HOME > CONTROLS > CONFIGURE SLC > SET MODE CONFIGURATION

CLIENT | MIMICS | USERS | SLCs | CONTROLS | MAINTENANCE | ASSETS | LOGOUT | HELP

SELECT / DEFINE TEMPLATE:

TEMPLATE: [NEW TEMPLATE ▼]  [💾 SAVE]

TEMPLATE NAME: *  [        ]  ← 3402

GATEWAY TYPE: *  ⦿ GATEWAY   ○ FEEDER

⦿ MANUAL  ○ PHOTOCELL  ○ SCHEDULED  ○ ASTRO CLOCK  ○ ASTRO CLOCK WITH PHOTOCELL OVERRIDE  ○ CIVIL TWILIGHT  ○ CIVIL TWILIGHT WITH PHOTOCELL OVERRIDE

SELECT SLC TEMPLATE:  [SELECT TEMPLATE ▼]

COMMAND NAME: *  [1/17 13:29 SM_|GATEWAY_P/F]

SEARCH SLC BY:  [ID ▼]  [🔍 SEARCH]

SLC DETAILS:
SELECT SLC(S): *
☐ SELECT ALL
⊞ ☑ N SHORE ROAD
⊞ ☑ PETOR BAY ROAD

[🔧 SEND CONFIGURATION]

FIG. 34

CSI ADMINISTRATOR
HOME > CONTROLS > GET/SET SYSTEM PARAMETERS> SET RF NETWORK PARAMETER

CLIENT  MIMICS  USERS  SLCs  CONTROLS  MAINTENANCE  ASSETS  LOGOUT  HELP

CLOUDY CONDITION POLL TIME: * (MINS)
UNICAST TIME DELAY: * (SECONDS)
LAMP LOOK CONDITION: DO NOT LOCK LAMP UPON TRIP
SELECT SLC TEMPLATE: SELECT TEMPLATE
COMMAND NAME: * 1/17 13:24 SR*NP_[GATEWAY_P/F]
SEARCH SLC BY: ID                                               SEARCH

SLC DETAILS:
SELECT SLC(S): *
☐ SELECT ALL
⊕ ☐ N SHORE ROAD
⊕ ☐ PETOR BAY ROAD

[SEND COMMAND]

FIG. 35

DEAR JOHN SMITH,

YOU HAVE BEEN ASSIGNED A NEW WORK ORDER WITH ID "2" WITH WORK ORDER NAME "WO-10-30-2012-235596" RAISED ON "10/30/2012".

🗎 TAKE AN ACTION ON WORK ORDER ⎯ 3602

WORK ORDER CONTAINS BELOW MENTIONED ISSUES:

ISSUE ID - 2
SLC NAME - PACIFIC SLC - 004
FAULT NAME - LAMP FAULT
FAULT DESCRIPTION - BULB YELLOW
FAULT RAISED DATE - 10/30/2012 02:35:54 AM

🗎 ADD AN ACTION FOR THE ISSUE ⎯ 3604
✕ TO CHECK MAINTENANCE HISTORY FOR THE ISSUE ⎯ 3606
🗎 TO ADD ATTRIBUTE FOR THIS SLC ⎯ 3608

BEST REGARDS,
TEAM

CSI  JOHN SMITH
HOME > MAINTENANCE > MAINTENANCE HISTORY

MAP-VIEW  STATUS  TRENDS  REPORTS  ALARMS  DASHBOARDS  USERS  SLCs  CONTROLS  SETTINGS  MAINTENANCE  ASSETS  LOGOUT  HELP

FAULT DETAILS

| SLC NAME | RAISED BY | RAISED ON | FAULT NAME | DESCRIPTION | STATUS |
|---|---|---|---|---|---|
| SLC 2 | JSMITH | 10/22/2011 12:32:45 PM | PHOTOCELL STATUS FAULT | PHOTOCELL FAULTY. | OPEN |
| SLC 2 | JSMITH | 10/22/2011 11:06:00 AM | PHOTOCELL STATUS FAULT | PHOTOCELL FAULTY | OPEN |
| SLC 2 | JSMITH | 10/17/2011 5:46:15 PM | COMMUNICATION FAULT | COMMUNICATION ERROR. | RE-OPEN |
| SLC 2 | SYSTEM | 9/23/2011 12:00:06 AM | FAULT 1 | SYSTEM | UNDEFINED |
| SLC 2 | SYSTEM | 9/22/2011 12:00:23 AM | FAULT 1 | SYSTEM | OPEN |
| SLC 2 | SYSTEM | 9/21/2011 12:00:16 AM | FAULT 1 | SYSTEM | OPEN |
| SLC 2 | SYSTEM | 9/20/2011 12:00:23 AM | FAULT 1 | SYSTEM | OPEN |
| SLC 2 | SYSTEM | 9/18/2011 12:00:26 AM | FAULT 1 | SYSTEM | OPEN |
| SLC 2 | SYSTEM | 9/16/2011 12:00:11 AM | FAULT 1 | SYSTEM | OPEN |
| SLC 2 | SYSTEM | 9/14/2011 12:00:23 AM | FAULT 1 | SYSTEM | OPEN |

1 2

ACTION DETAILS

| ACTION DETAIL | ACTION TAKEN BY | ACTION TAKEN ON |
|---|---|---|
| ISSUES RESOLVED | MSMITH | 10/22/2011 11:49:07 |

[BACK]

FIG. 40

☐ OVER BURNED    ☐ SLCS APPROACHING END OF LIFE    ☐ COMMUNICATION FAILURE    [EXPORT TO EXCEL] [PRINT] [✕ CLOSE]

BURN HOUR REPORT: 10/13/2011

SUMMARY

| TOTAL SLCS | COMMUNICATION FAILURE | SLCs THAT NEED TO BE REPLACED IMMEDIATELY | SLCs APPROACHING END OF LIFE (10% OR LESS) | SLCS OK |
|---|---|---|---|---|
| 6 | 4 | 1 | 1 | 0 |

GATEWAY: CENTER LINE RD

| SLC | DATE - TIME | TOTAL BURN HOURS | LAMP LIFE (HRS) | LAMP LIFE REMAINING (HRS) | DAYS TO REPLACE LAMP (DAYS) |
|---|---|---|---|---|---|
| SLC 1 | 7/18/2011 1:56:10 AM | 1002 | 1000 | OVER BURNED: 2.00 (HRS) | OVER BURNED: 0.20 (DAYS) |
| SLC 2 | 7/18/2011 2:00:10 PM | 800 | 1000 | 200.00 | 20.00 |

GATEWAY: JOHN HEAD RD

| SLC | DATE - TIME | TOTAL BURN HOURS | LAMP LIFE (HRS) | LAMP LIFE REMAINING (HRS) | DAYS TO REPLACE LAMP (DAYS) |
|---|---|---|---|---|---|
| SLC 4 | 7/18/2011 2:01:10 PM | 1750 | 2000 | 250.00 | 25.00 |
| SLC 5 | 7/18/2011 2:01:10 PM | 1800 | 2000 | 199.60 | 20.00 |
| SLC 6 | 10/11/2011 2:56:10 PM | 1750 | 2000 | 250.00 | 25.00 |

GATEWAY: N SHORE RD

| SLC | DATE - TIME | TOTAL BURN HOURS | LAMP LIFE (HRS) | LAMP LIFE REMAINING (HRS) | DAYS TO REPLACE LAMP (DAYS) |
|---|---|---|---|---|---|
| SLC 8 | 10/11/2011 2:58:21 PM | 2001 | 1000 | OVER BURNED: 1001.00 (HRS) | OVER BURNED: 100.10 (DAYS) |

FIG. 41

DATE RANGE    FROM: 01/01/2012    TO: 10/8/2012    REPORT BY:  ● FAULTS  ○ SLCs

SELECT FAULT(S): ☐ VOLTAGE UNDER OVER ☐ LAMP ☐ LAMP CONDITION ☑ COMMUNICATION ☑ BALLAST

REPORT COLUMNS: ☑ INSTALLATION DATE ☑ FIRST OCCURRENCE DATE ☑ LAST OCCURRENCE DATE ☑ FAULT COUNT ☑ STEADY CURRENT ☑ ACTUAL CURRENT ☑ PER VARIATION

[Export to Excel] [Print] [Close]
[Set as Default] [Load]

FAULT: COMMUNICATION

FAULTS SUMMARY REPORT BETWEEN: 01/01/2012 AND 10/18/2012

GATEWAY: CENTERLINE ROAD

| SLC | INSTALLATION DATE | FIRST OCCURRENCE DATE | LAST OCCURRENCE DATE | COUNT | STEADY CURRENT | ACTUAL CURRENT | | PER VARIATION(%) |
|---|---|---|---|---|---|---|---|---|
| | | | | | | MINIMUM | MAXIMUM | |
| SLC 1 | 09/18/2012 18:57:38 PM | 09/20/2012 12:48:00 PM | 09/20/2012 15:31:00 PM | 5 | 115.00 | 80 | 80 | -30.43 |
| SLC 2 | 09/18/2012 18:59:47 PM | 09/20/2012 13:48:00 PM | 09/20/2012 13:48:00 PM | 1 | 115.00 | 80 | 80 | -30.43 |
| SLC 3 | 09/18/2012 18:59:47 PM | 09/20/2012 13:48:00 PM | 09/20/2012 13:48:00 PM | 1 | 115.00 | 80 | 80 | -30.43 |
| SLC 4 | 09/18/2012 18:59:47 PM | 09/20/2012 13:48:00 PM | 09/20/2012 13:48:00 PM | 1 | 115.00 | 80 | 80 | -30.43 |
| SLC 5 | 09/18/2012 18:59:47 PM | 09/20/2012 13:48:00 PM | 09/20/2012 15:10:00 PM | 2 | 115.00 | 80 | 80 | -30.43 |
| SLC 6 | 09/18/2012 18:59:47 PM | 09/20/2012 15:10:00 PM | 09/20/2012 15:10:00 PM | 1 | 115.00 | 80 | 80 | -30.43 |
| SLC 7 | 09/18/2012 18:59:47 PM | 09/20/2012 15:10:00 PM | 09/20/2012 15:10:00 PM | 1 | 115.00 | 80 | 80 | -30.43 |
| SLC 8 | 09/18/2012 18:59:47 PM | 09/20/2012 15:10:00 PM | 09/20/2012 15:10:00 PM | 1 | 115.00 | 80 | 80 | -30.43 |
| SLC 9 | 09/18/2012 18:59:47 PM | 09/19/2012 10:52:00 PM | 09/20/2012 15:10:00 PM | 4 | 115.00 | 80 | 80 | -30.43 |
| SLC 10 | 09/18/2012 18:59:47 PM | 09/20/2012 15:10:00 PM | 09/20/2012 15:10:00 PM | 1 | 115.00 | 80 | 80 | -30.43 |

GATEWAY: JOHN HEAD ROAD

FIG. 42

| SLC | INSTALLATION DATE | FIRST OCCURENCE DATE | LAST OCCURENCE DATE | COUNT | STEADY CURRENT | ACTUAL CURRENT MINIMUM | ACTUAL CURRENT MAXIMUM | PER VARIATION(%) |
|---|---|---|---|---|---|---|---|---|
| SLC 15 | 09/18/2012 21:39:27 PM | 09/20/2012 15:13:00 PM | 09/20/2012 17:50:00 PM | 4 | 115.00 | 80 | 80 | -30.43 |
| SLC 16 | 09/18/2012 21:39:27 PM | 09/20/2012 15:13:00 PM | 09/20/2012 15:13:00 PM | 1 | 115.00 | 80 | 80 | -30.43 |
| SLC 17 | 09/18/2012 21:39:27 PM | 09/20/2012 15:13:00 PM | 09/20/2012 15:20:00 PM | 2 | 115.00 | 80 | 80 | -30.43 |
| SLC 18 | 09/18/2012 21:39:27 PM | 09/20/2012 15:13:00 PM | 09/20/2012 15:20:00 PM | 2 | 115.00 | 80 | 80 | -30.43 |
| SLC 19 | 09/18/2012 21:39:27 PM | 09/20/2012 15:13:00 PM | 09/20/2012 15:20:00 PM | 1 | 115.00 | 80 | 80 | -30.43 |
| SLC 20 | 09/18/2012 21:39:27 PM | 09/20/2012 15:20:00 PM | 09/20/2012 15:20:00 PM | 1 | 115.00 | 80 | 80 | -30.43 |
| SLC 21 | 09/18/2012 21:39:27 PM | 09/20/2012 15:20:00 PM | 09/20/2012 15:20:00 PM | 1 | 115.00 | 80 | 80 | -30.43 |
| SLC 22 | 09/18/2012 21:39:27 PM | 09/20/2012 15:20:00 PM | 09/20/2012 15:20:00 PM | 1 | 115.00 | 80 | 80 | -30.43 |
| SLC 23 | 09/18/2012 21:39:27 PM | 09/20/2012 15:20:00 PM | 09/20/2012 15:20:00 PM | 1 | 115.00 | 80 | 80 | -30.43 |
| SLC 24 | 09/18/2012 21:39:27 PM | 09/20/2012 15:20:00 PM | 09/20/2012 15:20:00 PM | 1 | 115.00 | 80 | 80 | -30.43 |

GATEWAY: N SHORE RD

| SLC | INSTALLATION DATE | FIRST OCCURENCE DATE | LAST OCCURENCE DATE | COUNT | STEADY CURRENT | ACTUAL CURRENT MINIMUM | ACTUAL CURRENT MAXIMUM | PER VARIATION(%) |
|---|---|---|---|---|---|---|---|---|
| SLC 30 | 09/18/2012 23:58:45 PM | 09/20/2012 15:20:00 PM | 09/20/2012 15:20:00 PM | 1 | 115.00 | 80 | 80 | -30.43 |
| SLC 31 | 09/18/2012 23:58:45 PM | 09/20/2012 15:20:00 PM | 09/20/2012 15:20:00 PM | 1 | 115.00 | 80 | 80 | -30.43 |
| SLC 32 | 09/18/2012 23:58:45 PM | 09/20/2012 15:20:00 PM | 09/20/2012 15:20:00 PM | 1 | 115.00 | 80 | 80 | -30.43 |
| SLC 33 | 09/18/2012 23:58:45 PM | 09/20/2012 15:20:00 PM | 09/20/2012 15:20:00 PM | 1 | 115.00 | 80 | 80 | -30.43 |
| SLC 34 | 09/18/2012 23:58:45 PM | 09/20/2012 15:20:00 PM | 09/20/2012 15:20:00 PM | 1 | 115.00 | 80 | 80 | -30.43 |
| SLC 35 | 09/18/2012 23:58:45 PM | 09/20/2012 15:20:00 PM | 09/20/2012 15:20:00 PM | 1 | 115.00 | 80 | 80 | -30.43 |
| SLC 36 | 09/18/2012 23:58:45 PM | 09/20/2012 15:20:00 PM | 09/20/2012 15:20:00 PM | 1 | 115.00 | 80 | 80 | -30.43 |
| SLC 37 | 09/18/2012 23:58:45 PM | 09/20/2012 15:20:00 PM | 09/20/2012 15:20:00 PM | 1 | 115.00 | 80 | 80 | -30.43 |
| SLC 38 | 09/18/2012 23:58:46 PM | 09/20/2012 15:20:00 PM | 09/20/2012 15:20:00 PM | 1 | 115.00 | 80 | 80 | -30.43 |
| SLC 39 | 09/18/2012 23:58:46 PM | 09/20/2012 15:20:00 PM | 09/20/2012 15:20:00 PM | 1 | 115.00 | 80 | 80 | -30.43 |

FIG. 42 (Cont.)

MANAGING STREETLIGHTS

CROSS REFERENCE TO RELATED APPLICATIONS

This application is a continuation application and claims priority under 35 U.S.C. §120 to U.S. patent application Ser. No. 13/744,290, filed Jan. 17, 2013 (U.S. Pat. No. 8,674,629 to be issued Mar. 18, 2014), which claims benefit of priority under U.S.C. §119(e) to U.S. provisional application 61/587,563, filed on Jan. 17, 2012, U.S. provisional application 61/587,567, filed on Jan. 17, 2012, U.S. provisional application 61/587,568, filed on Jan. 17, 2012, U.S. provisional application 61/588,572, filed on Jan. 19, 2012, and U.S. provisional application 61/588,569, filed on Jan. 19, 2012, the disclosure of each of which is incorporated herein by reference.

TECHNICAL FIELD

This disclosure relates to managing streetlights.

BACKGROUND

Many cities and towns have thousands of streetlights to keep streets and walkways lit at night. A given streetlight may be turned on or off using a photocell deployed on the streetlight.

SUMMARY

In one aspect, a method includes receiving, at a computing device, information representative of a location and status of a streetlight included in a network of streetlights. The method also includes presenting a representation of the streetlight in a graphical user-interface in accordance with the received location and status information, and receiving information representing a selection of the streetlight for inclusion in a group of streetlights from the network. The method further includes initiating delivery of one or more control signals to the group of streetlights.

In another aspect, a system includes memory and a processor. The processor is configured to receive information representative of a location and status of a streetlight included in a network of streetlights, and present a representation of the streetlight in a graphical user-interface in accordance with the received location and status information. The processor is also configured to receive information representing a selection of the streetlight for inclusion in a group of streetlights presented by the graphical user-interface, and initiate delivery of one or more control signals to the group of streetlights.

In another aspect, the disclosure features a computer-readable storage device storing software instructions executable by one or more computing devices. The instructions, upon execution, causes the one or more computing devices to perform operations including receiving, at a computing device, information representative of a location and status of a streetlight included in a network of streetlights. The operations also include presenting a representation of the streetlight in a graphical user-interface in accordance with the received location and status information, and receiving information representing a selection of the streetlight for inclusion in a group of streetlights from the network. The operations further include initiating delivery of one or more control signals to the group of streetlights.

In another aspect, a method includes receiving information representative of a location and status of a streetlight included in a network of streetlights, and detecting, using a computing device, a fault condition of the streetlight, based on the status information. The method also includes determining, using the computing device, a corrective action to resolve the fault condition, and transmitting information related to the corrective action, including instructions for a human personnel to follow, for resolving the fault condition.

In another aspect, a system includes memory and a processor. The processor is configured to receive information representative of a location and status of a streetlight included in a network of streetlights, and detect a fault condition of the streetlight, based on the status information. The processor is also configured to determine a corrective action to resolve the fault condition, and transmit information related to the corrective action, including instructions for a human personnel to follow, for resolving the fault condition.

In another aspect, the disclosure features a computer-readable storage device storing software instructions executable by one or more computing devices. The instructions, upon execution, causes the one or more computing devices to perform operations including receiving information representative of a location and status of a streetlight included in a network of streetlights, and detecting, using a computing device, a fault condition of the streetlight, based on the status information. The operations also include determining a corrective action to resolve the fault condition, and transmitting information related to the corrective action, including instructions for a human personnel to follow, for resolving the fault condition.

In another aspect, an apparatus can include a cylindrical central portion having an outside surface and a threaded inside surface capable of receiving a threaded portion of a streetlight controller housing. The apparatus can also include a peripheral portion disposed around the cylindrical central portion, the peripheral portion including a substantially flat surface, wherein fastener receptacles are disposed on the surface at locations such that the apparatus can be securely fastened over an opening on a streetlight housing, the opening designed to receive a receptacle for a plug.

In another aspect, an apparatus includes a computing device that includes memory and a processor. The processor can be configured to establish a wireless connection with a streetlight controller that communicates with a streetlight, initiate transmission of a set of parameters related to commissioning the streetlight, and receive, from the controller, status and identification information associated with the streetlight.

In another aspect, the disclosure features a computer-readable storage device storing software instructions executable by one or more computing devices. The instructions, upon execution, causes the one or more computing devices to perform operations including establishing a wireless connection with a streetlight controller that communicates with a streetlight, initiating transmission of a set of parameters related to commissioning the streetlight, and receiving, from the controller, status and identification information associated with the streetlight.

Implementations can include one or more of the following aspects.

The location and status information can be received from a gateway in communication with the streetlight. The location and status information can be received from a streetlight controller in communication with the streetlight. Presenting the representation of the streetlight can include overlaying the representation on a map interface. Presenting the representation of the streetlight can include presenting a color-coded status indicator of the streetlight. The selection of the streetlight for inclusion in the group can be based on at least one of the location of the streetlight, a time of year, and one or more environmental parameters. The selection of the streetlight for inclusion in the group can be based on a manual user-defined selection received using the graphical user-interface. The one or more control signals can include an activation signal for the group of streetlights. The one or more control signals can be based on data from a subset of streetlights included in the network of streetlights. The data can be based on information provided by one or more photocells deployed on the subset of streetlights. The one or more control signals can provide a lighting schedule for the streetlight. The one or more control signals can override a lighting schedule associated with the streetlight.

The corrective action information can include a fault type related to the fault condition. The corrective action information can include predictive information related to remaining lifetime for one or more components of the streetlight. The corrective action information can include predictive information related to remaining lifetime for one or more components of other streetlights in a neighborhood of the streetlight. A notification that the fault condition is resolved can be received. A human personnel suitable for resolving the fault condition can be identified based on the information representative of the location and status of the streetlight. The information related to the corrective action can be transmitted to a computing device of the human personnel. The information related to the corrective action can include an identification of one or more components of the streetlight that need replacement. The information related to the corrective action can include instructions related to procuring the one or more components. The information related to the corrective action can include a list of instructions related to replacing the one or more components. A notification that the corrective action has been at least partially performed can be received. A computing device can maintain a log of the fault condition and a status of the corresponding corrective action.

The opening can be designed to receive a receptacle for a plug that complies with a particular standard. The standard can be a National Electrical Manufacturers Association (NEMA) standard. The peripheral portion can include a second cylindrical portion disposed concentric to the cylindrical central portion. The fastener receptacles can receive fasteners substantially similar to fasteners used for securing the receptacle for the plug over the opening. The apparatus can include two fastener receptacles. The apparatus can include the streetlight controller housing. The streetlight controller housing can be configured to receive a streetlight controller that manages operations of the streetlight. The streetlight controller housing can include an enclosure configured to receive a streetlight controller that manages operations of the streetlight, and a cylindrical protrusion attached to the enclosure. The cylindrical protrusion can include a threaded outer surface that facilitates a secure attachment with the threaded inside surface of the cylindrical central portion of the apparatus.

A dedicated button can trigger an activation of the streetlight. A dedicated button can trigger initiating transmission of a set of parameters related to commissioning the streetlight. The processor can be configured to establish a wireless connection with a gateway device, initiate transmission of a set of parameters related to configuring the gateway device, and receive status and identification information associated with the gateway device. A global positioning system can assign location data to the streetlight controller. A barcode reader can be used for identifying the streetlight controller. The wireless connection can be established with the streetlight controller based on a strength of a signal received from the streetlight controller. The set of parameters related to commissioning the streetlight can include information for updating a clock in the streetlight controller. The processor can be configured to receive information to update commissioning information. The information to update the commissioning information can include a software update. The information to update commissioning information can include a firmware update. The set of parameters can include parameters to control the controller. The processor can be configured to initiate a transmission to reset some of the parameters following a maintenance operation on the streetlight.

DESCRIPTION OF DRAWINGS

FIGS. 2-35 show examples of interfaces related to a streetlight management system.

FIG. 36 shows an example of a work order.

FIG. 39-44 show examples of interfaces related to a streetlight management system.

Like reference symbols in the various drawings indicate like elements.

DETAILED DESCRIPTION

This document describes systems and techniques using which a streetlight system can be managed via streetlight controllers deployed on individual streetlights. The streetlight controllers can include one or more computing devices that can be configured to control various operations of a streetlight, based on, for example, instructions received from a remote control center. The streetlight controllers can provide more user control and customizability as compared to, for example, photocell based systems that are used for switching individual streetlights on and off based on ambient light conditions. In some implementations, the streetlight controllers can be programmed to turn on, turn off, or dim the streetlight, for example, at scheduled times, or based on a set of conditions. The streetlight controllers can also be used in conjunction with photocells, for example, to make lighting decisions based on ambient weather conditions.

In some implementations, a streetlight system can include thousands of streetlights on which the streetlight controllers are deployed. A streetlight management application, as described in this document, can be used to manage a large number of streetlights, based on, for example, communications with the streetlight controllers. The streetlight management application can provide an organized, intuitive map-based graphical user-interface (also referred to as a map interface) that allows a user to easily configure, control, and monitor a large number of streetlights remotely.

Figure 1:
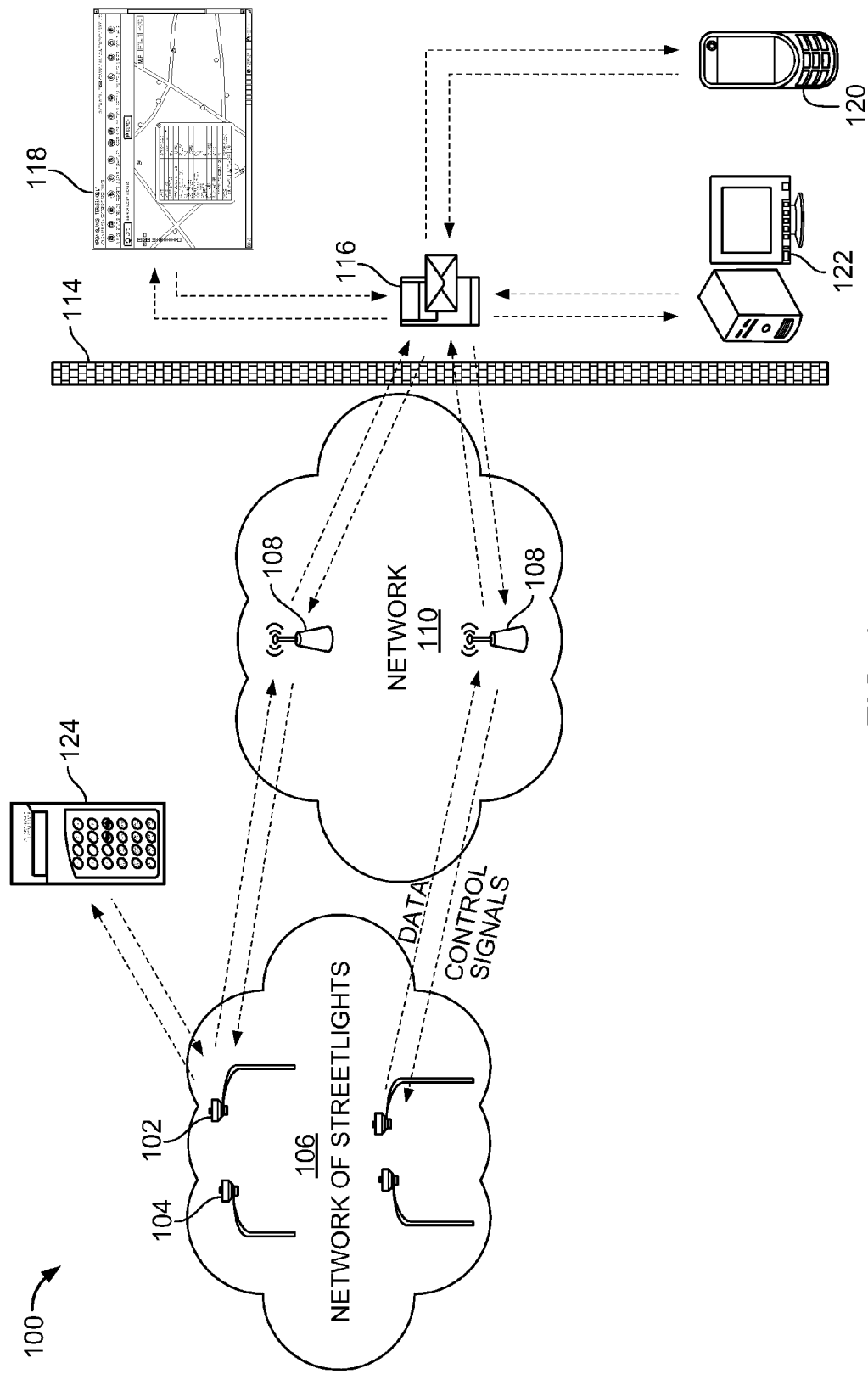
FIG. 1 shows an example of a streetlight management system.

Referring to FIG. 1, an example of a streetlight system 100 can include streetlights 102 with streetlight controllers 104. In some implementations, the streetlight controller 104 can be configured to communicate with a configurator 124 that can be used for commissioning or otherwise managing the streetlights 102. The streetlight controller 104 can be configured to communicate with other streetlight controllers deployed on streetlights 102 within a network of streetlights 106. In some implementations, the streetlight controllers 104 can communicate with a communication network such as a network 110. The network 110 can include, for example, one or more gateways 108 connected to one another, and the streetlight controllers 104 by a wired or wireless network. In some implementations, the gateways 108 can be configured to communicate with the configurator 124.

The network 110 can be configured to communicate with a server 116. In some implementations, the network 110 and the server 116 can be separated by a security layer such as a firewall 114. In some implementations, the network 110 can include a computing device (e.g. a media convergence server (MCS)) that receives information from various gateways 108 and communicates with the server 116, for example, using an Ethernet connection. Such a computing device can also be configured to relay information received from the server 116 to the gateways 108. In some implementations, the gateways 108 can be configured to communicate with the server 116.

The server 116 can communicate with various computing devices related to managing the network of streetlights 106. One or more of these devices can be configured to execute an application that facilitates individual or grouped management of the streetlights 102. For example, the server 116 can be configured to communicate with field staff using, for example, mobile devices 120 and office staff through computing devices 122. In some implementations, the server 116 can communicate with one or more computing devices that execute a streetlight management software. In some implementations, the server 116 executes the streetlight management software and provides user-interfaces on one or more of the mobile device 120 and the computing device 122.

In some implementations, the streetlight controller 104 can be mounted on a streetlight. The streetlight controller 104 can be placed within a streetlight controller housing that is mounted on a streetlight 102. The streetlight controller housing can have an electrical connector (e.g. a two-pronged or a three-pronged plug) that can be connected to an electrical receptacle on a streetlight 102. In some implementations, the electrical connector can be a twist-locking plug. The electrical connector and the corresponding receptacle can be in accordance with the standards used in the country in which the streetlight is deployed. For example, in the United States, the electrical connector and the corresponding receptacle can be in accordance with standards set by National Electrical Manufacturers Association (NEMA). In some implementations, the streetlight controller housing can be attached to the streetlight housing using a threaded connector that can be twisted or screwed into an appropriately threaded receptacle disposed on the streetlight. The threaded receptacle capable of receiving the threaded connector of the streetlight controller housing can be, for example, an integral part of the streetlight housing, or affixed to the streetlight housing.

In some implementations, the streetlight controller 104 can include a photocell. The photocell can detect ambient light, and the streetlight controller 104 can receive light measurement data from the photocell. In some implementations, the light measurement data can be used to make lighting decisions. The photocell can be mounted inside the streetlight controller housing. In some implementations, the photocell can be a separate unit having a connector for connecting to a receptacle on the streetlight controller housing. In some implementations, the connector and the corresponding receptacle can be in accordance with the standards used in the country in which the streetlight is deployed. For example, in the United States, the connector can be a twist-locking plug in accordance with standards set by NEMA.

The streetlight controller 104 can include a Global Positioning System (GPS) to receive location data (e.g. geographic coordinates) related to the streetlight. In some implementations, the streetlight controller 104 can use the location data to determine sunrise and sunset times. The sunrise and sunset times can be used, for example, to determine a lighting schedule for the streetlight 102.

The streetlight controller 104 can include, for example, one or more of a microcontroller, a clock or other timing device, a memory, a power metering module, a transceiver, dimming circuitry, digital inputs, and analog inputs. The digital inputs and the analog inputs can be used, for example, in motion based lighting controls, adaptive lighting, or advanced lighting controls. The streetlight controller 104 can include a housing for surface mounting. The housing can be made from polycarbonate.

The streetlight controller 104 can be configured to communicate with other streetlight controllers, gateways 108, and configurators 124. For example, a streetlight controller 104 may communicate with other streetlight controllers 104 through a wired or wireless connection. The streetlight controller 104 can include a transceiver to wirelessly communicate with other streetlight controllers 104, gateways 108, and/or configurators 124. The transceiver can use a radio frequency (RF) portion of the spectrum for the communications. The streetlight controllers 104 within the network of streetlights 106 can be connected to one another by a wired or wireless network. For example, the streetlight controllers 104 can be connected to one another by a mesh network. A streetlight controller 104 can act as a node of the mesh network, and/or serve as a relay for other nodes to propagate data using the mesh network. The mesh network can be self-forming and/or self-healing.

In some implementations, the streetlight controllers 104 can be configured to communicate with a configurator 124. The configurator 124 can be a handheld computing device used to commission a streetlight 102. The configurator 124 can include a transceiver to wirelessly communicate with streetlight controllers 104. The transceiver can use RF to wirelessly communicate with the streetlight controllers 104. In some implementations, the configurator 124 can commission a streetlight 102 regardless of whether the streetlight controller 104 has connectivity to the network of streetlights 106 or the network 110. The configurator 124 can establish a wireless connection with the streetlight controller 104, transmit a set of parameters related to commissioning the streetlight 102, and receive status and identification information from the streetlight controller 104. The configurator 124 can transmit commissioning information related to various aspects including, for example, operational setup, network setup, diagnostics, fault management, maintenance issues, asset configuration, asset management, and network mapping. In some implementations, the configurator 124 can include a GPS to receive location data (e.g. geographic coordinates). The configurator 124 can transmit GPS information to the streetlight controller 104. In some implementations, the configurator 124 may communicate with one or more gateways 108 to transmit information related to a streetlight 102. For example, after a streetlight 102 is commissioned, the configurator 124 may transmit information related to the streetlight 102 to a nearby gateway 108 such that the gateway 108 can initiate a communication with the streetlight 102.

In some implementations, the network of streetlights 106 can communicate with the network 110. In some implementations, the streetlight controller 104 can serve as a relay for other streetlight controllers 104 to propagate data from the network of streetlights 106 to the network 110. Individual streetlight controllers 104 can communicate with the network 110 through wired or wireless connections. In some implementations, the streetlight controller 104 can use RF to wirelessly communicate with the network 110. In some implementations, the streetlight controller 104 can communicate with the network 110 by communicating with one or more gateways 108.

The network 110 can include one or more gateways 108. The gateways 108 can be data coordinator units that act as a link between the streetlight controllers 104 and the server 116. A gateway 108 can be configured to communicate with multiple streetlight controllers 104. For example, a gateway 108 can be configured to support up to 1000 streetlight controllers 104. In some implementations, the gateway 108 can communicate with other gateways 108 through a wired or wireless connection. In some implementations, the gateways 108 can communicate with the server 116 through a wired connection (e.g., Ethernet). In some implementations, the gateways 108 can wirelessly communicate with the server 116. In some implementations, gateways 108 can use Global System for Mobile Communications (GSM) or General Packet Radio Service (GPRS) to wirelessly communicate with the server 116. A firewall 114 can separate the gateways 108 and the server 116 to keep the server 116 secure.

The gateway 108 can be a computing device mounted on an existing structure such as a streetlight, electric pole, or building. The gateway can be enclosed in a portable package such as an enclosure with dimensions of approximately 200 mm by 120 mm by 75 mm. The gateway 108 can include, for example, one or more of a processor, a real-time clock, a transceiver, a memory, an Ethernet port, a USB port, and a serial port. The gateway 108 can connect to a computing device such as the server 116 using one of its ports. The gateway 108 can have an enclosure for wall mounting or an enclosure for pole mounting. The enclosure can be made from polycarbonate.

In some implementations, the network 110 can communicate with the server 116 via one or more gateway 108. In some implementations, the server 116 can include an industrial control system. In some implementations, the server 116 can be a supervisory control and data acquisition (SCADA) server. In some implementations, the server can be a central management server. In some implementations, the server 116 can be a server farm that includes multiple servers.

The server 116 can communicate with various devices. One or more of these devices can be configured to execute an application that facilitates management of the streetlights 102. The server 116 can communicate with mobile devices 120 and computing devices 122. In some implementations, the server 116 can send information (e.g., streetlight status information) to a cellular phone via, for example, short messaging service (SMS) or email. In some implementations, the server 116 can send information to the computing devices 122 (e.g., laptop or desktop computers) via email or some other interface.

The mobile devices 120 and the computing devices 122 can be configured to receive streetlight data and send control signals to streetlight controllers 104 using, for example, a graphical user-interface 118. In some implementations, the streetlight management application (also referred to as a streetlight management software) can receive location and status information from streetlight controllers 104. Representations of the streetlights 102 can be presented in the streetlight management software's graphical user-interface 118 in accordance with the received location and status information. In some implementations, the received location and status information can be graphically represented as overlaid on a map-interface. A user can use the graphical user-interface 118 to select one or more streetlights to define a group of streetlights. Control signals can then be initiated to be sent to the group of streetlights to manage their operations. For example, a selected group of streetlights in a given neighborhood can be turned on, turned off, or dimmed based on a control signal for the entire group. Such group-based control of streetlights allows for efficient and fast management of large groups of streetlights. Further, a map-based interface allows for visualization and management of streetlights spread over a large geographical area.

In some implementations, location and status information related to a streetlight can include, for example, GPS coordinates, fault information, communication status, lamp status, and electrical parameters. The control signals sent to a group of streetlights can include, for example, signals for activation, dimming, setting lighting schedules, overriding lighting schedules, and entering asset information.

In some implementations, the status information can include photocell light measurement data. In some implementations, the server 116 can use the photocell light measurement data to determine whether a "dark condition" is occurring. If a "dark condition" is occurring, the server 116 can override the default lighting schedules of one or more streetlight controllers 104 and turn on one or more streetlights 102.

In some implementations, the status information can include fault conditions. Streetlight controllers 104 can be configured to push status information to the server 116. The server 116 can be configured to analyze the status information to detect a fault condition for an individual streetlight 102 or a group of streetlights. The server 116 can use, for example, data associated with the detected fault and/or the asset information to determine an appropriate corrective action required for repairing the fault condition. The server 116 can be configured to automatically send information on the corrective action to an appropriate human field personnel (e.g., through the graphical user-interface 118 as displayed on a mobile device 120, or a computing device 122). The information on the corrective action can include information on specific replacement parts and actions required to repair the fault condition. For example, if the detected fault condition calls for a replacement of a part (e.g. a bulb or capacitor) on a particular streetlight, the information on the corrective action can include, one or more of the exact location of the particular streetlight, the make, model, and ratings associated with the part that needs replacement, information on where to find the replacement part, and instructions related to replacing the part. By providing specific instructions to the field personnel, the troubleshooting and repair time can be significantly reduced. Further, by automatically detecting the fault and determining the corrective action, the amount of training that needs to be imparted on the field personnel can also be reduced. For example, the training can be limited to follow specific instructions as provided by the server 116. In some implementations, for example if the corrective action does not require human intervention, the server 116 can send information on the corrective action directly to the streetlight 102 or the group of streetlights 102 for which the fault condition has been detected.

Software Based Management of Streetlights

The streetlight system 100 can be managed using a software based streetlight management application. The streetlight management application can include, for example, a web-based user application configured to receive streetlight data. The application can display streetlight data in a graphical user-interface 118. A user can use the graphical user-interface 118 to configure, control, and monitor a large number of streetlights 102.

FIG. 2 shows a navigation pane 200 of the application as an example of the graphical user interface. In some implementations, the application's navigation pane 200 can have a symbolic menu structure where each icon refers to a frequently used function. Selecting an icon, e.g., by clicking on it, opens up available options within the category. The navigation pane 200 can include, for example, icons for mimics geographic view 202, status 204, trends 206, reports 208, alarms 210, dashboard 212, user management 214, streetlight controller management and security 216, control commands 218, settings 220, maintenance 222, assets management 224, and logic generation 226. In the example shown in FIG. 2, the alarms icon 210 is selected, and therefore options relating to alarms are available in the main window. The options related to the alarms can include, for example, viewing information on date, time, alarm type, priority, and streetlight controller related to the alarm, acknowledging the alarm, clearing the alarm, and viewing statistics related to the alarm.

In some implementations, the application can provide multiple features and functionalities on a single screen to reduce navigation between different menus. In some implementations, configuration, control, and monitoring features can be made available on a unified interface for a given portion of the system (e.g., the gateways 108). For example, a user can configure, change control parameters for, and monitor status of one or more of the gateways 108 from the unified interface.

Figure 3:
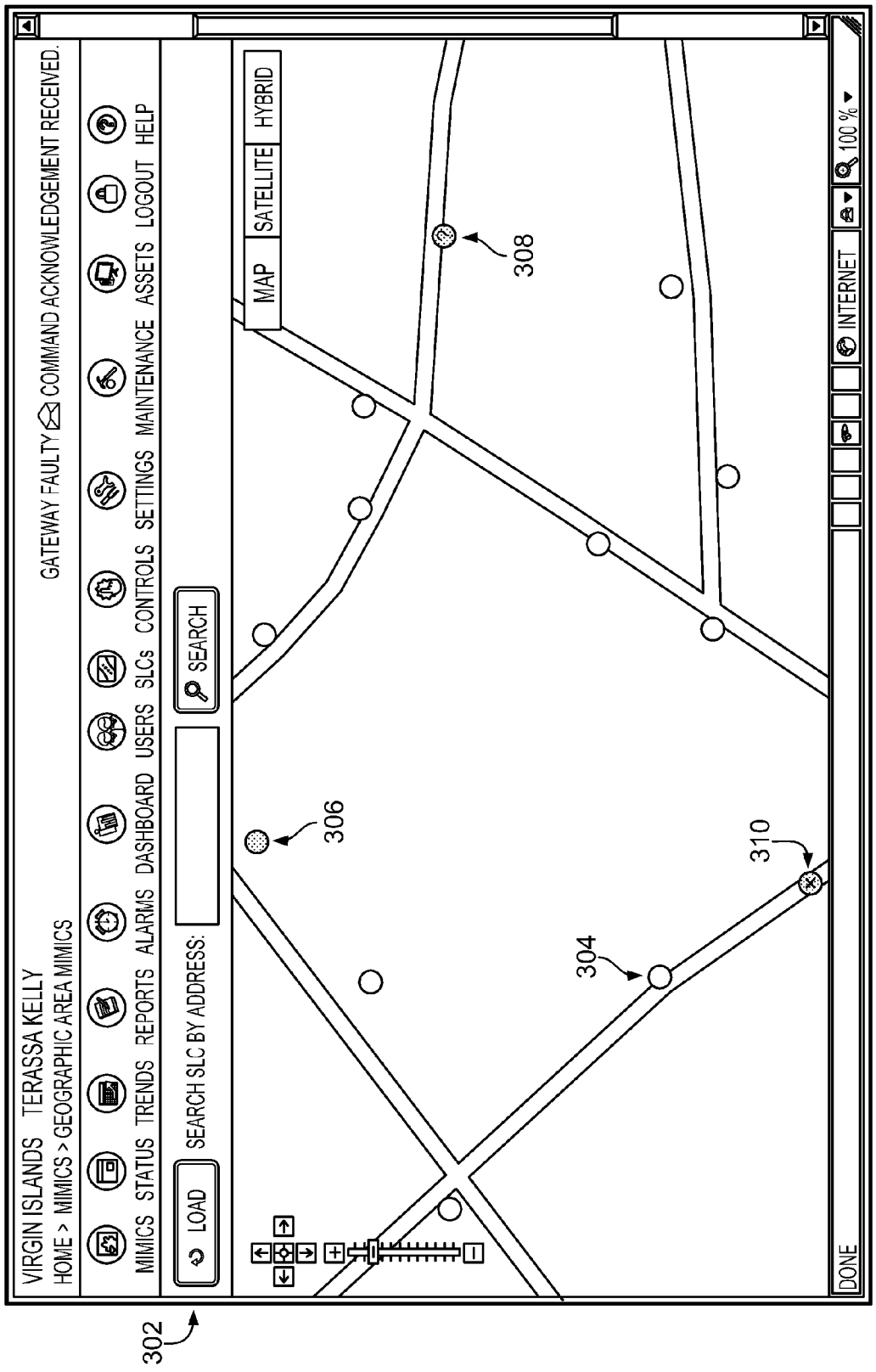

In some implementations, the application can provide representations of streetlights on a map-based graphical user-interface. FIG. 3 shows an example of such a user-interface. A representation of a streetlight can include, for example, location and status information pertaining to the streetlight. In some implementations, the representation of a streetlight can include a color-coded status indicator of the street light. Streetlights can be represented, for example, by colored circles overlaid on the map-based graphical user-interface 302 based on the geographic coordinates of the streetlight controller. In some implementations, a streetlight that is switched on can be represented by a green circle 304, a streetlight that is switched off can be represented by a red circle 306, a streetlight that is out of communication can be represented by a red circle with an identifying symbol such as a question mark 308, and a streetlight that is faulty can be represented by a red circle with an identifying symbol such as an "x" 310.

Figure 4:
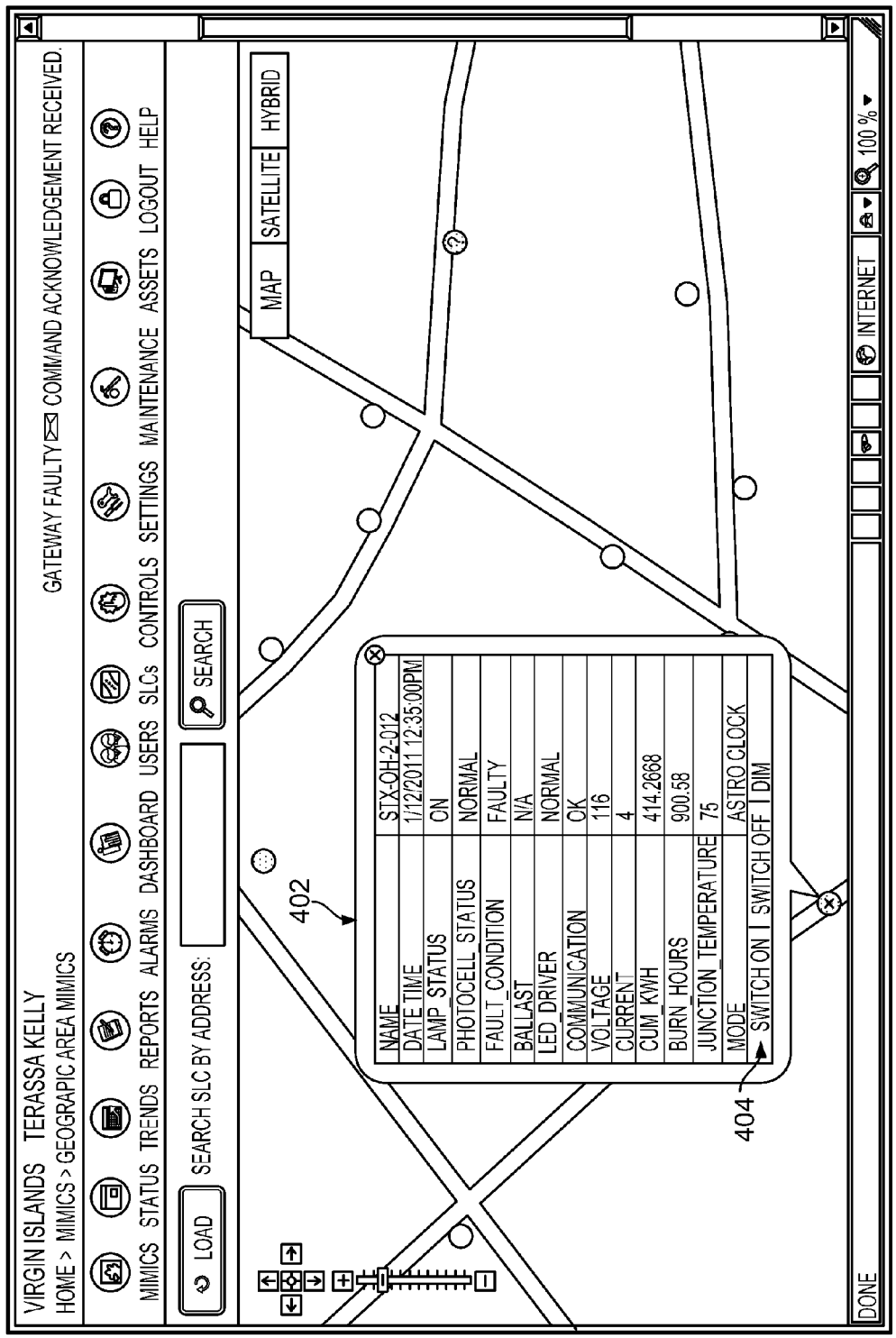

In some implementations, additional information pertaining to the streetlights can be displayed. In some implementations, a user can obtain additional information pertaining to the streetlight by selecting (e.g., clicking on) the streetlight's representation (e.g., the colored circle). Referring to FIG. 4, the additional information can appear, for example, in the form of a secondary interface such as pop-up window 402. The pop-up window 402 can include, for example, the streetlight controller's name, the lamp status, the photocell status, fault information, communication status, voltage, current, power, and burn hours, among others. The pop-up window 402 may also include basic commands 404 that can be selected by the user. The basic commands can include a switch on command, a switch off command, and a dim command.

Figure 5:
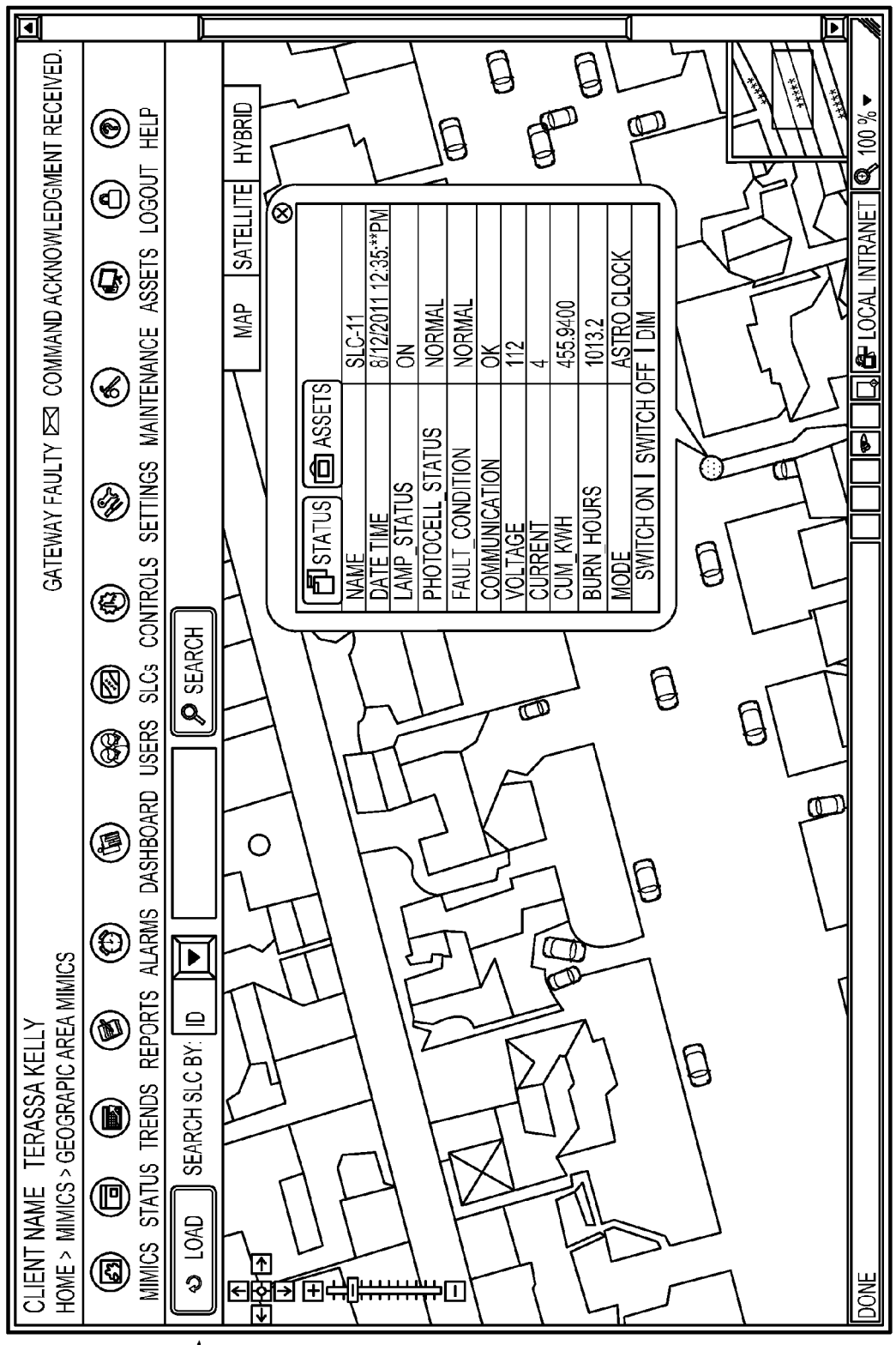

Referring to FIG. 5, the map-based graphical user-interface 302 can include satellite images. The map-based graphical user-interface 302 can use satellite images of streetlights as representations of the streetlights. In some implementations, the application can alter how the representations of the streetlights are displayed depending on the zoom level on the map-based graphical user-interface 302. For example, a relatively zoomed-out view can cause streetlights in close proximity to be combined into clusters.

Figure 6:
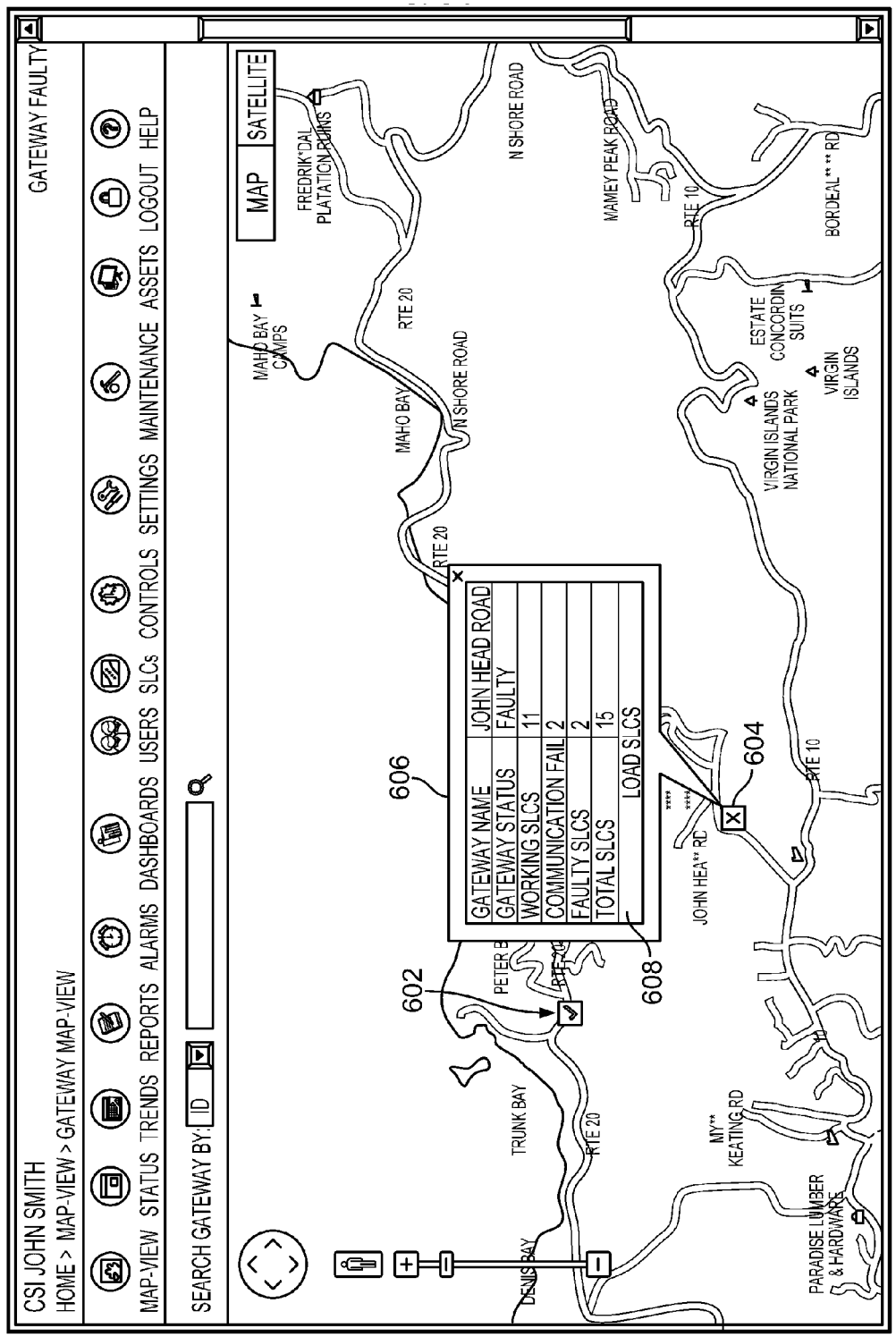

In some implementations, the map-based graphical user-interface can present representations of gateways 108 on the map-based graphical user-interface. Additional information pertaining to the gateway 108 can also be displayed. As shown in the example user interface depicted in FIG. 6, the representation of the gateway 108 can depend on the status of the streetlights in communication with the gateway. In some implementations, if the streetlights communicating with a gateway 108 are functioning normally (e.g., no fault condition has been detected), the corresponding gateway 108 can be represented, for example, by a green check mark 602. If a streetlight communicating with a gateway 108 is faulty, the corresponding gateway 108 can be represented, for example, by a red "x" 604. In some implementations, a user can obtain additional information pertaining to a gateway 108 by selecting (e.g., clicking on) the representation for the gateway 108. The additional information can appear in the form of a secondary interface such as a pop-up window 606. The pop-up window 606 can include, for example, an identification of the gateway 108, a status of the gateway 108, the number of normally functioning streetlight controllers 104 in communication with the gateway 108, the number of streetlight controllers 104 with communication faults, the number of faulty streetlight controllers 104 communicating with the gateway, and the total number of streetlight controllers 104 communicating with the gateway. In some implementations, the gateway pop-up window 606 can include a "load" link 608. A user can load information on all streetlight controllers communicating with a gateway 108 by selecting (e.g., clicking on) the "load" link 608. A user may expand the representation of the gateway 108 to view the representations of the streetlights that are connected to the gateway 108 on the map-based graphical user-interface 302.

In some implementations, a cluster of streetlights can be selected, configured and controlled using the map-based user interface. For example, a user can select a cluster or group such that a lighting schedule can be assigned to the cluster. A control signal can be initiated to be sent to a cluster, for example, to turn on or turn off the streetlights included in the cluster. In some implementations, a dimming signal can be sent to a cluster, dimming the streetlights included in the cluster. A user can zoom in on a cluster of streetlights to cause the graphical user-interface to display the streetlights individually (e.g., not in clustered form). This way, a control signal or management operation (e.g., a lighting schedule) can be initiated for an individual streetlight.

Figure 7:
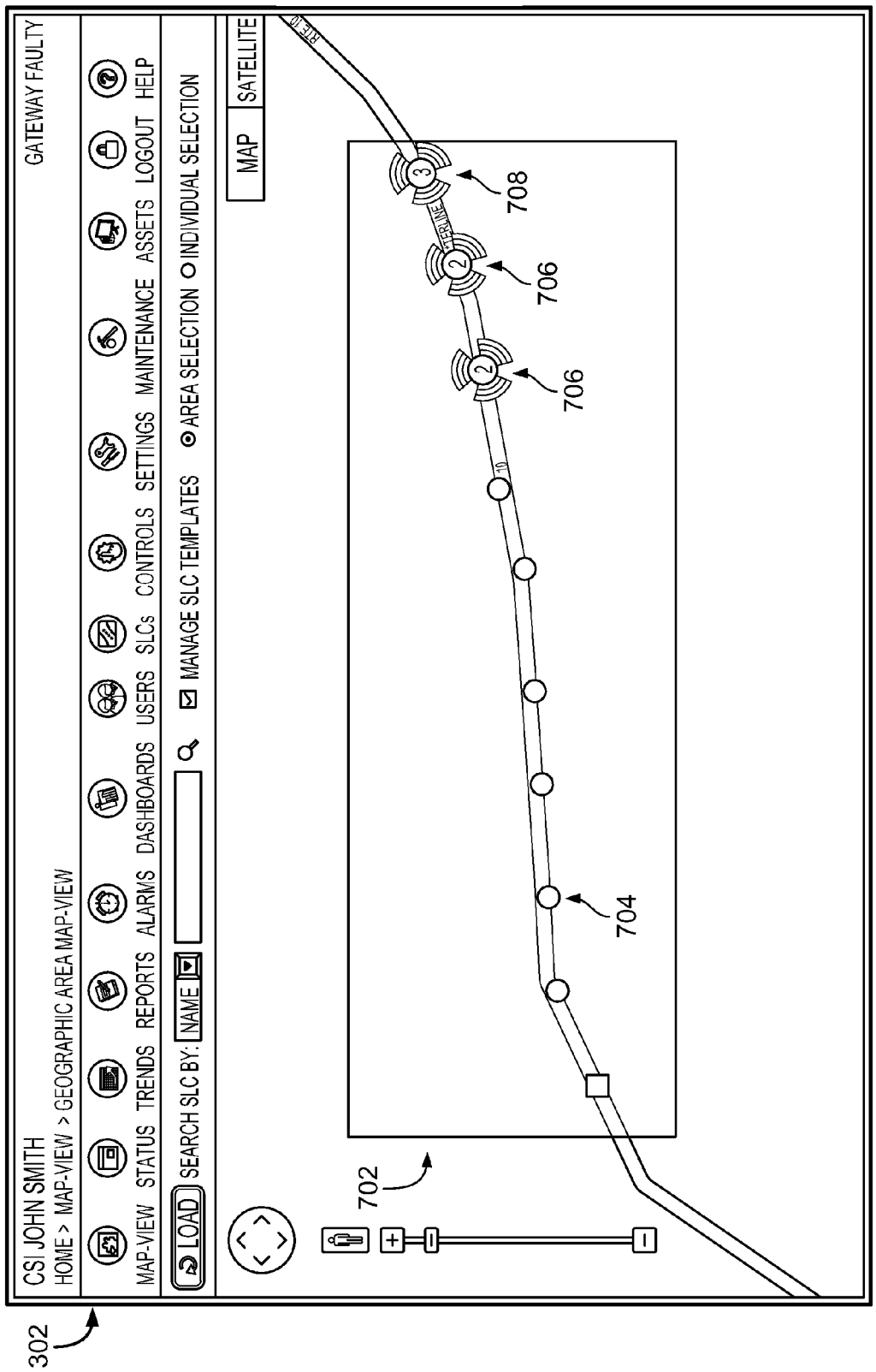

The application can include grouping features and functionalities to configure, control, and monitor a large number of streetlights. In some implementations, streetlights can be grouped manually by individually selecting representations of the streetlights on the map-based graphical user-interface 302. Referring to FIG. 7, an area selection box 702 can be used to select streetlights 704 and clusters of streetlights 706, 708. In the example shown in FIG. 7, the area selection box 702 is used to select seven individual streetlights 704, two clusters of two streetlights each 706, and one cluster of three streetlights 708. That is, fourteen streetlights are selected and defined as a group in this example. A group of streetlights can also be defined by individually selecting the streetlights or streetlight clusters that are to be part of the group.

In some implementations, streetlights can be automatically grouped by the application. In some implementations, automatic grouping can be determined based on, for example, one or more of: location information such as the geographic coordinates of the streetlights, the total number of streetlights, the time of year, the amount of light from each streetlight that is estimated to reach the ground, the geographic features of the area, and other environmental parameters. Geographic features can be measured and analyzed, for example, using satellite data. Geographic features can also be entered manually into the streetlight management application. Factors that can be measured include, for example, changes in road elevation, obstructions to the light from trees or neighboring buildings, lamp wattages, lamp life, and lamp light patterns. The application can consider these elements to automatically form appropriate streetlight groups. The application can also be configured to determine whether some streetlights included in the group can be turned off or dimmed at certain times to achieve an acceptable level of lighting. For example, alternate streetlights in a series of streetlights can be switched off in some areas (e.g., where an abundance of light is not needed), and/or at certain times (e.g., between the hours of 1 AM and 4 AM) to achieve savings in power consumption. In some implementations, one or more streetlights can be dimmed in some areas and/or at certain times.

In some implementations, once a group of streetlights is selected, a lighting schedule can be assigned to the group, as described below. Control signals can be sent to individual streetlights or groups of streetlights. In some implementations, an activation signal can be sent to a group of streetlights. In some implementations, a dimming signal can be sent to a group of streetlights.

Figure 8:
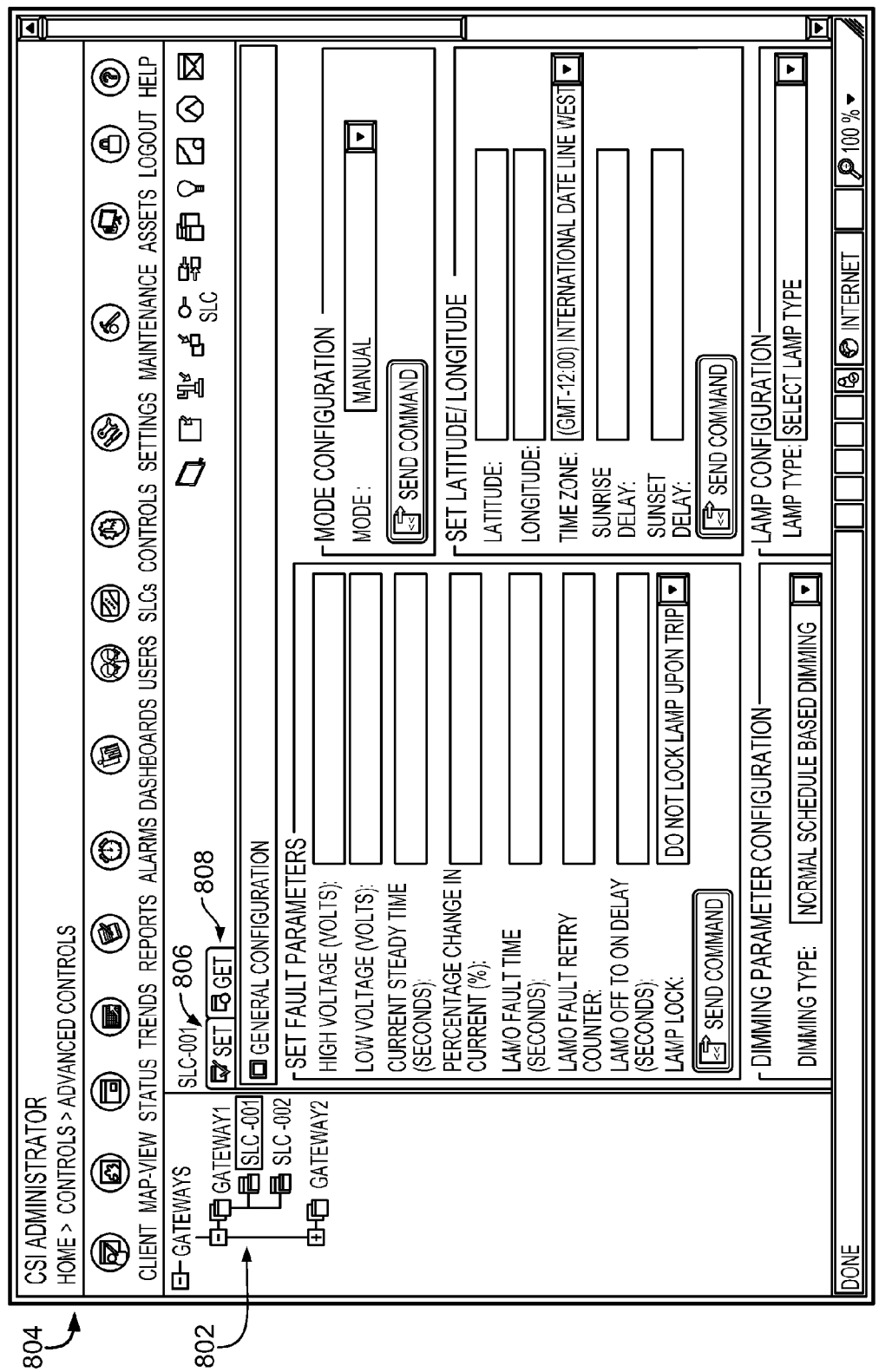
Figure 9:
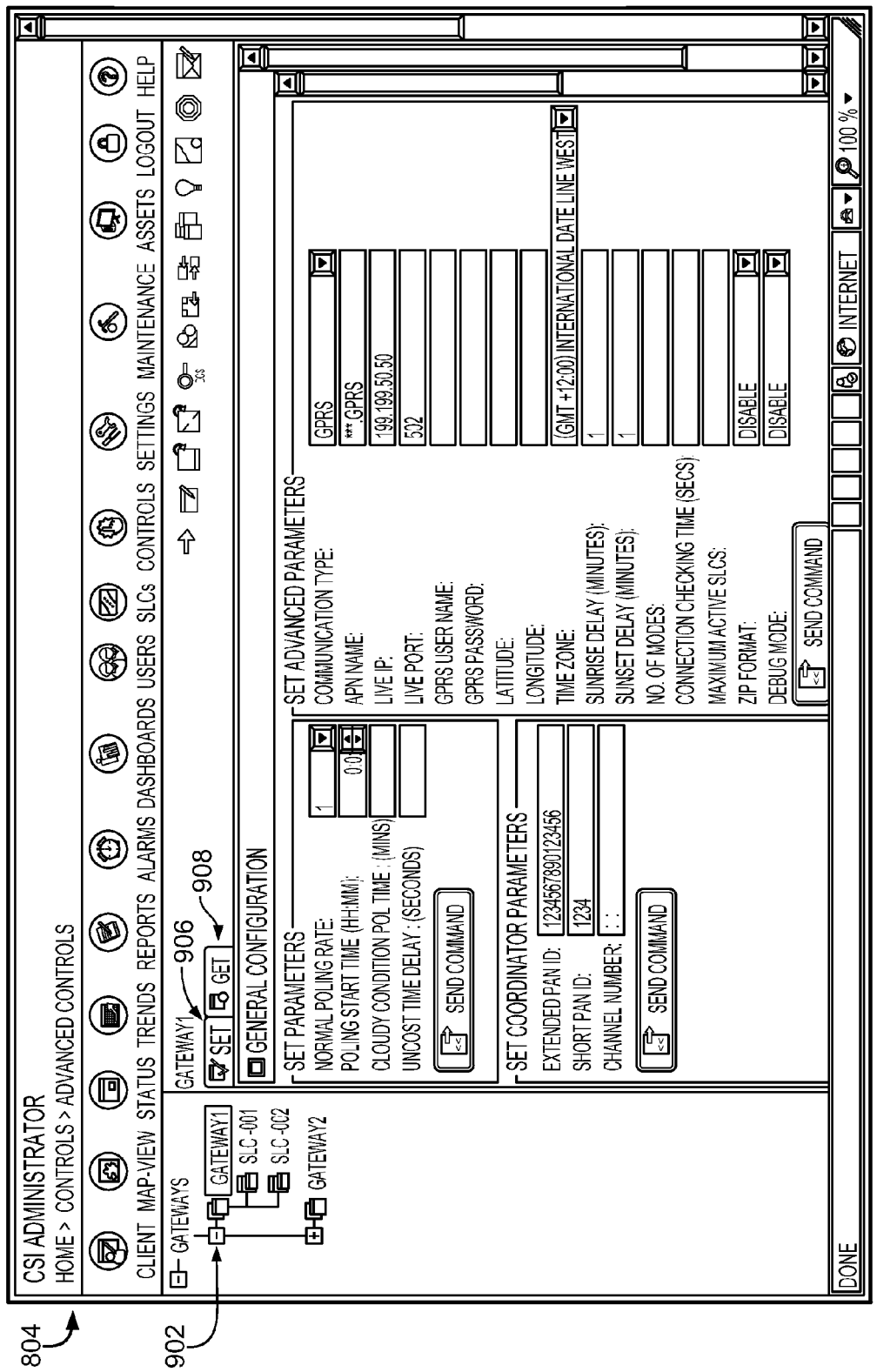

In some implementations, the application can provide configuration screens for viewing and setting configurations for individual streetlights or groups of streetlights. The application can provide a single screen for configuring one or more streetlight controllers and viewing the current configurations of one or more streetlight controllers. Referring to FIG. 8, configurations can be sent to a particular streetlight controller (or a group of streetlight controllers), for example, by selecting the streetlight controller 802 (or a group of streetlight controllers) in the selection pane 804, selecting the "set" tab 806, and entering configuration parameters in the main window. A user can view the current configurations for the streetlight controller by selecting the "get" tab 808 and viewing the configuration parameters in the main window. Streetlight controller configurations can include mode, fault parameter settings (e.g., high voltage, low voltage, current steady time, percent change in current, lamp fault time, lamp fault retry counter, lamp off-to-on delay, lamp lock setting), dimming type, dimming delay time, gradual dimming time, latitude, longitude, time zone, sunrise delay, sunset delay, lamp configuration, and other parameters. Referring to FIG. 9, configurations can be sent to a gateway, for example, by selecting the gateway 902 in the selection pane 804, selecting the "set" tab 906, and entering configurations parameters in the main window. A user can view the current configurations for the gateway 108 by selecting the get tab 908 and viewing the configuration parameters in the main window. Configuration parameters for the gateway can include, for example, polling rate, polling start time, cloudy condition poll time, unicast time delay, personal area network (PAN) ID, channel number, and other parameters. A user can save streetlight controller or gateway configurations as templates for future use. In some implementations, a user can apply a saved configuration template to a new streetlight controller or gateway 108.

Figure 10:
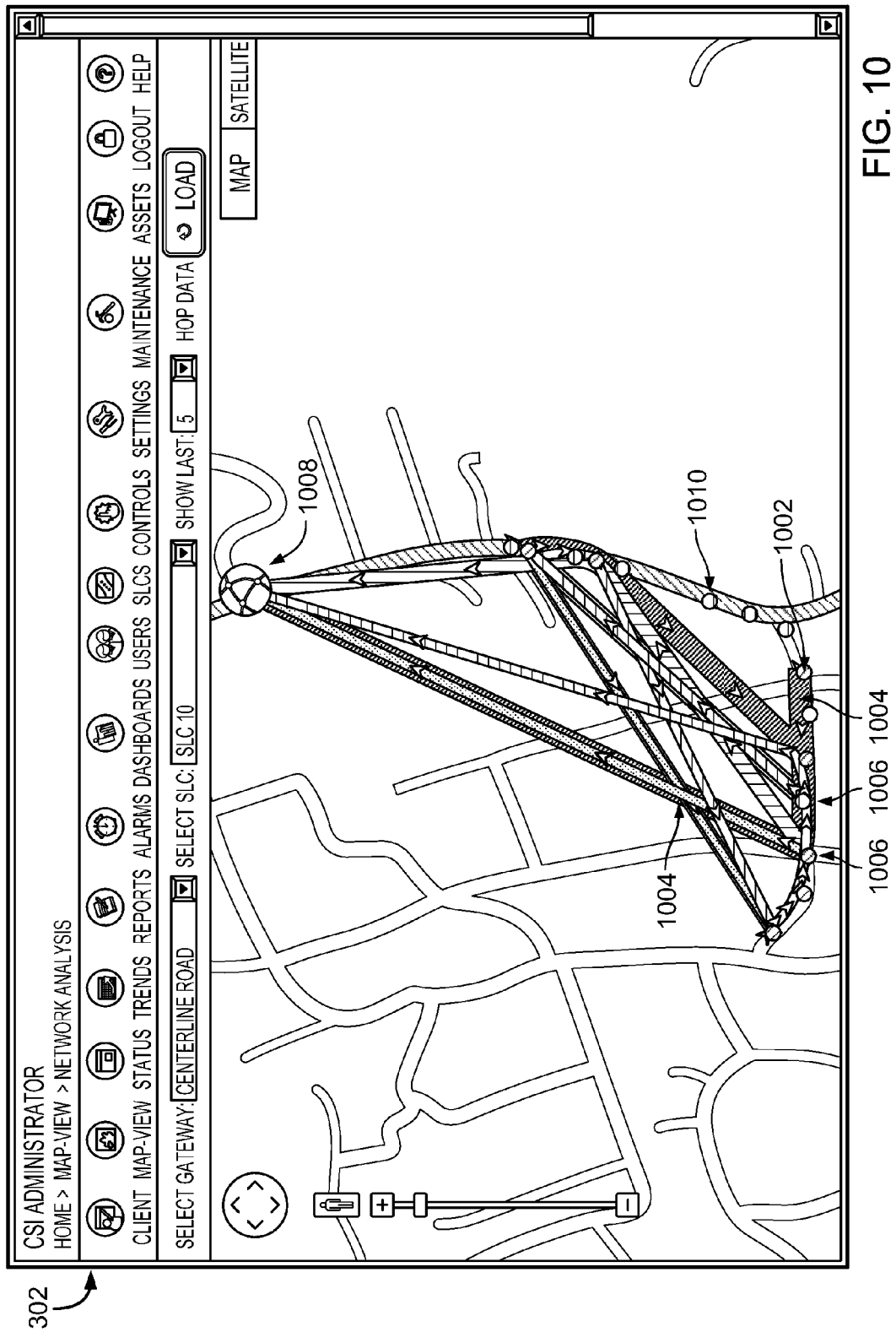

Referring to FIG. 10, the application can provide a representation of the communication paths of streetlight controllers on the map-based graphical user-interface 302. The representation shows the communication path between a selected streetlight controller and the gateway. In some implementations, a communication path 1004 of one streetlight controller 1002 is represented by a particular type of line characterized, for example by a particular color, pattern, or shading. The communication path 1004 runs to other streetlight controllers 1006 and eventually reaches the gateway 1008. In some implementations, the width of the communication path 1004 can depict the strength of the communication signal (e.g., the received signal strength indication (RSSI) value). The streetlight controller 104 can have a representation that indicates a connectivity status. In some implementations, the streetlight controller 104 that has network connectivity with the gateway 1008 can be represented by a circle of a particular color such as green (e.g., streetlight controllers 1002 and 1006). The streetlight controller 104 that does not have network connectivity with the gateway 1008 can be represented by a circle of another color such as red (e.g., streetlight controller 1010). The absence of a communication path 1004 between a streetlight controller 104 and a gateway or another streetlight controller can indicate a segment where a wireless connection is not established. A maintenance worker can determine the locations of communication breaks by looking at the map-based graphical user-interface 302. The application can report when the streetlight controller 104 has lost network connectivity with the gateway 1008 through an alert. The alert may be presented through the graphical user-interface. The alert may be communicated via email or SMS.

In some implementations, a user can zoom in and out of the map-based graphical user-interface 302 to view the communication path 1004 in more detail or less detail. The application can have an option to view data relating to recently established communication paths 1004 (e.g., the last ten communication paths established). A user can use the data to determine how new communication paths affect the overall communication performance of the network.

Figure 11:
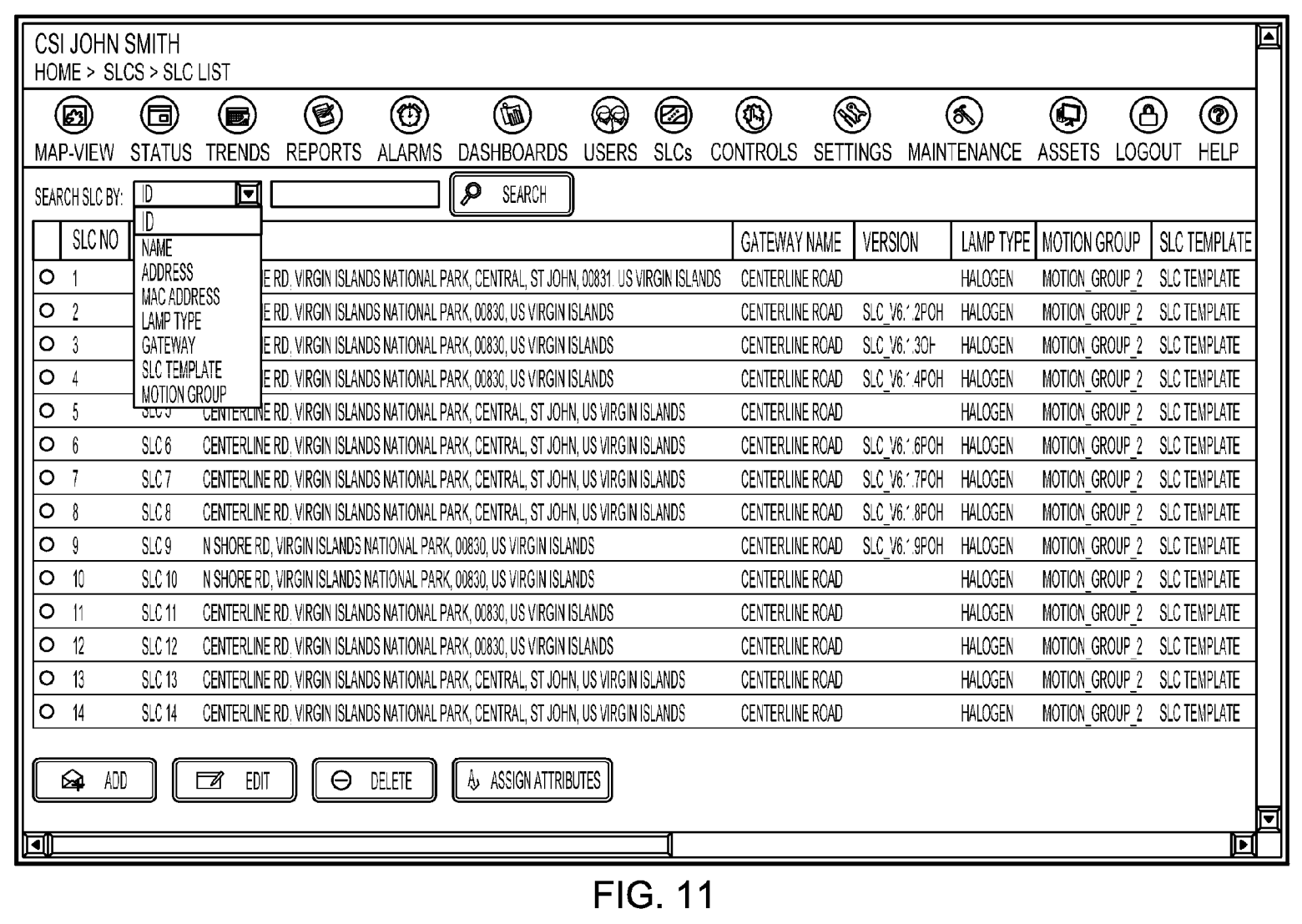
Figure 12:
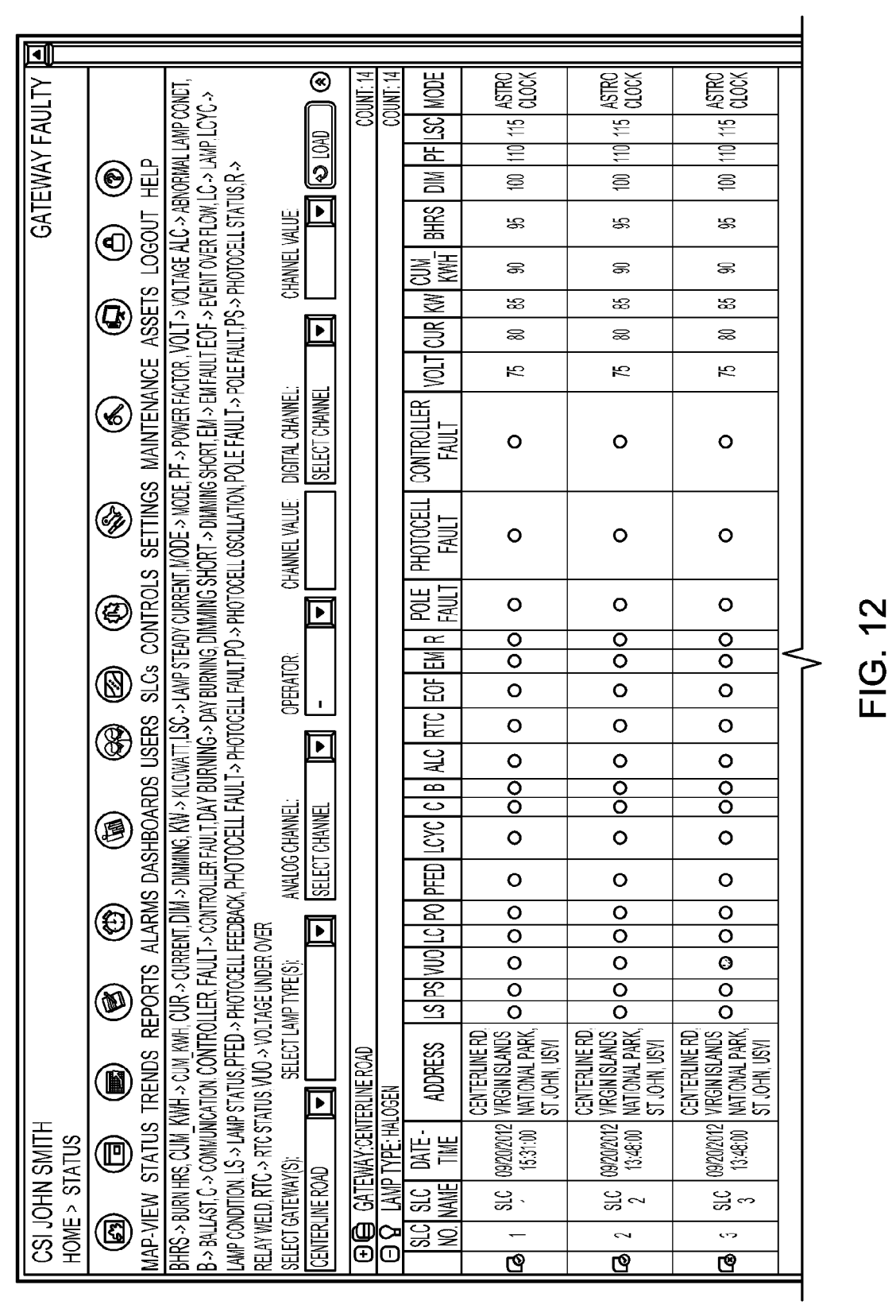

The streetlight management application provides tools to keep streetlight controller information and gateway information organized and easy to find. In some implementations, quick filters are available for a user to quickly access data of interest. Referring to FIG. 11, a user can search for a streetlight controller, for example, by identifier, name, address, MAC address, lamp type, gateway, streetlight controller template, or motion group. Referring to FIG. 12, a user can search for streetlight controller status information based on, for example, power parameters, status parameters, gateway 108, lamp type, analog channel values, or digital channel values. A user can search for other users based on, for example, domain information, user status, or user category. A user can search for maintenance issues based on, for example, date, type of fault, controller, or address.

Figure 13:
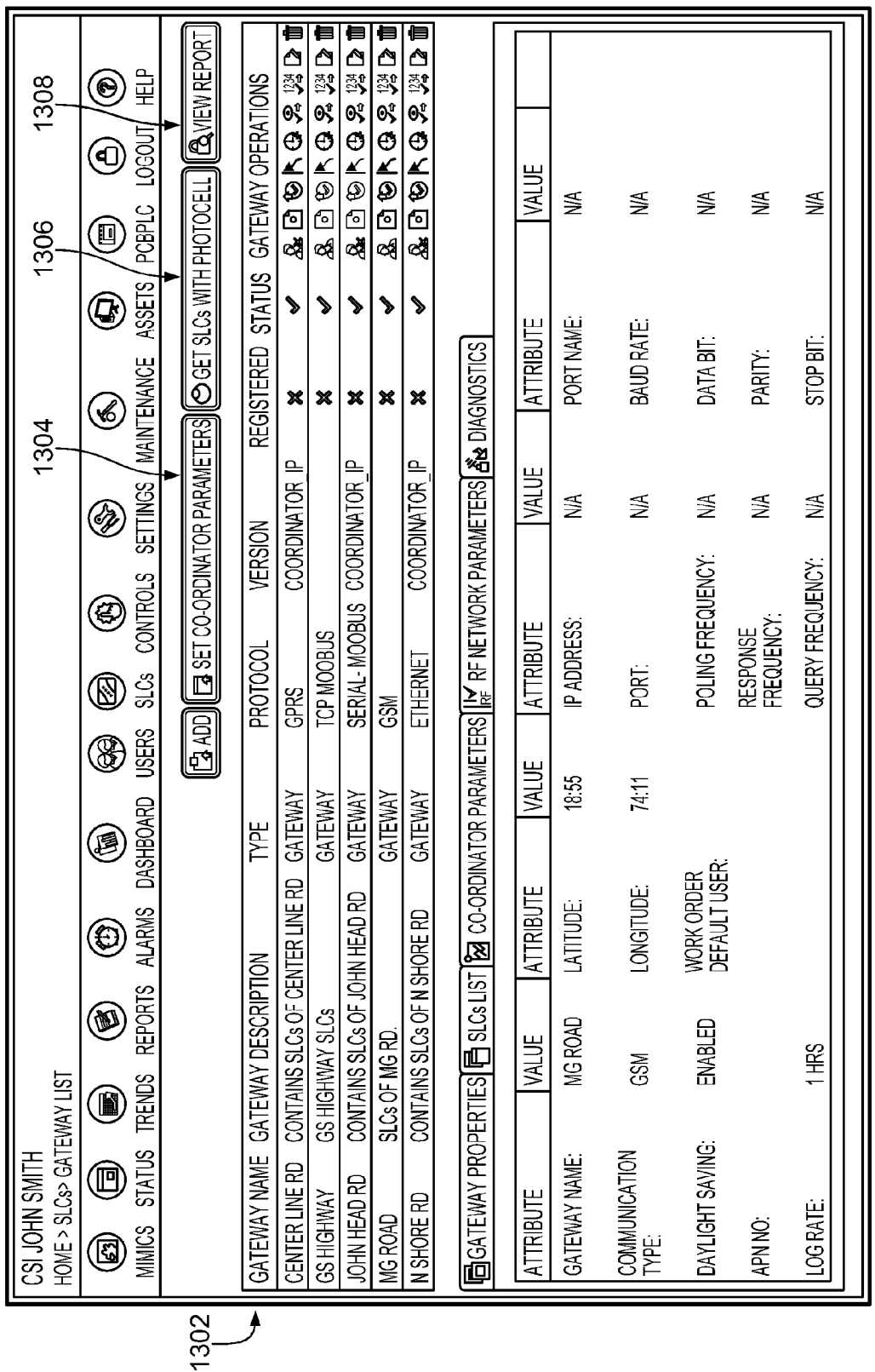

Referring to FIG. 13, in some implementations, streetlight controller gateways 1302 can be displayed on a single page. Gateway configuration, monitoring, and receiving/sending of related commands can be done from the same page without having to navigate to different parts of the interface. Controls for various functions (e.g., setting of coordinator parameters 1304, getting list of streetlight controllers 104 having a photocell installed 1306, viewing the streetlight controller-gateway mapping report 1308, user assignment for work orders, and registering of gateways) can be provided in the form of icons and buttons on the page.

In some implementations, a configuration screen can be provided to configure gateways 108 and streetlight controllers 104 together from one page of the user interface. Similar configurations can be applied across various streetlight controllers 104 and gateways 108. In some implementations, a configuration can be applied to a single streetlight controller. In some implementations, a configuration can be applied to a group of streetlight controllers 104. In some implementations, a configuration can be applied to all streetlight controllers 104 that are assigned to a particular gateway 108. In some implementations, a configuration can be applied to one or more gateway 108.

Figure 14:
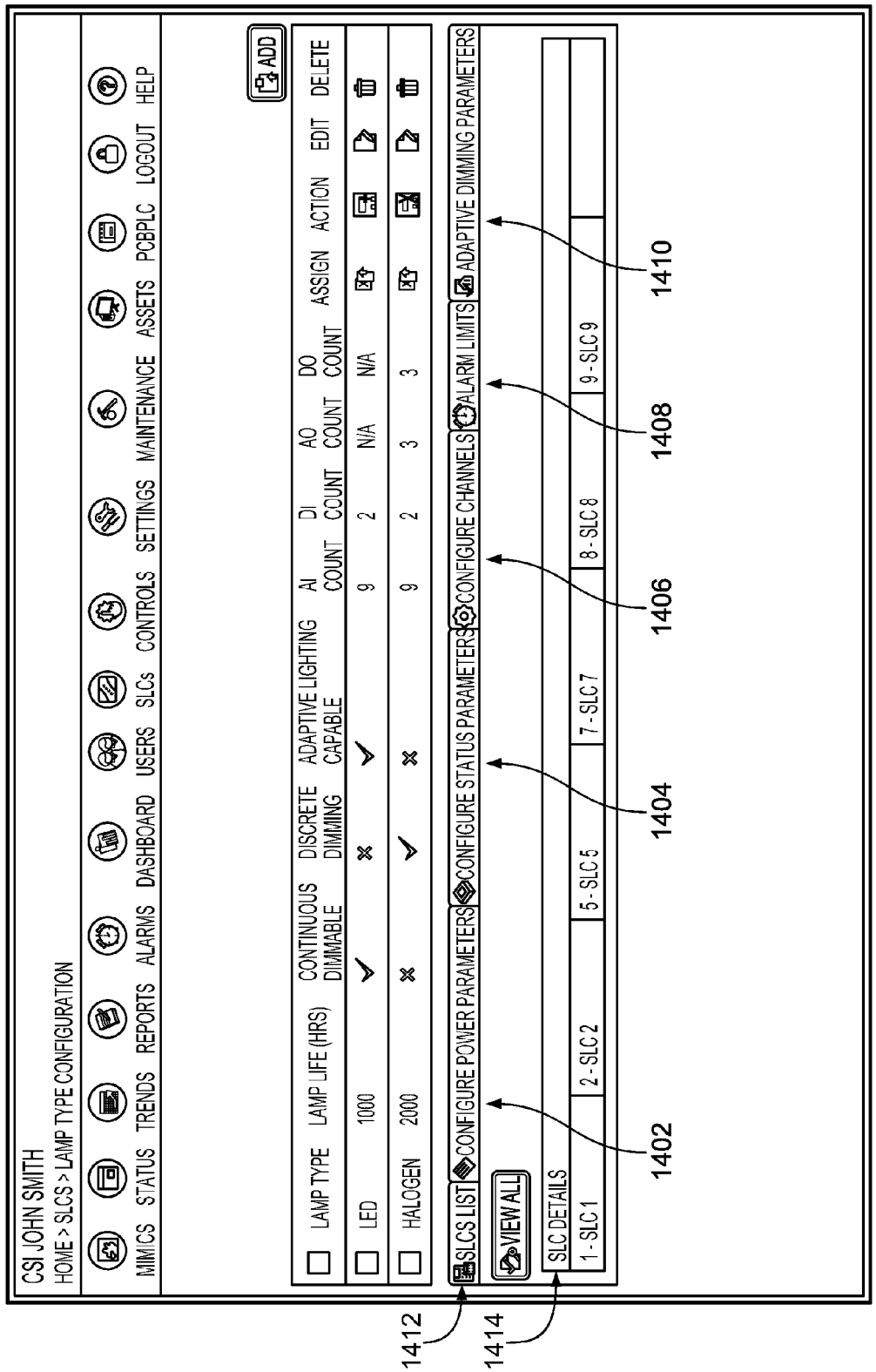

Referring to FIG. 14, in some implementations, various configuration options can be displayed on a page. The configuration options can include, for example, power parameters 1402, status parameters 1404, channels 1406, alarm limits 1408, and adaptive dimming parameters 1410. The configuration options can be represented in the form of tabs 1412 of a secondary window 1414. Selecting a tab 1412 can cause information relating to the selected configuration option to display within the secondary window 1414. In some implementations, the secondary window 1414 can simultaneously display configuration, control, and monitoring features related to the selected configuration options.

Figure 15:
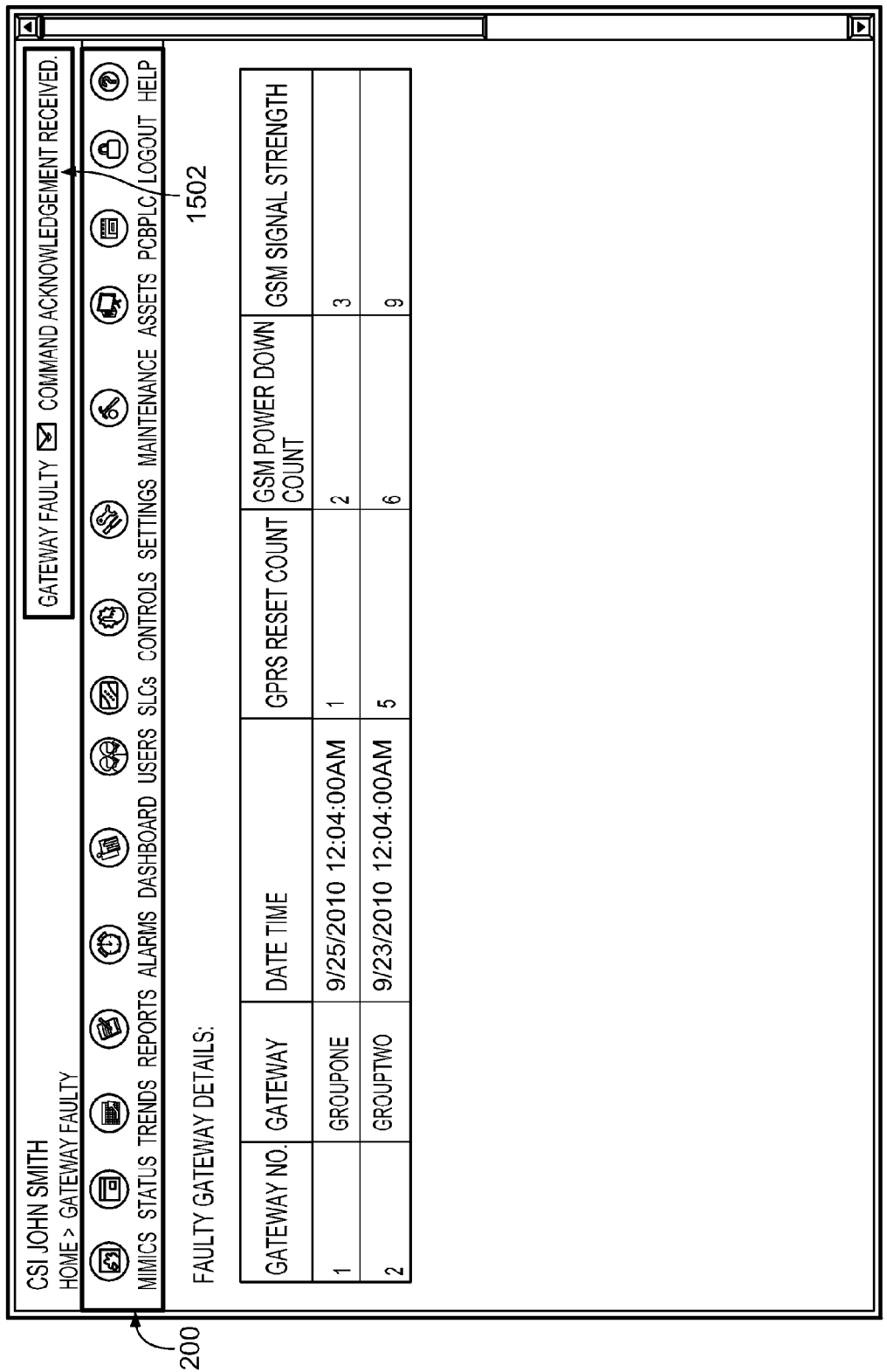

The streetlight management application can include tools for notifying users and field personnel (e.g. a maintenance person) if an event of interest occurs. Referring to FIG. 15, in some implementations, live alerts 1502 can be provided to notify users of communication failures, faults, and command acknowledgements in real-time or without significant delay. The live alerts 1502 may be displayed in such a fashion as to catch the attention of the user. In some implementations, a live alert 1502 can flash on the screen. In some implementations, live alerts 1502 can be color-coded. The color of the live alert 1502 can indicate its severity. In some implementations, a red alert is relatively more severe than a yellow alert. Users can obtain more information relating to the live alert 1502 by accessing the icon in the navigation pane 200 that the alert pertains to. In the example shown in FIG. 15, a live alert 1502 pertaining to a gateway communication fault is displayed.

In some implementations, a live alert 1502 can trigger an alarm. In some implementations, an alarm can trigger a live alert 1502. Referring back to FIG. 2, historical information and live trends relating to alarms can be accessed by selecting the alarms icon 210 in the navigation pane 200. In some implementations, a user can click on a live alert 1502 to access related alert or alarm information.

In some implementations, a user can configure or personalize alerts. For example, an alert can be created to notify appropriate personnel in the event a link with a gateway 108 is not established. In another example, an alert can be created to notify appropriate personnel in the event a link with a gateway 108 is not established for a pre-specified amount of time. In addition to receiving live alerts 1502 through the application, a user can configure alerts to be delivered, for example, via SMS and/or email. Alerts can be configured to be sent to particular maintenance persons or other personnel. Alerts can be configured to be sent to all personnel. Alerts can be configured to be sent to the maintenance person who is assigned to the asset (e.g. a streetlight 102 or gateway 108) from which the alert originated.

The streetlight management application can be configured to store command history. Referring to FIG. 16A, in some implementations, a user can track sent commands and view their delivery statuses. A command list 1602 can display recently sent commands. For each command in the command list 1602, the send date/time 1604, command details 1606 (e.g., whether the command was sent to an individual streetlight controller or a group of streetlight controllers 104), gateway name 1608, command status 1610 (e.g., whether the command has successfully sent), and command name 1612 can be displayed. Commands that fail to reach the streetlight controller can be re-sent from the same interface. Commands that have successfully reached the streetlight controller can be cleared from the command list 1602. In some implementations, a command that fails to reach the streetlight controller can trigger a live alert 1502.

Figure 16B:
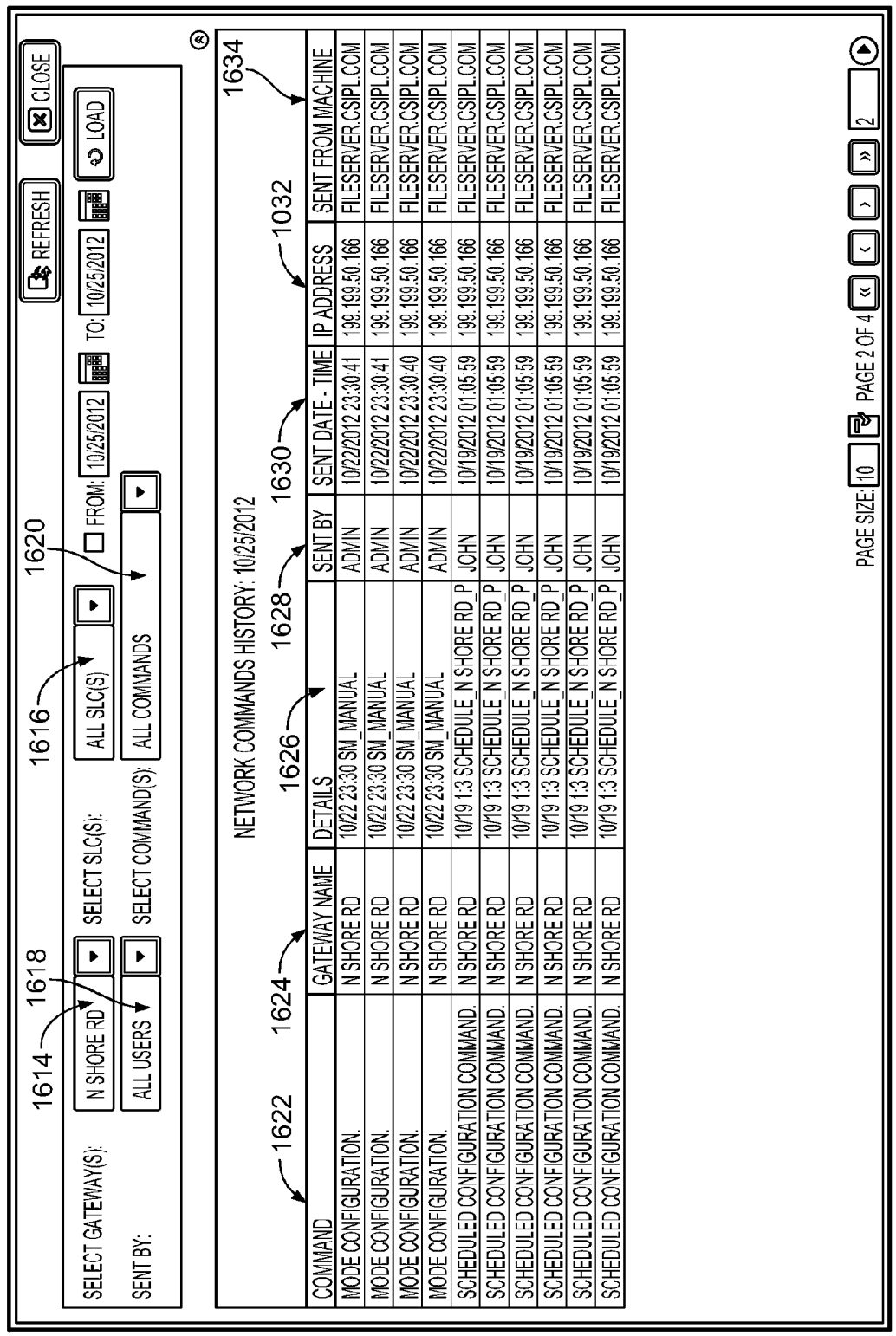

Referring to FIG. 16B, a user can filter the command history using, for example, the gateway filter 1614, the streetlight controller filter 1616, the sending user filter 1618, and the command filter 1620. The command history can include, for example, the type of command sent 1622, the gateway name 1624, the command details 1626, the sending user 1628, the send date/time 1630, the IP address from which the command was sent 1032, and the machine from which the command was sent 1634.

Figure 17:
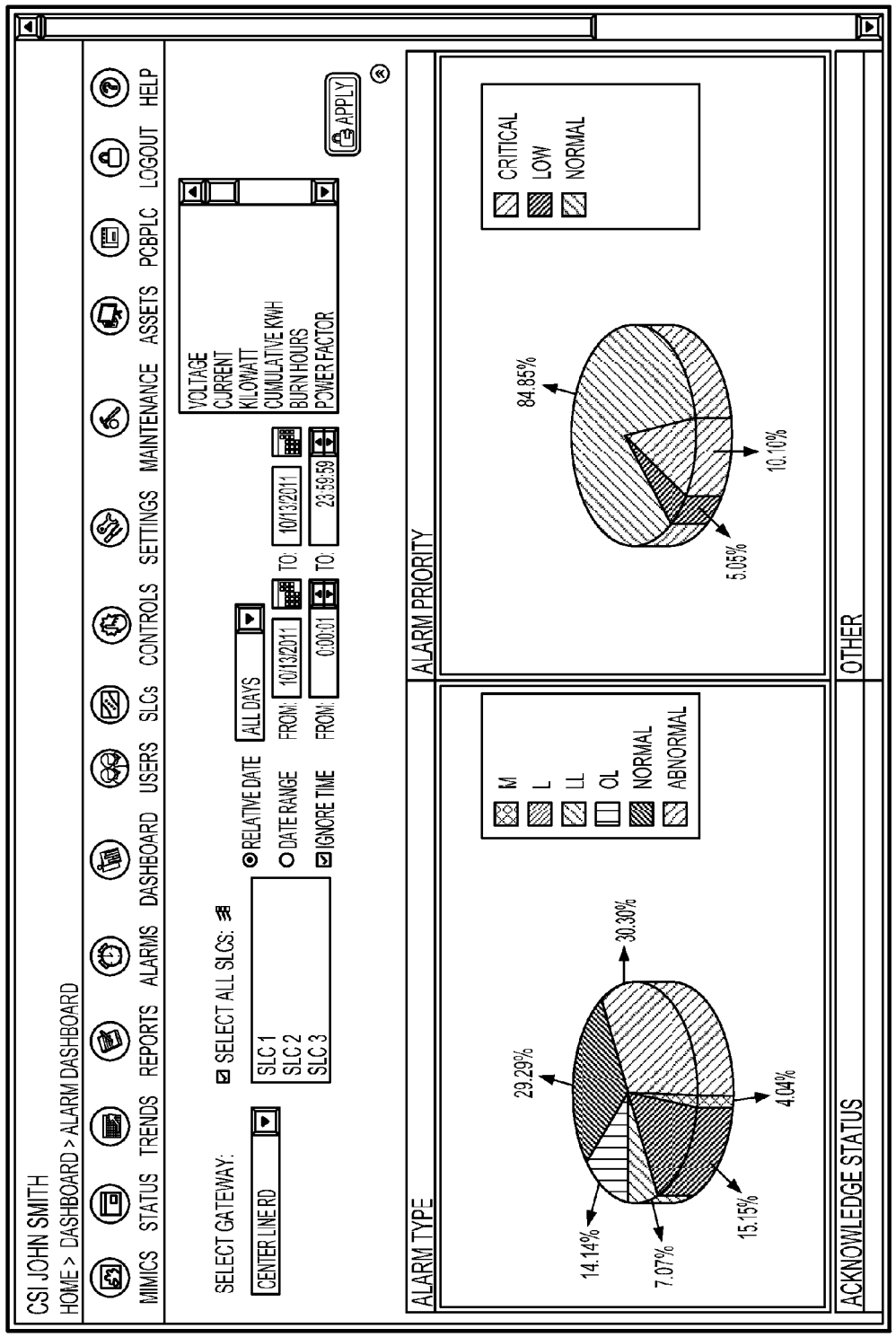
Figure 18:
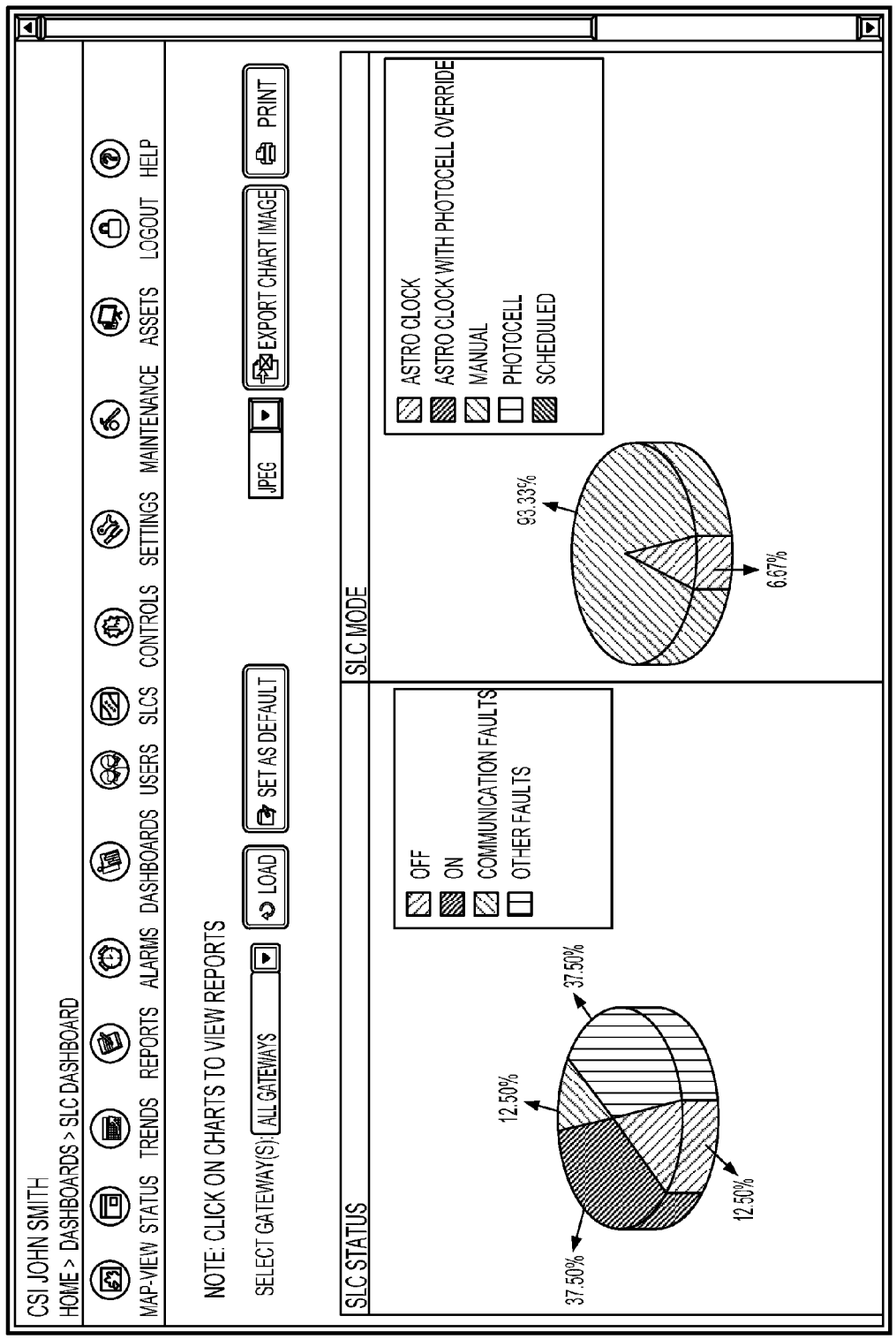
Figure 19:
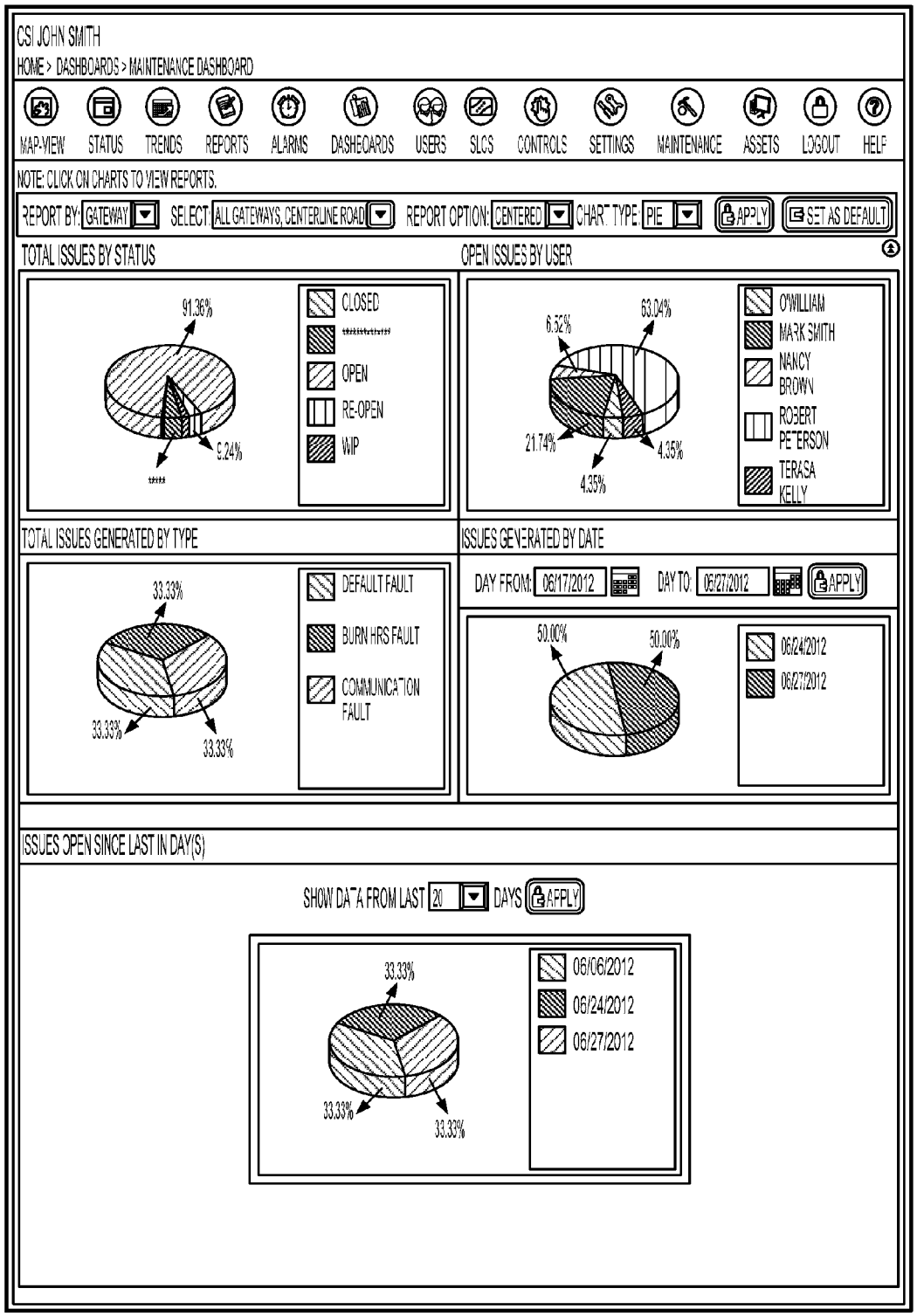
Figure 21A:
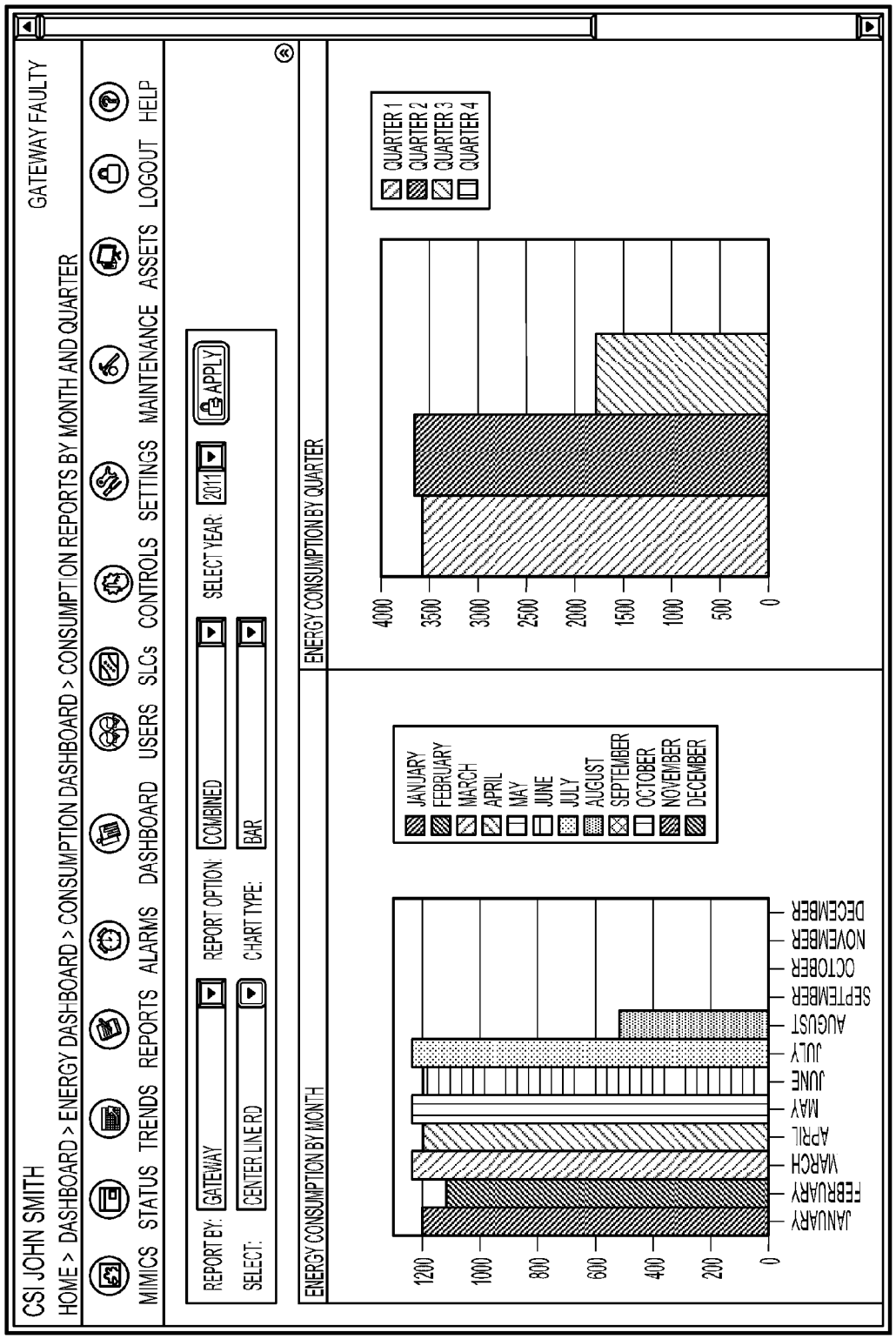
Figure 21B:
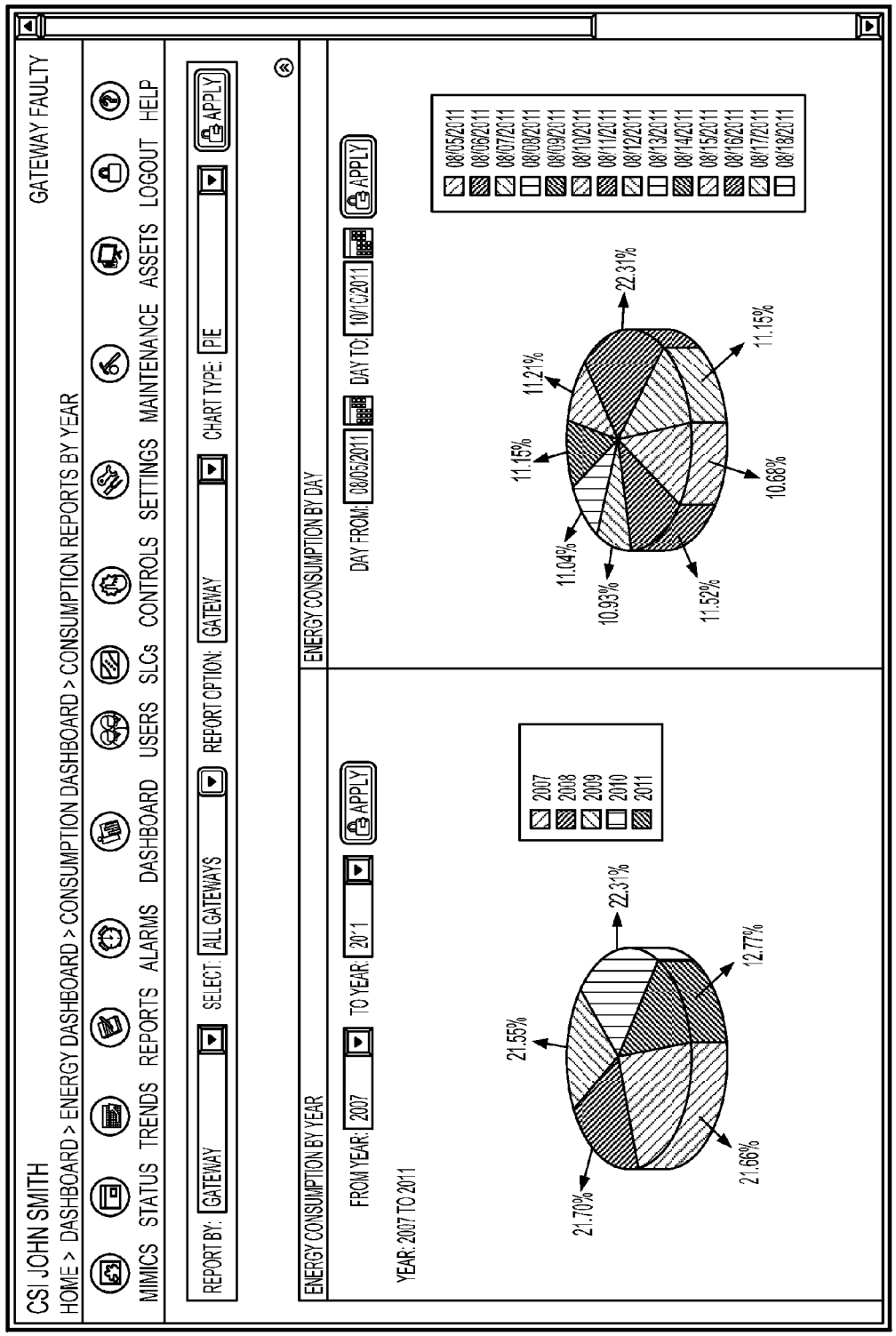
Figure 22:
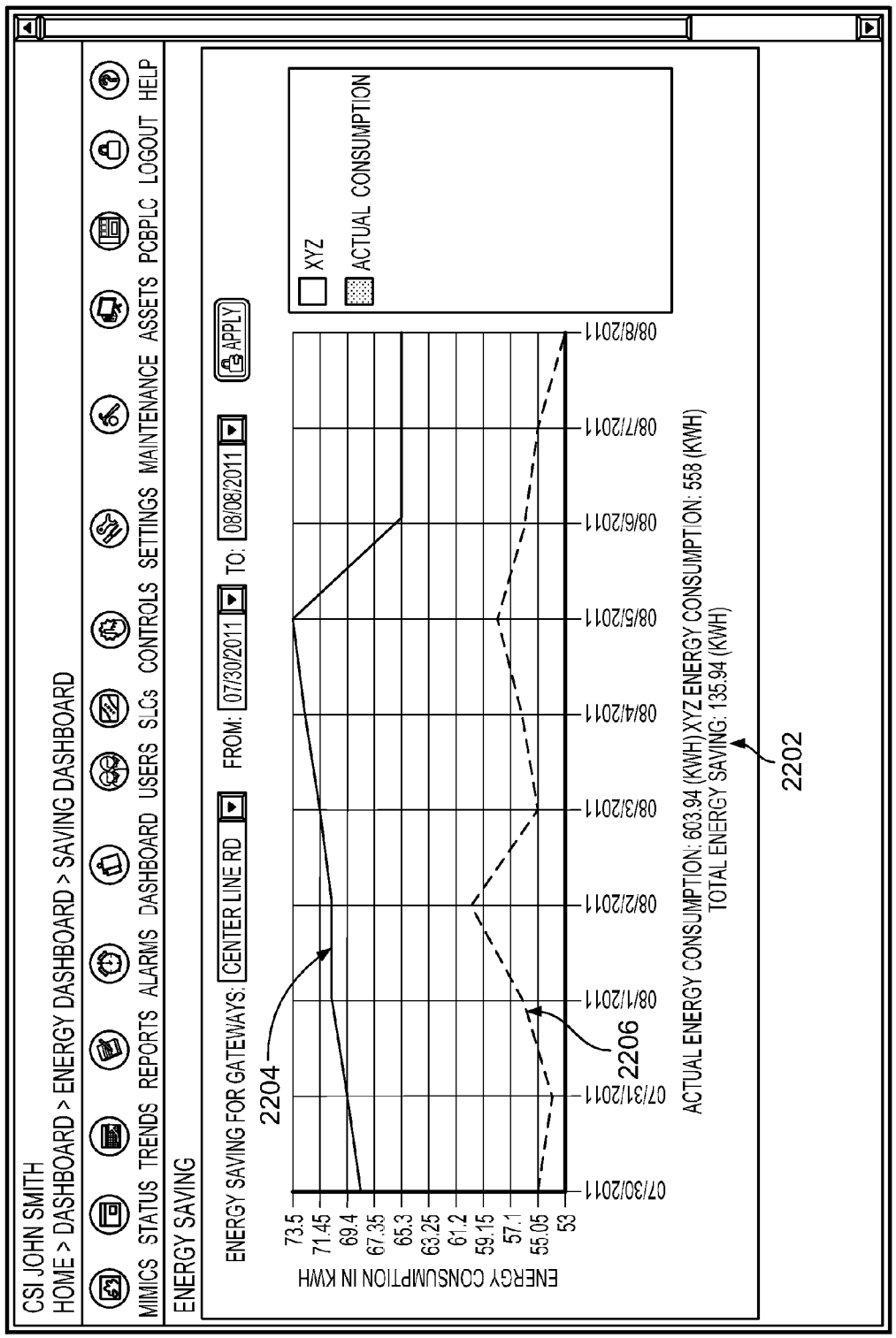

The streetlight management application can include a number of report generation tools. In some implementations, the application is can generate reports and dashboards pertaining to alarms (FIG. 17), streetlight controller status and faults (FIG. 18), maintenance (FIG. 19), burn hours (FIG. 41), exceptions (FIG. 20), energy consumption (FIGS. 21A-B), and energy savings (FIG. 22). Customization options are available for altering the appearance of the report or dashboard. Filtering options are also available for specifying the desired content.

Figure 23:
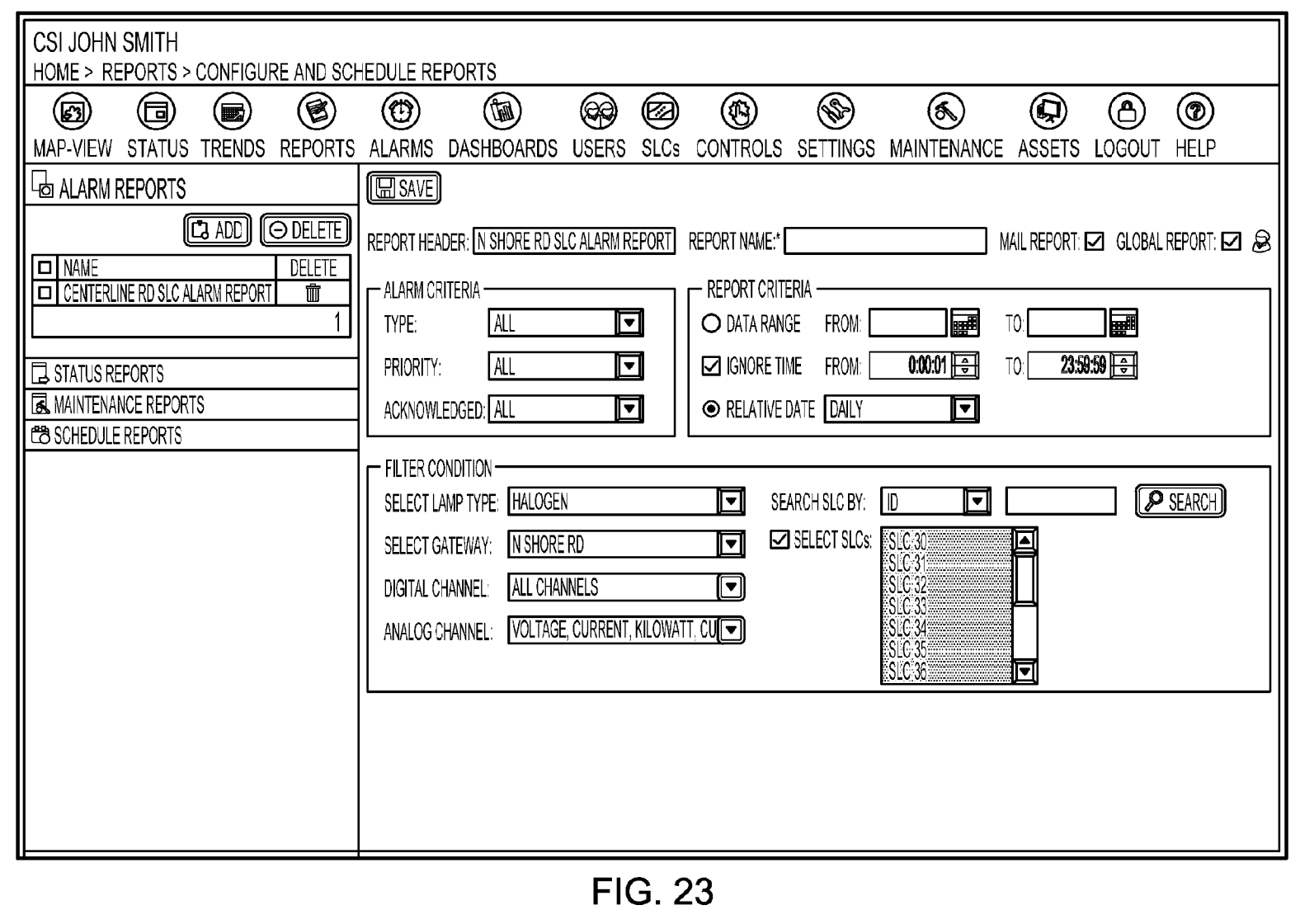

In some implementations, one or more reports can be scheduled to be automatically delivered. Referring to FIG. 23, a single page or form can include options for alarm reports, status reports, and maintenance reports. Selecting one of these reports types, e.g. by clicking on it, can open options pertaining to the report type. A user can configure automatic delivery for these reports. In some implementations, the user can instruct the system to send a report to a specified user at a specified frequency.

In some implementations, the reports and dashboards can have "drill-down" or narrowing capability. A user viewing a dashboard or a report can move from a broad view of summary information to a narrower view of detailed data. In some implementations, a user can "drill down" by clicking on a representation of summary information to reveal more detailed data.

Figure 26:
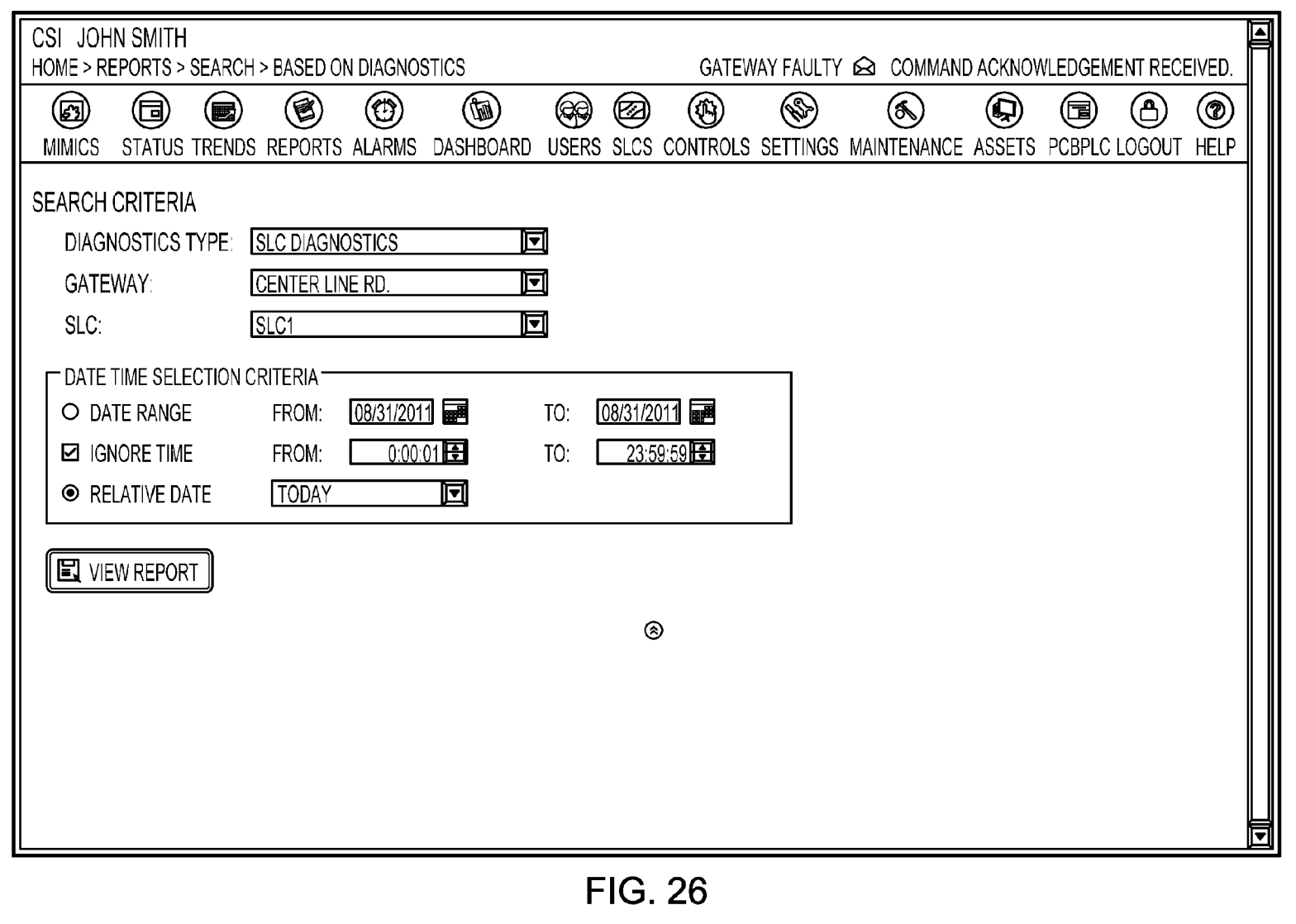
Figure 27:
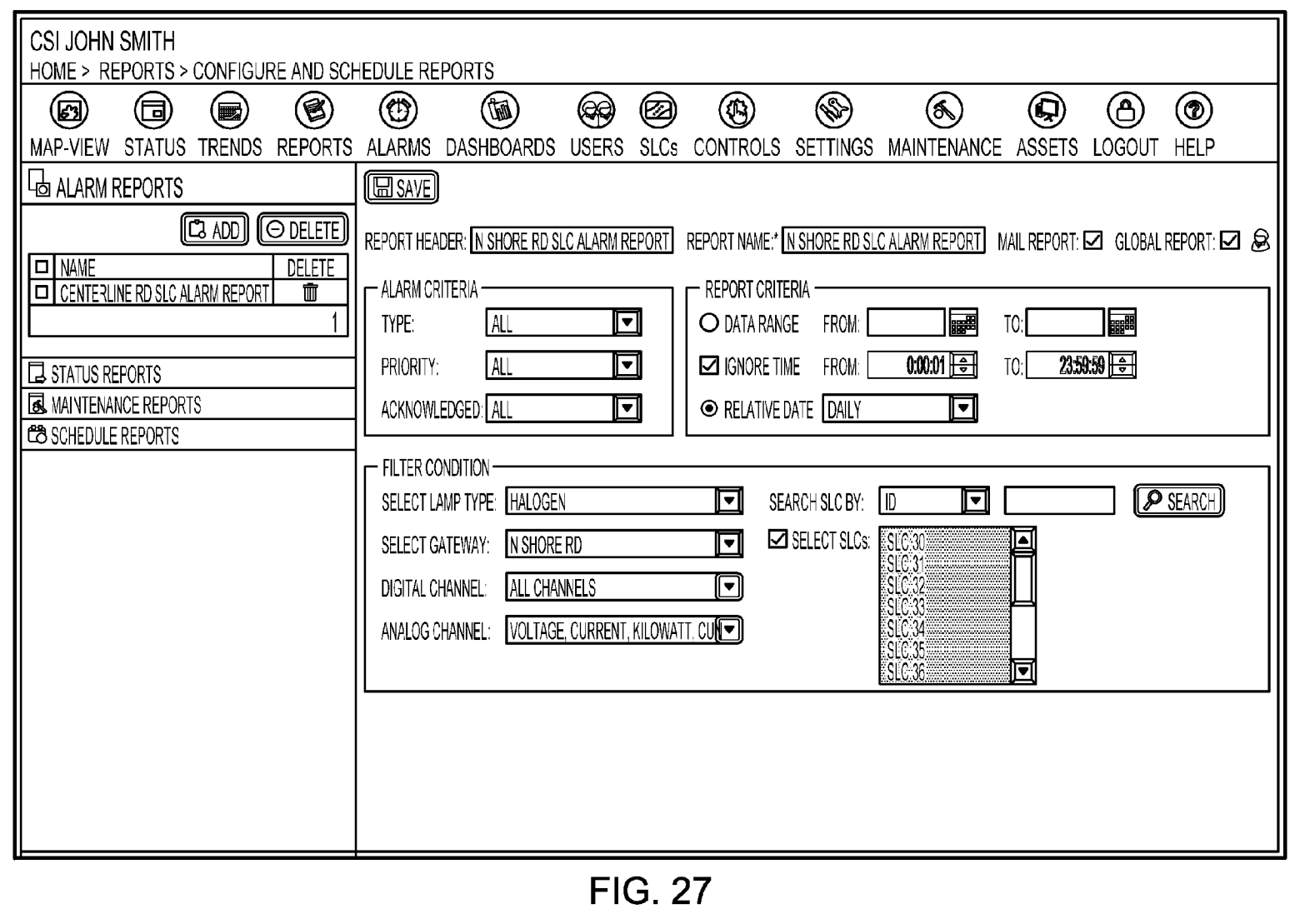

An example of an interface for searching for reports is shown in FIG. 26. An example of an interface for configuring and scheduling a report is shown in FIG. 27. In some implementations, a user can configure and schedule alarm reports, status reports, maintenance reports, and schedule reports. In some implementations, a user can select one or more alarm criterion for the report. In some implementations, a user can configure and schedule a report for one or more streetlight controllers 104.

In some implementations, the application can have a command tracking feature to ensure that streetlight controllers 104 are in their expected state. The streetlight controller 104 that is in an unexpected state can be damaged by subsequent commands. A streetlight controller 104 in an unexpected state can also lead to unsafe lighting conditions. In some implementations, a command for the streetlight controller 104 can originate from the streetlight management application. The command can be sent to a gateway (e.g., the gateway 108 that the streetlight controller is assigned to). The gateway 108 can send the commands to the appropriate streetlight controller. It is possible for a command to get corrupted or lost at some point over the course of these communications. The application can keep track of commands that are sent and verify whether commands are correctly received. In some implementations, a user can be notified if the streetlight controller 104 is not in an expected state. In some implementations, a user can be notified via a live alert.

Referring to FIG. 20, in some implementations, an exception report can display streetlight controllers 104 that have conflicting "set" and "get" commands. In some implementations, a user can issue a "set" command to put the streetlight controller 104 into a manual mode. In some cases, the command may actually never reach the streetlight controller. The application can issue a "get" command to read the streetlight controller's mode. The "get" command may indicate that the streetlight controller is in photocell mode. The exception report can indicate that a command did not successfully reach the streetlight controller 104. The exception report can include the set command date and the get command date.

In some implementations, the application can generate energy savings reports. Dimming capabilities and flexibility in managing the schedules of individual streetlights can allow for energy savings by using only the amount of light that is required for a particular circumstance. Referring to FIG. 22, the application can provide a calculation of energy savings 2202 that have occurred since implementing the streetlight management application system. The application can display the energy consumption in the form of a graph. In some implementations, a first line 2204 can represent energy consumption without implementation of the streetlight management system. A second line 2206 can represent energy consumption after implementation of the streetlight management system (e.g., using advanced lighting schedules, dimming, etc.).

Figure 24:
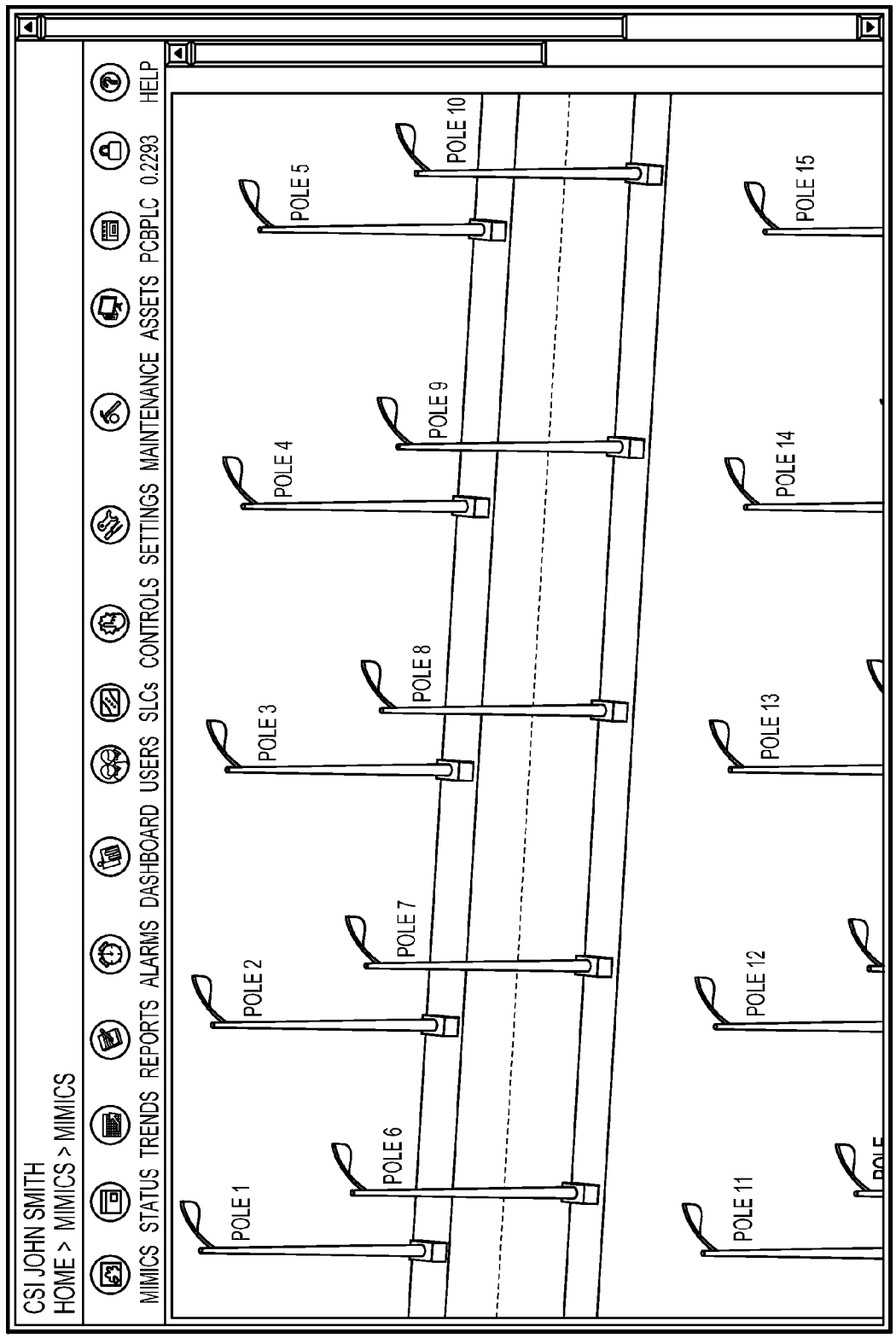

In some implementations, customized images can be used to configure a group of streetlights. For example, custom background images, cursor images, and streetlight images can be imported into the application. In some implementations, the custom background image can be a computer-aided design (CAD) drawing. The CAD drawing can be a schematic of an area where streetlights are to be grouped. The custom background image can be a street, walkway, indoor or outdoor parking facility, etc. In the example shown in FIG. 24, the custom background image is a street. A user can overlay representations of streetlights on the background image. The application can treat the representations of streetlights as light nodes, and a user can assign the light nodes to streetlight controllers 104. A user can group the light nodes, thereby grouping the respective streetlight controllers 104. A user can set configuration parameters and control signals to a defined group of streetlights. In some implementations, customized mimics can allow a user to visualize and configure a layout before it is implemented. In some implementations, customized mimics can be used to import an existing layout so that a user can visualize and configure it with the application.

Figure 25:
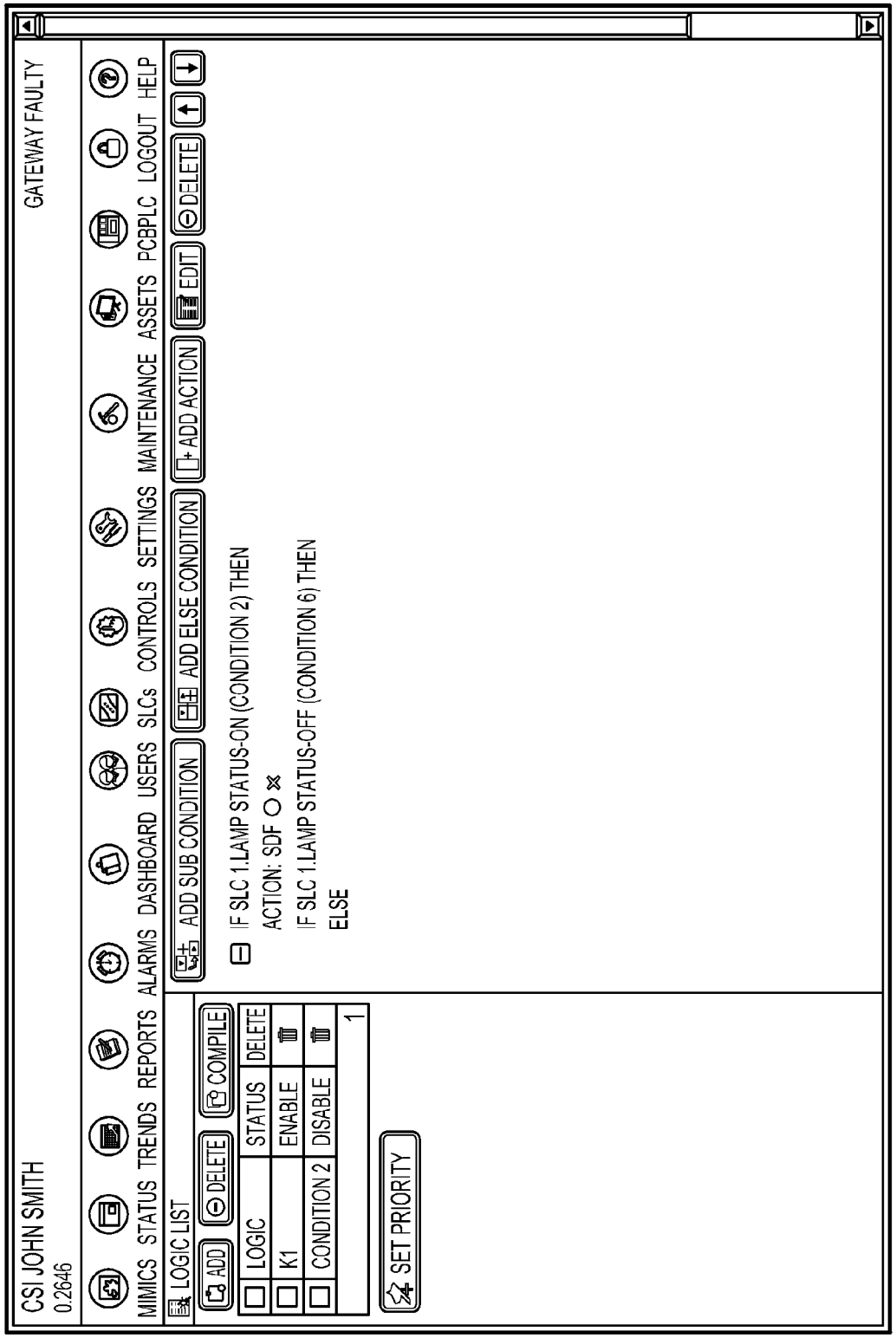

In some implementations, the application can include a logic generation feature. A user can configure the streetlight controller 104 to operate in a particular manner based on a number of inputs that the streetlight management system monitors. In some implementations, the inputs can include lamp status, lamp faults, power consumption, motion inputs, photocell inputs, etc. The logic can include conditional statements (e.g., if-then, if-then-else, elseif, etc.). In some implementations, the streetlight controller 104 that fulfills defined logical conditions receives one or more control signals. In some implementations, the streetlight controller 104 that satisfies defined logical conditions triggers the transmission of one or more control signals to one or more streetlight controller. In some implementations, the one or more control signals can include an activation signal and a dimming signal. Referring to FIG. 25, a logic generation screen can be used to create and organize logic. A user can create logic using buttons pre-configured with logical conditions. A user can create logic by typing it from scratch. A user can enable or disable created logic. A user can compile created logic. A user can assign a priority to created logic. A user can send created logic to one or more streetlight controller and instruct the streetlight controller to operate in accordance with the logic.

Figure 28:
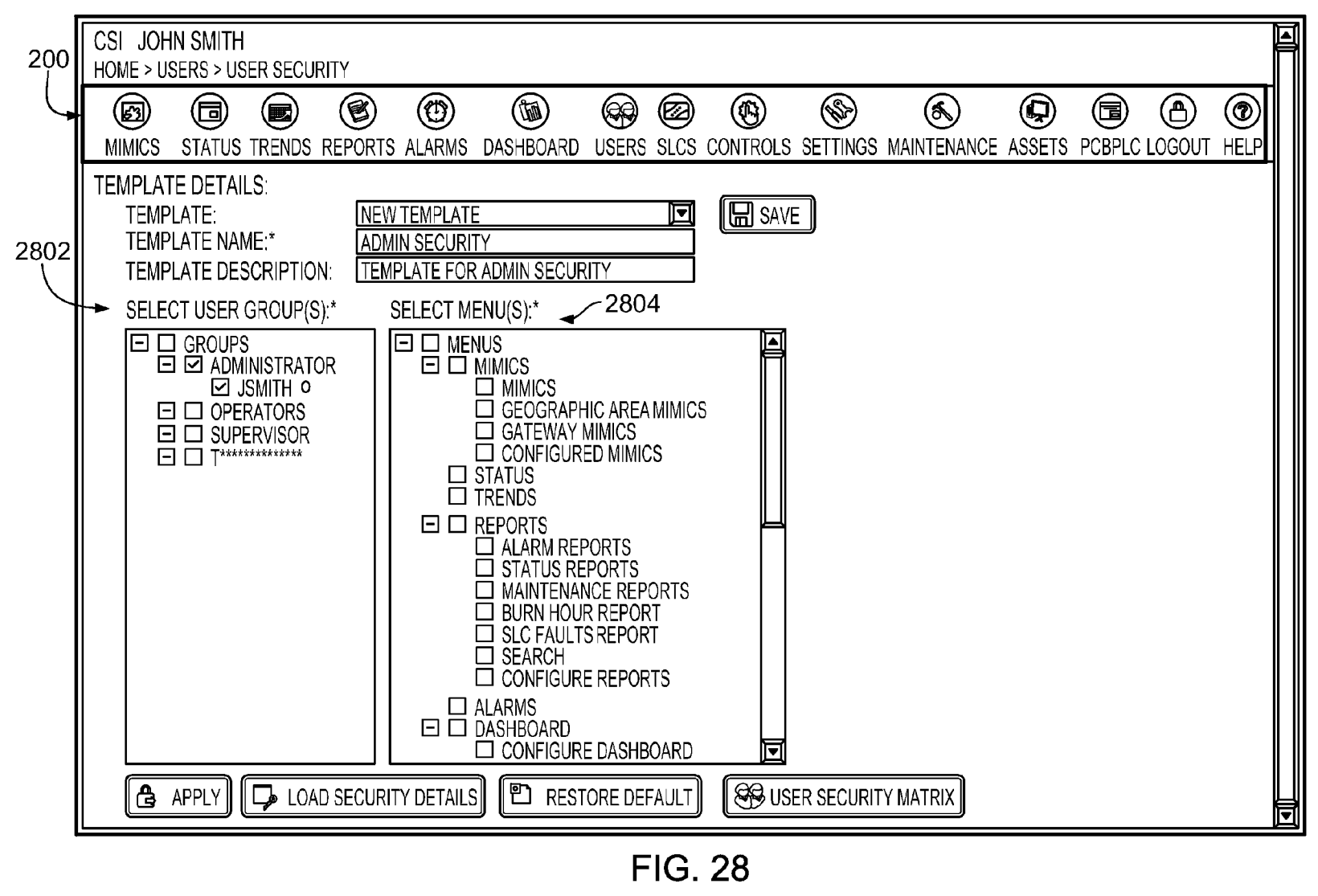

In some implementations, the application can include security customization options. Referring to FIG. 28, a system administrator can select the users that may have access to various menus. The system administrator can customize security for a user group selected using the user selection box 2802. Examples of user groups can include, for example, administrators, operators, supervisors, and technicians. Once a user group is selected, the system administrator can select the menus that the user group can have access to, using, for example, the menu selection box 2804. The system administrator can also customize security for individual users selected using the user selection box 2802, for example, by selecting the menus that the user can have access to. The menus can be selected using, for example, the menu selection box 2804.

In some implementations, a security matrix of gateway security assignments can be presented in a tabular form. Referring to FIG. 29, a checkmark can indicate a gateway 108 that a user is permitted to access, and an "x" can indicate a gateway 108 that a user is not permitted to access.

Figure 30A:
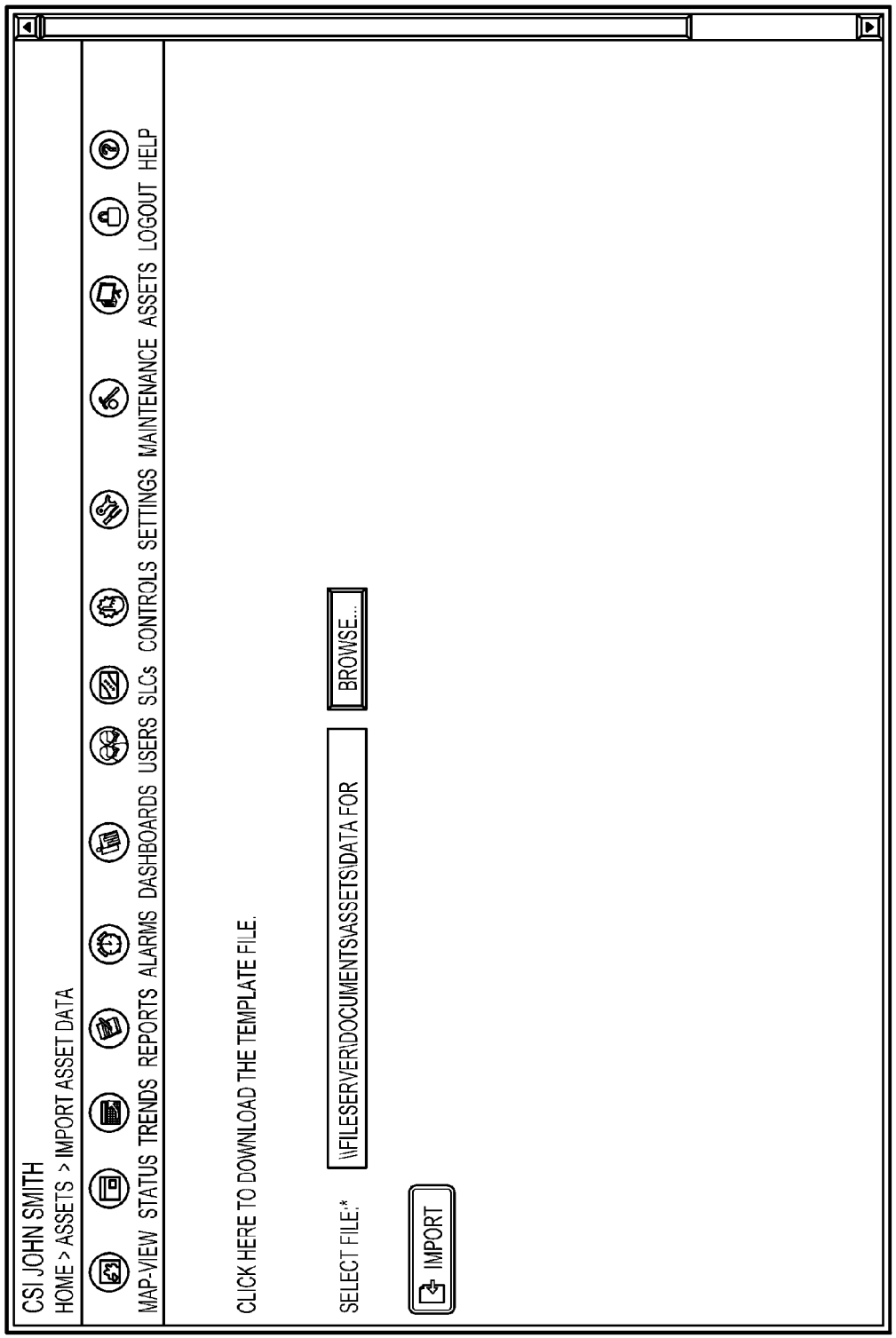
Figure 30B:
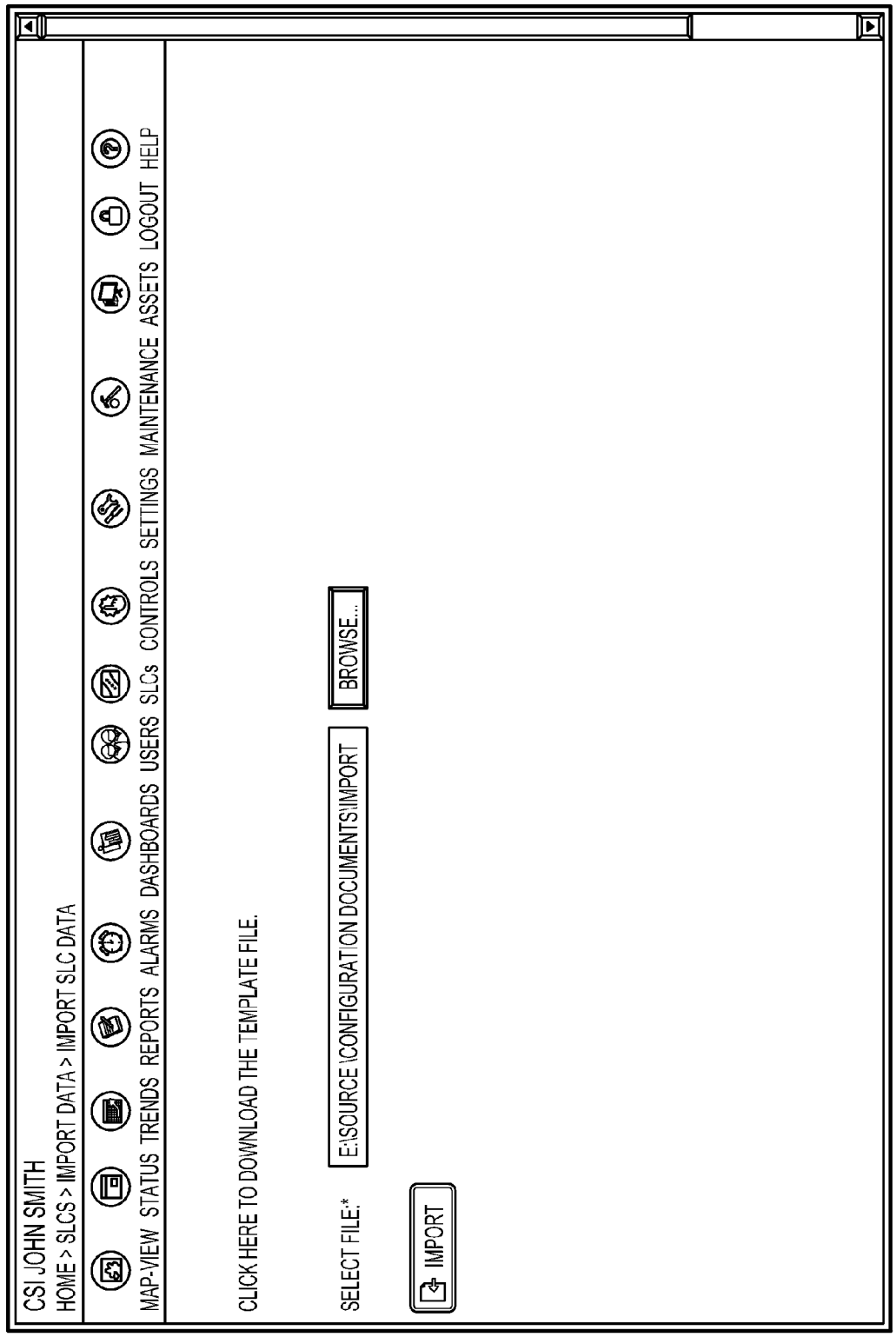
Figure 30C:
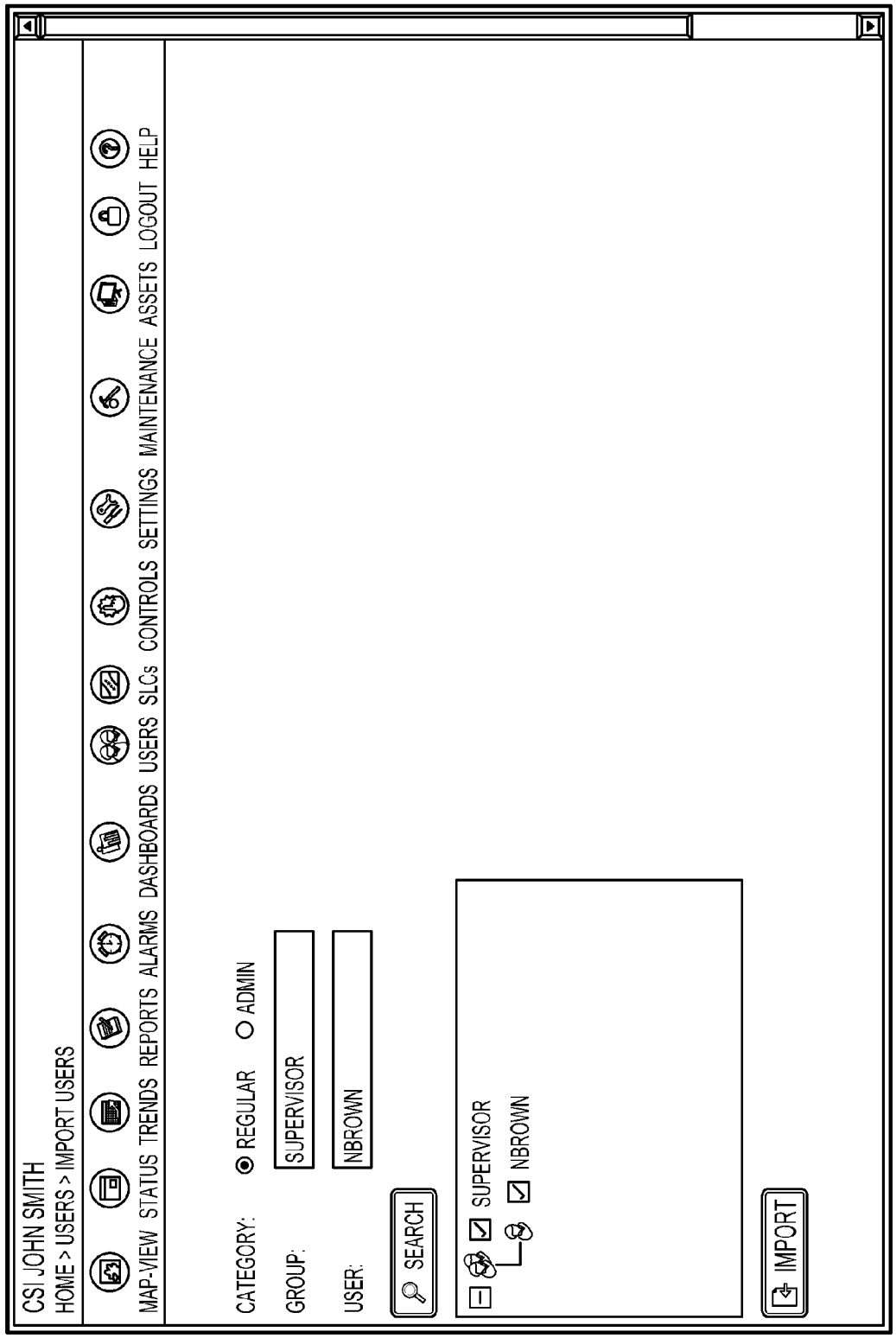

In some implementations, the application can be configured to accept and apply configuration information contained in one or more computer-readable files stored on a computer-readable storage device. A computer-readable file can include, for example, a spreadsheet. FIG. 30A shows an example of a user-interface using which a user can import, for example, asset data, streetlight controller data, or gateway data included in a spreadsheet document. FIG. 30B shows an example of a user-interface using which a user can import information pertaining to the company's existing users from the active directory.

Figure 31:
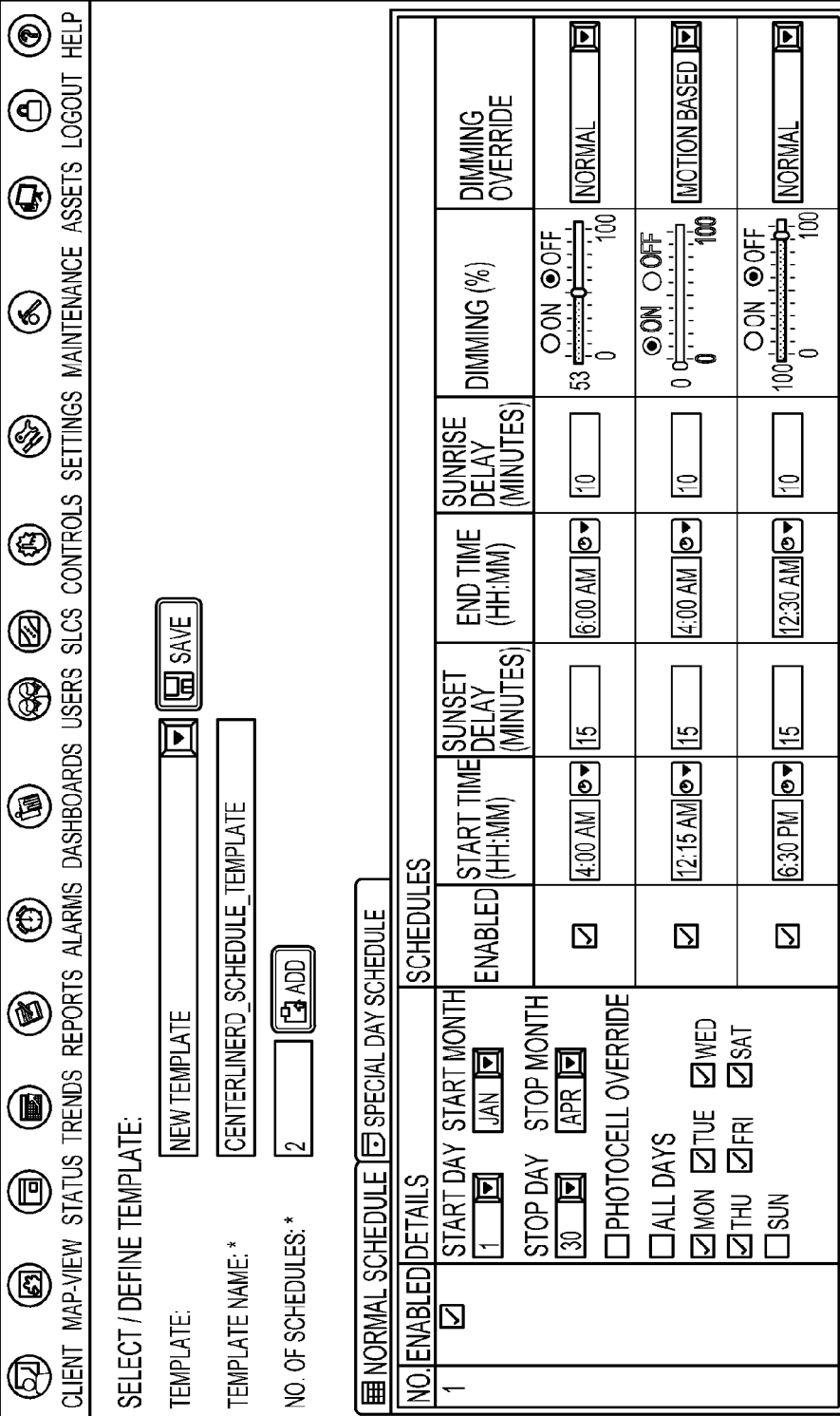

In some implementations, the application can include a feature for creating lighting schedules. Lighting schedules can be created from scratch by a user. In some implementations, the application may contain some pre-configured lighting schedules. Lighting schedules can be assigned to individual streetlights or groups of streetlights. FIG. 31 shows an example of a user interface using which a user can create various types of lighting schedules.

In some implementations, a lighting schedule can have a start date and a stop date. A user can specify on which days of the week the schedule will be enabled. In some implementations, a first lighting schedule can be applied to the streetlight controller 104 for weekdays, and a second lighting schedule can be applied to the streetlight controller 104 for weekends. The lighting schedules can specify one or more time periods for the streetlight controller to turn the streetlight on. The time period can be defined, for example, in terms of a time of the day (e.g., turn on from 12:00 AM to 6:00 AM), or in terms of an event such as sunrise and sunset (e.g., turn on from 10 minutes before sunset until 10 minutes after sunrise). Sunrise and sunset times can be automatically calculated by the application based on the location data of the streetlight controller. A user can define the sunrise and sunset delay in the application (e.g., the amount of time before sunrise the light turns on, and the amount of time after sunset the light turns off). The lighting schedules can include an option to enable a photocell-based override, explained in more detail below. The lighting schedules can include an option to enable dimming override. In some implementations, the dimming override can be based on motion detection. For example, a dimmed light can be turned brighter on detecting that a person is walking in the vicinity. The lighting schedules can include options for utilizing daylight harvesting (e.g., taking advantage of natural light when it is available). A user can assign a lighting schedule to an individual streetlight or a group of streetlights. As shown in the example of FIG. 32, a lighting schedule can be viewed or presented, for example, using a color-coded calendar display.

In some implementations, a group of streetlights can all have the same lighting schedule. In some implementations, the streetlights in a group of streetlights can have different lighting schedules. In some implementations, each streetlight in a series can have one of two lighting schedules assigned to it, such that alternate streetlights in the series remain on at pre-defined times (e.g., late at night when an abundance of light is not needed). In some implementations, alternate streetlights in a series can remain off at pre-defined times unless motion is detected.

In some implementations, a user can create one or more special day lighting schedules. A special day lighting schedule can be applied to a streetlight for one or more days. In some implementations, a special day lighting schedule may be appropriate when streetlights need to remain on later in the day than usual. In some implementations, a special day lighting schedule may be appropriate when streetlights can turn off earlier in the day than usual. In some implementations, a special ay lighting schedule may be appropriate when streetlights need to have more or less luminance than usual. In some implementations, a special day lighting schedule may be appropriate for a day with a special event that changes the area's lighting needs. For example, a special day lighting schedule may be applied for a construction crew that needs to work overnight on a particular day and needs maximum lighting. A user can assign a special day lighting schedule to an individual streetlight or a group of streetlights.

Photocell-Based Override of Default Lighting Schedules

In some lighting systems, streetlights can be controlled by photocells deployed on individual streetlights. When a photocell deployed on a particular streetlight detects a certain level of darkness (e.g., when the detected ambient light falls below a threshold), the photocell can send a control signal to turn the particular streetlight on. Conversely, when the photocell detects a certain level of light, the photocell can send a control signal to turn the particular streetlight off. In some cases, using a single photocell to control a particular streetlight can suffer from reliability issues. For example, if a photocell becomes dirty, the light measurements may be affected, resulting in undesirable lighting management.

The streetlights included in the streetlight management system described in this document include streetlight controllers 104. The streetlight controllers 104 can be customizable. For example, the streetlight controller 104 can include an astronomical clock that can compute sunrise and sunset times based on geographical location data. The streetlight controller can have a lighting schedule based on sunrise and sunset times. However, there may be situations where light conditions are poor during the daytime. For example, during abnormally cloudy conditions, severe rainstorms, or sandstorms, the ambient light can drop to a level that requires streetlights to be switched on. A photocell-based light-detection system can be helpful in such situations.

In some implementations, a photocell can be mounted inside the streetlight controller housing. The streetlight controller housing can have a transparent window to allow the photocell to detect ambient light. In some implementations, the streetlight controller 104 can include a receptacle capable of receiving an external photocell. An external photocell can have an electrical plug and can be coupled to the streetlight controller through the receptacle. The electrical plug and receptacle can be in accordance with standards used in the country or region where the streetlight is deployed. For example, in the United States, the electrical plug can be a three-pronged twist-locking plug in accordance with standards set by National Electrical Manufacturers Association (NEMA).

Figure 33:

In some implementations, one or more control signals that are delivered to a group of streetlights can be based on data from a subset of streetlights included in the network of streetlights. In some implementations, the streetlights in the subset can include photocells deployed in conjunction with the streetlight controllers. For example, five to ten streetlights in a group of hundred or more streetlights can include a photocell. FIG. 33 shows the example of a user interface using which a user can select the streetlight controllers 104 that are coupled to a photocell. The streetlight controllers 104 that are coupled to photocells can be designated as decision makers. In some implementations, the server 116 or a gateway 108 can monitor inputs from the decision maker streetlight controllers and use a combination of the inputs to determine if an abnormal weather condition has occurred. If a "dark condition" decision is reached, the server 116 or the gateway 108 can turn on all streetlights that have been configured as part of the group. The server 116 or the gateway 108 can turn on the streetlights by setting a flag in each streetlight controller that has been configured as part of the group. The "dark condition" can initiate delivery of a control signal that overrides the streetlight controller's 104 default lighting schedule. In some implementations, the "dark condition" can initiate delivery of a control signal that overrides a normal lighting schedule or a special day lighting schedule.

FIG. 34 shows an example of a user interface using which a user can define a group of streetlights that are activated if a "dark condition" decision is reached. A group can be defined by putting the streetlight controller into "astro-clock with photocell override" mode 3402. The user can put individual streetlight controllers 104 into "astro clock with photocell override" mode. The user can put all streetlight controllers 104 that belong to a particular gateway 108 into "astro clock with photocell override" mode. The user can put all streetlight controllers 104 that belong to all gateways 108 into "astro clock with photocell override" mode. If a "dark condition" is detected, the server 116 or the gateway 108 can turn on each streetlight that has been configured as part of the group by setting a flag in each streetlight controller.

Referring to FIG. 35, a user can specify the frequency at which a decision maker is polled. In some implementations, the polling frequency is in the order of minutes. The user can set the polling frequency for individual decision makers. The user can set the polling frequency for all decision makers that belong to a particular gateway 108. The user can set the polling frequency for all decision makers that belong to all gateways 108.

The server 116 or the gateway 108 can monitor the decision makers. In some implementations, the server 116 or the gateway 108 can use a combination of inputs to determine when an abnormal weather condition is no longer occurring. When the "dark condition" decision is no longer reached, the server 116 or the gateway 108 can turn off all streetlights that have been configured as part of the group. The server 116 or the gateway 108 can turn off the streetlights by resetting a flag in each streetlight controller that has been configured as part of the group.

Having multiple decision makers (e.g., at least five) in the network reduces the inherent unreliable nature of single photocell based systems. For example, a decision maker that incorrectly detects a "dark condition" can be determined to be faulty when compared to conflicting measurements of the other decision makers. In some implementations, the server 116 or the gateway 108 can use a voting system to determine which decision makers to rely upon. In some implementations, a control signal from a decision maker is relied upon if a majority of decision makers send the same control signal.

Automatic Fault Assignments

Some streetlight maintenance processes require "three-trip repairs" for resolving faults. A "three-trip repair" includes three separate trips by a technician or other field personnel for fault detection, fault investigation, and fault resolution, respectively. The disclosed streetlight management system substantially automates fault resolution by automatically pushing work orders to appropriate personnel. In some implementations, a work order can include, for example, the nature of the repair, the fault type, the burn hours of the lamp, the lamp type, and the streetlight's components. The work order can include historical information leading up to the fault. The work order can include maintenance history related to the issue. The work order can include enough information for the maintenance person or personnel to perform a "single-trip repair." In some implementations, the maintenance person can arrive at the repair site with the requisite equipment, components, and knowledge to complete the repair in one visit. This can reduce resolution time and effort by allowing the maintenance person to address the issue knowing the relevant details.

In some implementations, information representative of a location and status of a streetlight included in a network of streetlights can be received. A fault condition can be detected based on the status information. Corrective action information, including a remedial measure, can be presented. The corrective action information can include the fault type.

Streetlight controllers 104 can be configured to push status information associated with the streetlight to the server 116. The rate of polling status information can be defined in the streetlight management application. In some implementations, a user can configure the streetlight controller 104 to push status information to the server 116 intermittently, for example, once every hour. The streetlight controller can generate a fault condition and communicate the fault condition to the server 116. The server 116 can read the fault condition. Triggers can be implemented in fault monitoring and reporting logic. Fault reports and trigger information can be collected. The server 116 can use fault reports, trigger information, asset information, and other data associated with the fault to determine a remedial measure. In some implementations, the server 116 can automatically generate a work order based on the remedial measure. In some implementations, the server 116 can automatically transmit the work order to one or more maintenance persons.

In some implementation, a default maintenance person can be assigned to each gateway 108. The maintenance person assigned to a particular gateway 108 can be defined in the streetlight management application. When a fault condition is detected for the streetlight controller 104, the server 116 can automatically send a work order to the maintenance person who is assigned to the gateway 108 that the streetlight controller is assigned to. If a maintenance person who is assigned a work order is unavailable, the server 116 can re-assign the work order to a different maintenance person. In some implementations, a maintenance person can respond to a work order indicating that he is unavailable. Referring to FIG. 36, the work order can include, for example, the issue ID, the streetlight controller name, the fault type, the fault description, and the date. In some implementations, fault resolution information can be entered into the work order and communicated to the server 116. In some implementations, the work order can contain links to enter actions taken on the work order 3602, add an action for the issue 3604, check the maintenance history for the issue 3606, and add an attribute for the faulty streetlight controller 3608. The work order can include end of life predictions. In some implementations, the work order can be delivered via email. In some implementations, the work order can be delivered via text message. In some implementations, the work order can be delivered in the form of a voice message. In some implementations, a maintenance person can update a work order (e.g., enter actions, add actions, add attributes) by sending a voice message. In some implementations, a maintenance person can update a work order (e.g., enter actions, add actions, add attributes) by sending a text message.

Work order can be accessed through the streetlight management application, as shown in FIG. 36. Work orders can be transmitted to a mobile device running the streetlight management application, e.g., a mobile phone, a laptop computer, or a tablet computer. In some implementations, a maintenance person can receive a work order on a mobile device while in the field. The maintenance person can enter actions taken on the work order 3602, add an action for the issue 3604, check the maintenance history for the issue 3606, and add an attribute for the faulty streetlight controller 3608 by accessing the respective links in the work order. The maintenance person can update asset information. In some implementations, the maintenance person may update asset information after replacing an asset during repair or resolution of an issue. The maintenance person can access and enter information from the point of repair, eliminating the need to enter information into the server 116 following the repair, (e.g., when the maintenance person returns to the office). The ability to enter information at the repair site can reduce overall repair time and improve the accuracy of the entered information. Upon completion of a repair, the maintenance person can close the work order. In some implementations, the work order can be closed through the streetlight management application. In some implementations, the work order can be closed through a mobile device running the streetlight management application. If the closure is not satisfactory or the issue resurfaces, the work order may be re-opened.

The fault conditions can be pre-configured. The faults generated can include, for example, voltage under over fault, ballast fault, lamp fault, lamp cyclic fault, photocell fault, photocell oscillating fault, RF network fault, abnormal lamp condition fault, RTC fault, event overflow fault, energy meter fault, relay weld fault, day burning fault, and dimming short fault.

In some implementations, the streetlight controller 104 can be configured to monitor voltage. A voltage low limit and a voltage high limit can be defined in the streetlight controller. If the monitored voltage goes below the low limit or above the high limit, the streetlight controller can generate a voltage under over fault and turn the streetlight off. The next time the streetlight controller pushes status information to the server 116, the voltage under over fault can be sent.

In some implementations, the streetlight controller 104 can be configured to monitor the current in the ballast. When the streetlight controller turns the lamp on, and after a configured steady current time, the streetlight controller measures the ballast current. The streetlight controller saves a steady current measurement if it is not already saved in the EEPROM. If the ballast current reads zero, the streetlight controller switches the lamp off. Once the lamp is off, the streetlight controller turns the lamp back on, and the streetlight controller again measures the ballast current. This process can be repeated for a defined number of times. If the ballast current reads zero for every check, the streetlight controller generates a ballast fault and locks the lamp. Once locked, the lamp will not turn on until the ballast fault is reset.

In some implementations, the streetlight controller 104 can be configured to monitor the current in the ballast. When the streetlight controller turns the lamp on, and after a configured steady current time, the streetlight controller measures the ballast current. The streetlight controller saves a steady current measurement if it is not already saved in the EEPROM. If the ballast current is less than a percent value change minimum setting or greater than a percent value change maximum setting, the streetlight controller switches the lamp off. Once the lamp is off, the streetlight controller turns the lamp back on, and the streetlight controller again measures the ballast current. This process can be repeated for a defined number of times. If the ballast current is less than a percent value change minimum setting or greater than a percent value change maximum setting for every check, the streetlight controller generates a lamp fault and locks the lamp. Once locked, the lamp will not turn on until the lamp fault is reset.

In some implementations, the streetlight controller 104 can be configured to monitor the current in the ballast. When the streetlight controller turns the lamp on, and after a configured steady current time, the streetlight controller measures the ballast current. The streetlight controller saves a steady current measurement if it is not already saved in the EEPROM. The streetlight controller compares the ballast current measurement with the steady current measurement. If the ballast current measurement is less than a percent value change minimum setting or greater than a percent value change maximum setting, the streetlight controller increments a cyclic counter. If the cyclic counter reaches 10 within 30 minutes, the streetlight controller generates a lamp cyclic fault and the streetlight controller locks the lamp. Once locked, the lamp will not turn on until the lamp cyclic fault is reset.

In some implementations, the streetlight controller 104 can be configured to read the status of a photocell's digital input. If the digital input does not toggle over a predetermined time (e.g., an eighteen hour period), the streetlight controller generates a photocell fault. If the digital input toggles more than a predetermined number of times (e.g. ten times) over the predetermined period, the streetlight controller can generate a photocell oscillation fault.

In some implementations, a data coordinator unit (e.g., the gateway 108) can be configured to monitor whether data is received. The data coordinator unit sends a read data request to the streetlight controller 104. The data coordinator unit waits for a configured amount of time for a response. If data is not received within this time, the data coordinator unit sends another read data request to the streetlight controller. If data is not received after three attempts, the data coordinator unit can generate an RF network fault.

In some implementations, a data coordinator unit can be configured to monitor lamp status. At the time of astro polling (e.g., at sunrise and sunset), the data coordinator unit can check whether a lamp is on or off. The data coordinator unit can compare the lamp's actual status to its scheduled configuration. If a lamp is on when it should be off, or off when it should be on, the data coordinator unit generates an abnormal lamp condition fault.

In some implementations, a data coordinator unit can be configured to monitor clocks. The data coordinator unit can compare its real-time clock (RTC) time to the streetlight controller's 104 data time. If there is a difference of more than ten minutes between these two times, the data coordinator unit generates an RTC fault.

In some implementations, the streetlight controller 104 generates an event overflow fault if 40 events are generated within one hour.

In some implementations, the streetlight controller 104 can monitor its energy meter IC. If no interrupt pulse comes from the IC, the streetlight controller generates an energy meter fault. If an energy meter fault is generated, the streetlight controller stops checking voltage and current related faults. If the streetlight controller 104 needs to report lamp on/off status, it does so based on commands received rather than based on current measurements.

In some implementations, the streetlight controller 104 can be configured to monitor current in a relay. If the streetlight controller detects current in the relay when it turns the lamp on, the streetlight controller generates a relay weld fault.

In some implementations, the streetlight controller 104 can be configured to monitor current. The streetlight controller can use sunrise and sunset times to determine a time of day when a lamp should be off. If the streetlight controller detects current when a lamp should be off, the streetlight controller generates a day burning fault.

In some implementations, the streetlight controller 104 can be configured to monitor a dimming short feedback pin on the ballast. If the streetlight controller detects a dimming short, it increases a dimming short counter and waits for fifteen minutes. The streetlight controller again checks for a dimming short. If a dimming short is detected five times, the streetlight controller turns the lamp off. The streetlight controller generates a dimming short fault and can lock the lamp. Once locked, the lamp will not turn on until the dimming short fault is reset.

Figure 37:
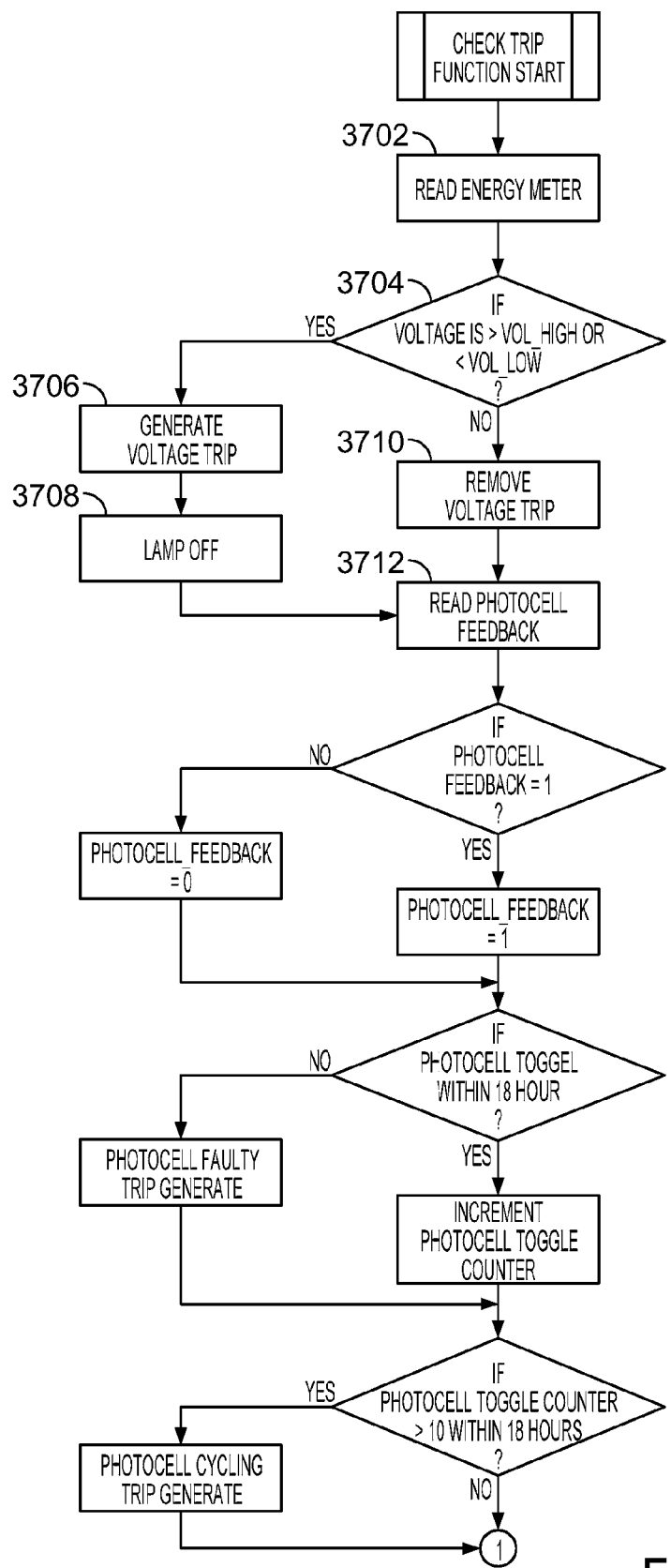
FIGS. 37 and 38 show an example of a flowchart for detecting a fault in a streetlight.
Figure 37:
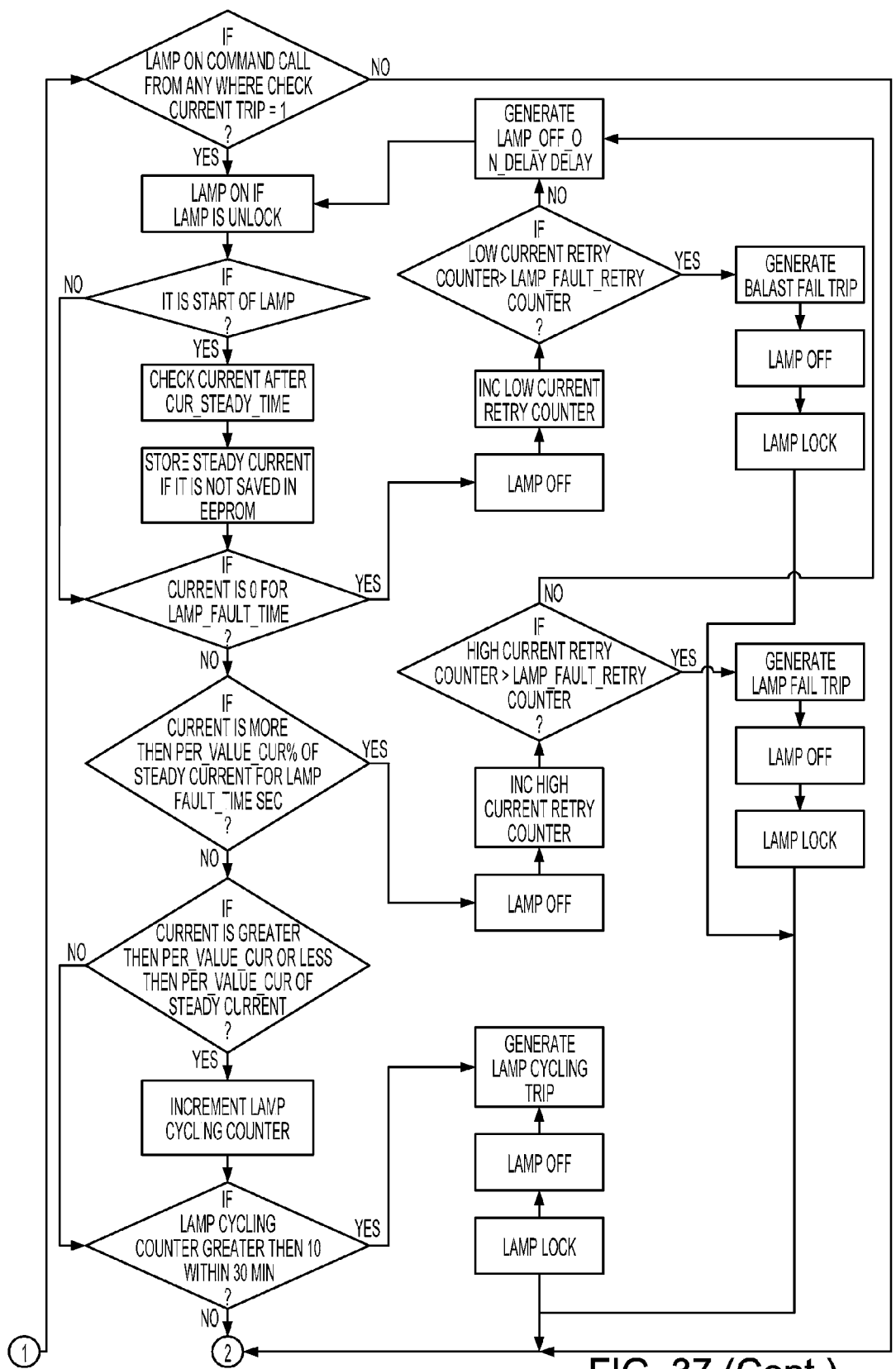
Figure 38:
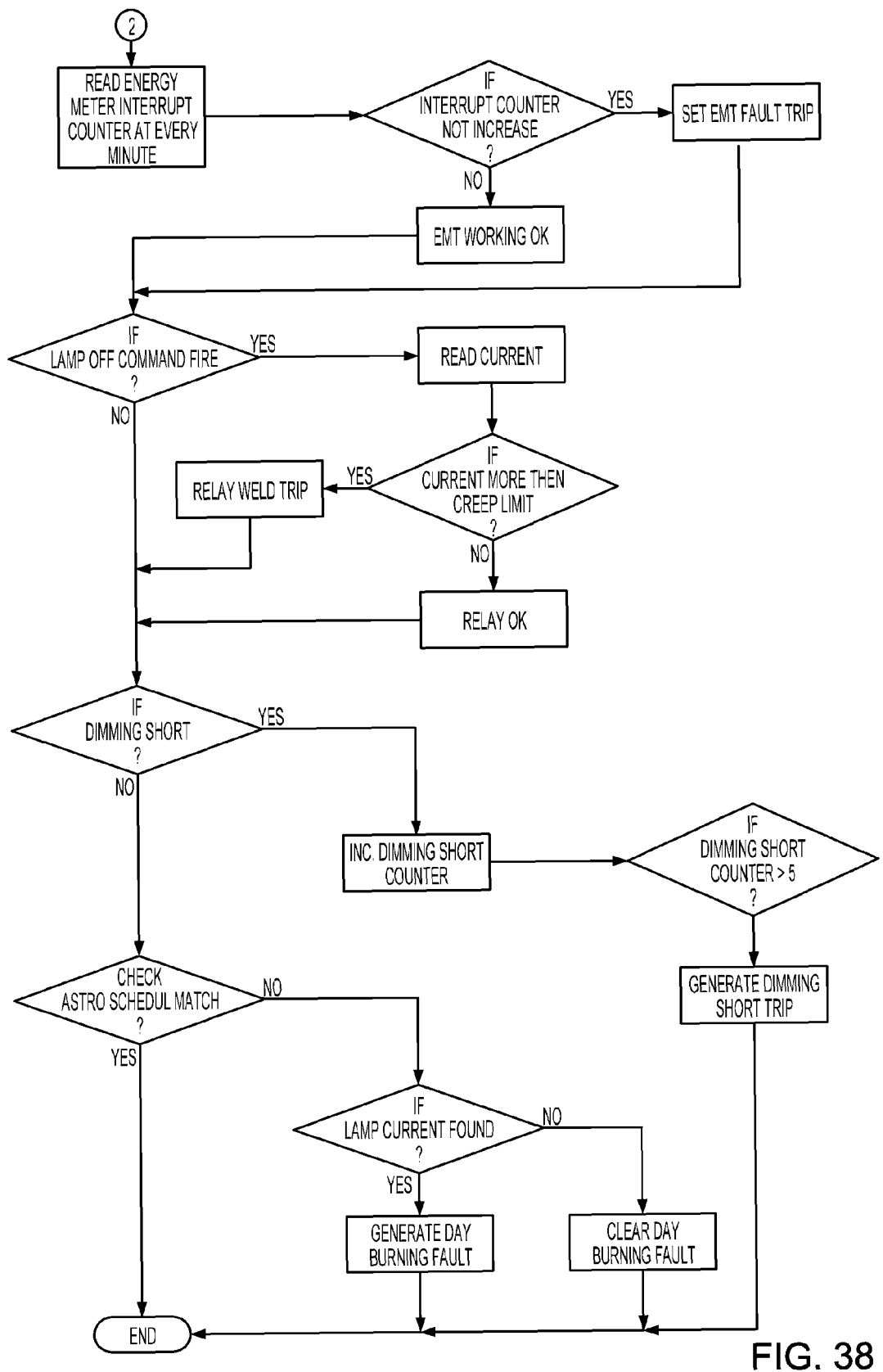

FIGS. 37 and 38 show an example of a trip generation logic flowchart for determining pre-configured fault conditions. In some implementations, the streetlight controller 104 checks for a voltage under over fault. Referring to FIG. 37, the streetlight controller reads an energy meter 3702. The streetlight controller determines whether the voltage is greater than Vol_High or less than Vol_Low 3704. If it is, the streetlight controller generates a voltage trip 3706 and turns the lamp off 3708. If it is not, the streetlight controller removes the voltage trip 3710. The streetlight controller then checks for a photocell fault 3712. The streetlight controller proceeds through the trip generation logic to check for other pre-configured fault conditions.

Figure 39:
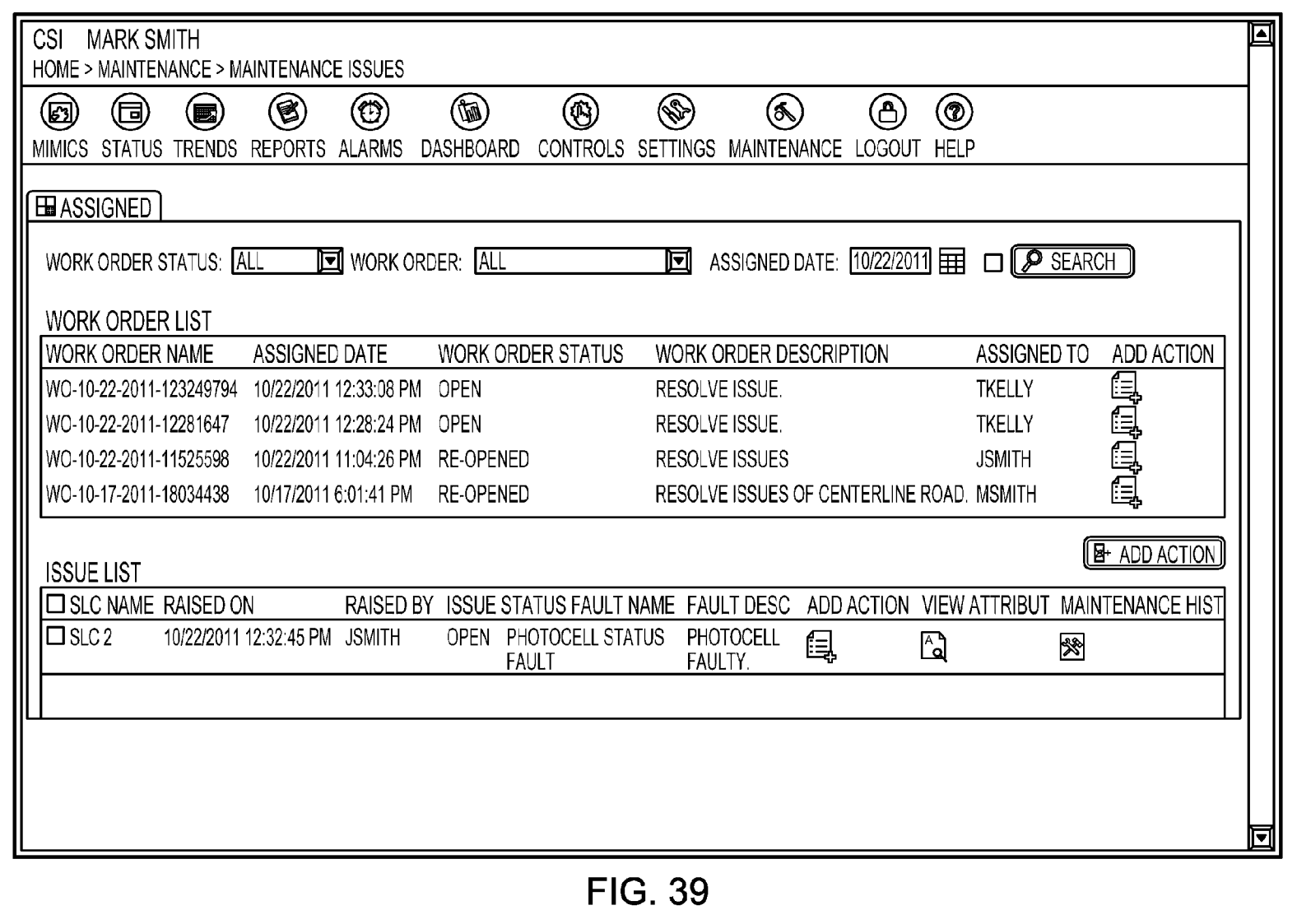

Referring to FIG. 39, the streetlight management application can include a maintenance issues screen. The maintenance issues screen can include a list of work orders and a list of issues. The list of work orders can include work order to resolve faults detected by the server 116. In some implementations, a work order can include the work order name, date that the work order was assigned, work order status (e.g., open, closed, re-opened, etc.), work order description, and maintenance person or persons the work order was assigned to. The maintenance issues screen can include a list of work orders assigned to all maintenance persons. The list of issues can list faults that have not necessarily triggered the generation of a work order. In some implementations, an issue can include, for example, the name of the streetlight controller that encountered the issue, date on which the issue was raised, how the issue was raised (e.g., raised by a maintenance person, raised by the system, raised by a citizen, etc.), issue status (e.g., open, closed, re-opened, etc.), fault name, and fault description. In some implementations, a work order can be created for an issue, and the created work order can appear in the list of work orders.

In some implementations, the streetlight management system can include an interface for citizens to log maintenance issues. In some implementations, the streetlight management system can have a website for citizens to enter maintenance issues that they observe. In some implementations, the reported maintenance issues can appear on the maintenance issues screen, and a work order can be created for the reported issue.

The streetlight management application can include an assigned work orders screen. The assigned work orders screen can include a list of work orders assigned to a particular maintenance person. In some implementations, the assigned work orders screen can include a list of work orders that are assigned to the maintenance person who is logged into the application.

Referring to FIG. 40, the streetlight management application can include a maintenance history screen. The maintenance history screen can include a list of the faults the streetlight controller 104 has encountered. In some implementations, the list of faults can include faults that a single streetlight controller has encountered. In some implementations, a fault can include the streetlight controller name, how the fault was raised (e.g., raised by a maintenance person, raised by the system, etc.), date on which the fault was raised, fault name, fault description, and fault status (e.g., open, closed, re-opened, etc.).

In some implementations, the maintenance history screen can include a list of actions performed on the streetlight controller 104. The list of actions can include actions performed on a single streetlight controller. An action can include details of the action taken, maintenance person or persons who performed the action, and date on which the action was taken. In some implementations, a maintenance person can enter the action performed into the system after, for example, completing a repair. In some implementations, a maintenance person can enter the action performed into the system from the repair site using a wireless device (e.g., a mobile phone, laptop, or tablet computer). In some implementations, a work order can include a link to a maintenance history screen that lists faults for the faulty streetlight controller.

In some implementations, the corrective action information can include end of life predictions. Referring to FIG. 41, the streetlight management application can display a burn hour report for one or more streetlight controllers 104. The burn hour report can include the streetlight controllers 104 in a particular gateway 108. The burn hour report can include streetlight lamps that are relatively close to their expected end of life based on user-defined values. In some implementations, the burn hour report can include streetlight lamps that are within 200 hours of their expected end of life. The burn hour report can include streetlight controllers 104 within a defined radius of a faulty streetlight controller. In some implementations, the burn hour report can include the streetlight controller name, the total burn hours of the lamp, the expected lamp life (e.g., in hours), the amount of lamp life remaining (e.g., in hours), and the number of days to replace lamp before over burning occurs (e.g., where there are ten burn hours to a day). The burn hour report can indicate if the streetlight controller 104 is experiencing a communication failure. The burn hour report can use color-coding to indicate when a streetlight lamp is approaching or has surpassed its end of life prediction. In some implementations, a streetlight lamp that is within 200 hours of its end of life can appear in yellow. In some implementations, a streetlight lamp that has surpassed its end of life prediction (e.g., over burned) can appear in red. The burn hour report can include the number of over burned hours for a streetlight lamp that has over burned.

The streetlight management system can predict lamp life for streetlight lamps by considering the lamp type and operating parameters. In some implementations, the streetlight management system can predict lamp life for streetlight lamps by considering electrical parameters and environmental parameters. In some implementations, operating parameters can include how often the lamp used dimming, the effects from the dimming, and junction temperatures. In some implementations, dimming can increase the life of an LED lamp but reduce the life of an HID lamp. In some implementations, a relatively higher junction temperature can reduce the life of an LED lamp by a larger amount than it would for an HID lamp.

In some implementations, a maintenance person at a repair site can look at a burn hour report that includes streetlight controllers 104 within a defined radius of the repair site. In some implementations, a nearby streetlight lamp that is approaching its end of life prediction, but not so critically close to its end of life prediction to warrant its own independent repair trip, can be replaced in the same repair trip. One factor that drives repair cost is the cost of the labor and repair equipment. A maintenance person can reduce overall repair time by replacing nearby streetlight lamps that are relatively close to their end of life predictions. The streetlight management system can use user-defined values to determine which, if any, streetlight lamps should be replaced during a repair trip. The user-defined values can include a radius threshold and a lamp life hours threshold. In some implementations, the burn hour report can instruct a maintenance person to repair one or more streetlight lamps that are within the radius threshold and under the lamp life hours threshold.

FIG. 42 shows an example of a fault summary report. A user can select a date range for the report. A user can select which faults are to be included in the report. In some implementations, a fault summary report can include any combination of voltage under over faults, lamp faults, lamp condition faults, communication faults, and ballast faults, among others. A user can select what data is to be included in the report. In some implementations, a fault summary report can include installation date, first occurrence date, last occurrence date, fault count, steady current, actual current, and per variation, among others. The fault summary report can group faults by streetlight controllers 104 or by fault type. In some implementations, a fault summary report grouped by streetlight controller can list faults experienced by a first streetlight controller, followed by faults experienced by a second streetlight controller, followed by faults experienced by a third streetlight controller, etc. In some implementations, a fault summary report grouped by fault type can list all streetlight controllers 104 that experienced a first fault type, followed by all streetlight controllers 104 that experienced a second fault type, followed by all streetlight controllers 104 that experienced a third fault type, etc.

Figure 43:
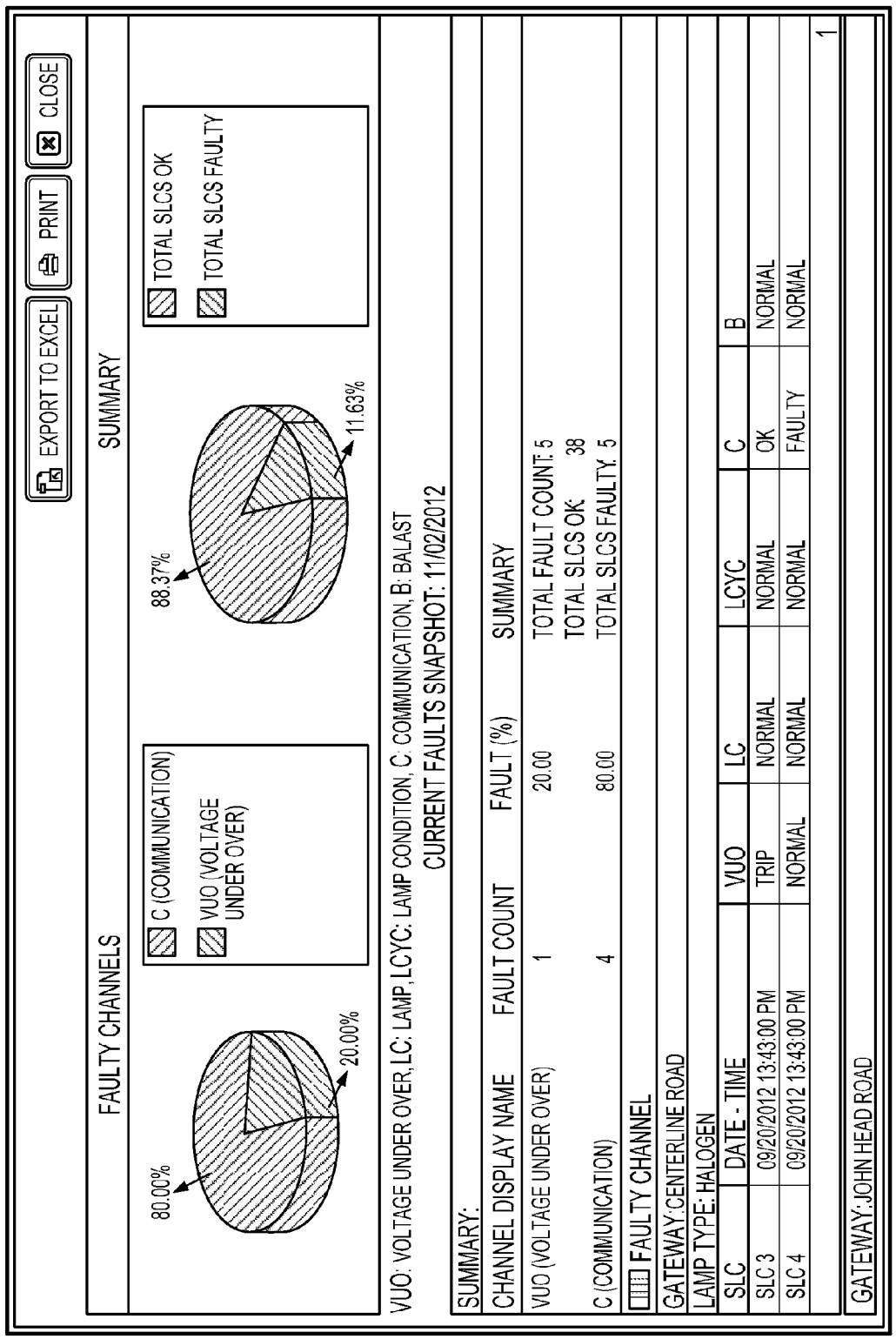

FIG. 43 shows an example of a fault snapshot. In some implementations, the fault snapshot can be based on a fault summary report. A user can select which faults are to be included in the fault snapshot. The fault snapshot can include the number of occurrences for each fault, the total number of faults detected, the total number of streetlight controllers 104 that are faulty, and the total number of streetlight controllers 104 that are non-faulty. The fault snapshot can include a list of faulty streetlight controllers 104. The list of faulty streetlight controllers 104 can identify which fault or faults occurred on each streetlight controller. The fault snapshot can include graphical representations of the data included in the fault snapshot. In some implementations, a pie chart can indicate the distributions of the detected faults. In some implementations, a pie chart can indicate the distributions of faulty streetlight controllers 104 and non-faulty streetlight controllers 104.

Figure 44:
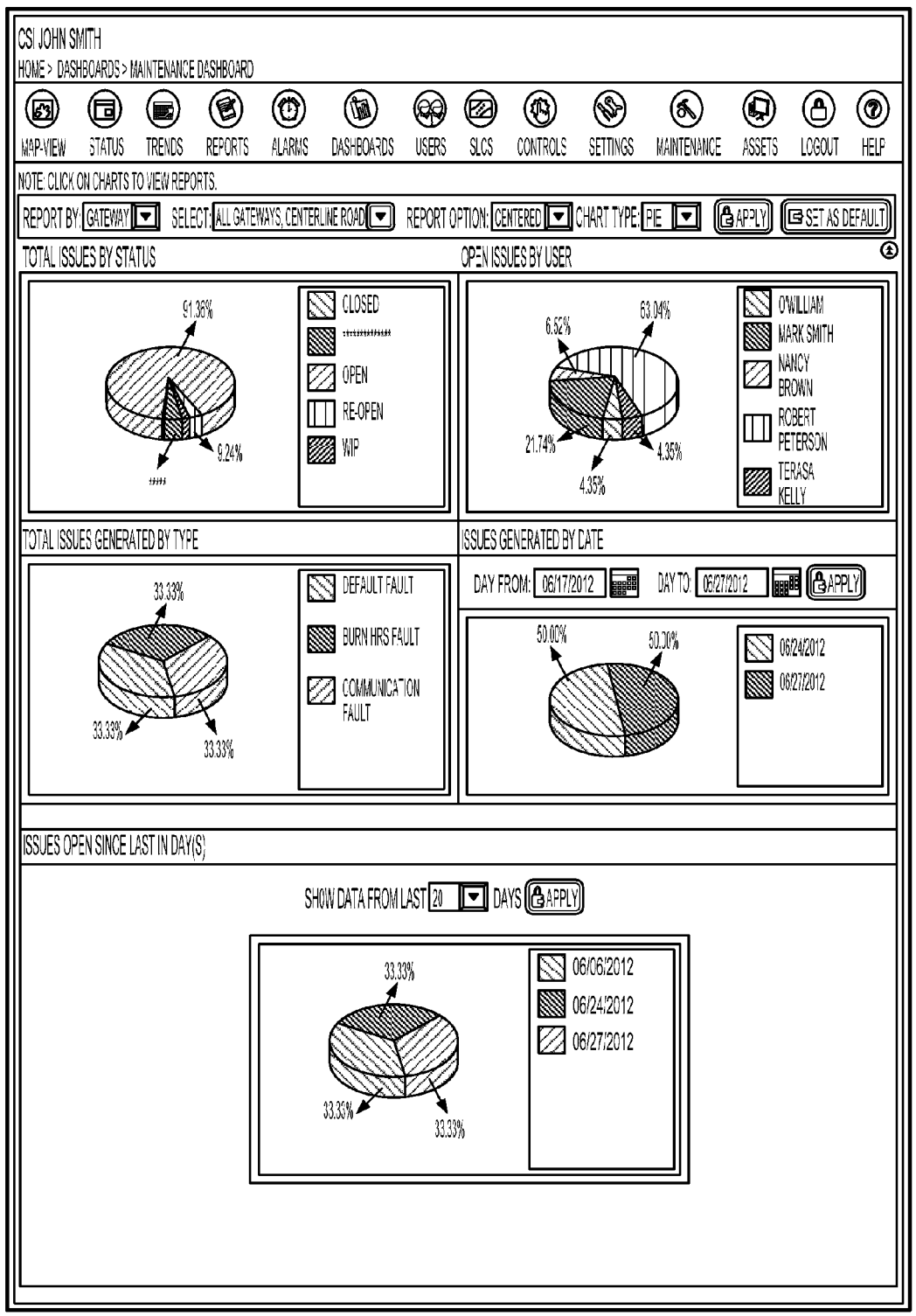

FIG. 44 shows an example of a maintenance dashboard report. A user can specify the streetlight controllers 104 that are included in the report. In some implementations, the maintenance dashboard report can include data from streetlight controllers 104 assigned to a selected gateway 108. In some implementations, the maintenance dashboard report can include graphical representations (e.g., charts or graphs) showing the total issues distributed by the status of the issue, open issues distributed by user, total issues generated distributed by type, issues generated distributed by date, and issues open in the last N days distributed by date, where a user can select a value for N. In some implementations, the graphical representations can be pie charts that display the percentage distributions.

Configurator

When installing the streetlight controller 104 on a streetlight, a maintenance person can commission the streetlight controller. Commissioning the streetlight controller 104 can help a maintenance person verify that the streetlight controller is operating properly. To reduce labor costs, the commissioning can be a quick and simple process. A configurator (element 124 of FIG. 1) capable of commissioning the streetlight controller 104 can simplify and expedite the commissioning process.

In some implementations, the configurator 124 can commission the streetlight controller 104 without depending on the streetlight controller having connectivity to the network (e.g., the gateway 108 and/or the server 116). The configurator 124 may transmit various types of information, such as, commissioning information for operational setup, network setup (e.g., RF network setup), diagnostics, fault management, maintenance issues, asset configuration, asset management, and network mapping. The configurator 124 can ensure that the streetlight controller is reachable by the gateway 108 once connectivity between the streetlight controller and the gateway 108 has been established. The configurator 124 can facilitate adding streetlight controllers 104 to the network of streetlights (e.g., the mesh network). In some implementations, each streetlight controller can be configured to locate the gateway 108 on its own and establishing a communication channel with the gateway 108. In some implementations, a mesh network of streetlight controllers can established automatically as more streetlight controllers are added.

Figure 45:
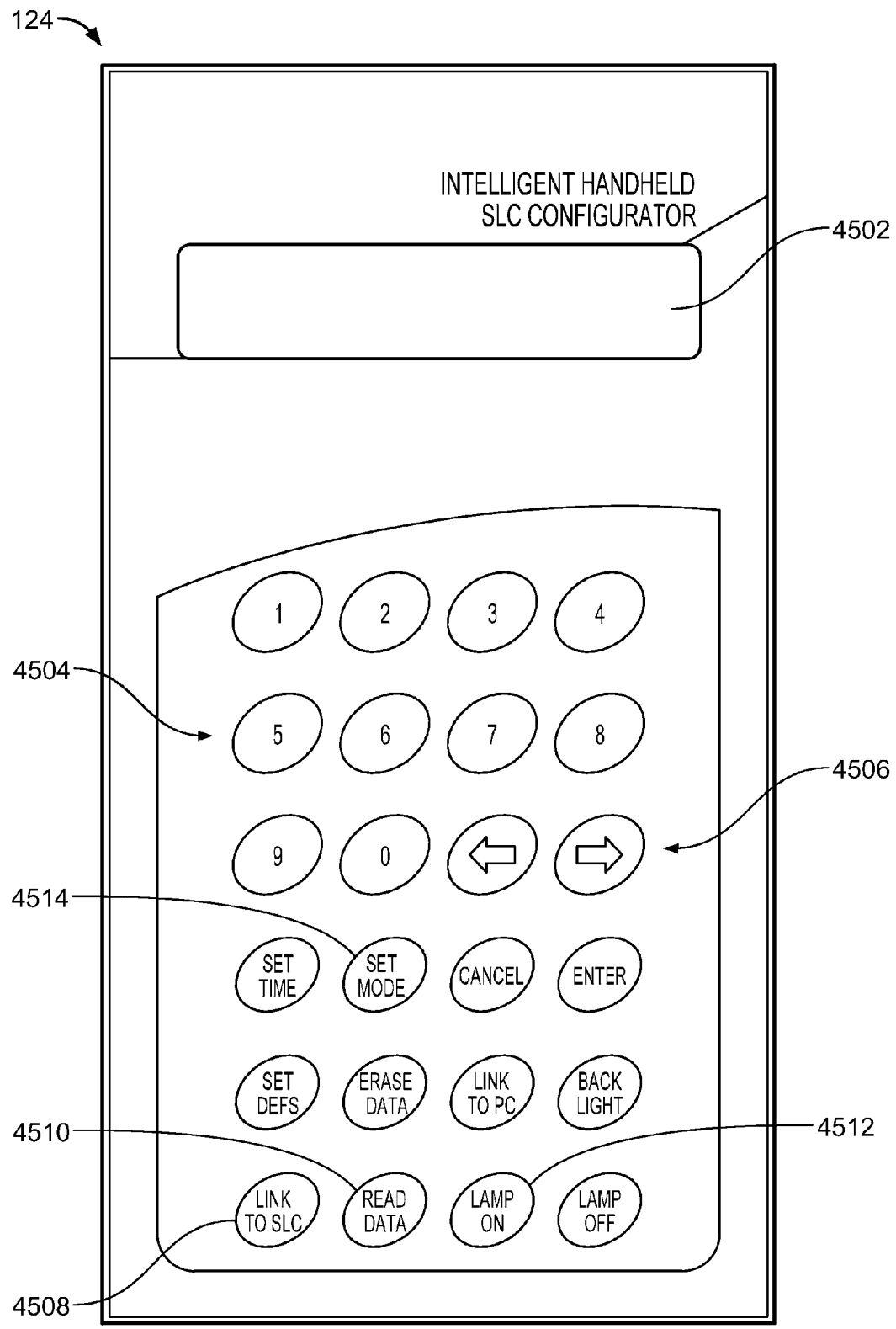
FIG. 45 shows an example of a configurator used for configuring a streetlight.

Referring to FIG. 45, the configurator 124 can be a handheld computing device. The configurator 124 can include a memory configured to store instructions, and one or more of a processor to execute the instructions to perform operations. The configurator 124 can perform various functions, including, for example, establishing a wireless connection with a streetlight controller 104 deployed on a streetlight, initiating transmission of a set of parameters related to commissioning the streetlight, and receiving, from the controller, status and identification information associated with the streetlight.

In some implementations, the example of a configurator 124 can include a display 4502. In some implementations, the display can be a liquid crystal display. The configurator 124 can include buttons that include a number pad 4504, arrow buttons 4506, and a plurality of buttons that can trigger one or more pre-configured commands. In some implementations, the configurator 124 can include a "link to SLC" button 4508, a "read data" button 4510, a "lamp on" button 4512, and a "set mode" button 4514. In some implementations, a first dedicated button (e.g., the "lamp on" button) can trigger activation of the streetlight. In some implementations, a second dedicated button (e.g., the "read data" button 4510) can trigger initiating transmission of a set of parameters related to commissioning a streetlight. The set of parameters can be transmitted from the streetlight controller to the configurator 124.

In some implementations, the configurator 124 can be capable of commissioning the gateway 108. The configurator 124 can establish a wireless connection with the gateway 108, initiate transmission of a set of parameters related to configuring the gateway 108, and receive status and identification information associated with the gateway 108. The configurator 124 can be capable of issuing gateway 108 commissioning commands for network setup and RF parameters.

In some implementations, the configurator 124 can include a global positioning system (GPS). The GPS can receive geographic coordinates. The configurator 124 can transmit geographic coordinates to the streetlight controller 104. In some implementations, location data such as a latitude coordinate measurement and a longitude coordinate measurement (as determined by the GPS) can be included in the set of parameters transmitted to the streetlight controller. Alternatively, in some implementations, geographic coordinates can be manually entered into the configurator 124 using the number pad, and the geographic coordinates can be transmitted from the configurator 124 to the streetlight controller 104. In some implementations, a maintenance person can manually enter a latitude coordinate and a longitude coordinate into the configurator 124 using the number pad, and the latitude and longitude can be included in the set of parameters transmitted to the streetlight controller. In some implementations, the configurator 124 can be capable of synching a clock on the streetlight controller 104 using GPS time server information.

In some implementations, the configurator 124 can include a barcode reader. The streetlight controller 104 can include a barcode that contains information related to the streetlight controller. The barcode can contain the streetlight controller identification number. The streetlight controller identification number can be assigned to a streetlight. In some implementations, a maintenance person can scan the streetlight controller's barcode to assign the streetlight controller identification number to the streetlight that the streetlight controller is being installed on. Alternatively, the streetlight controller identification number can be manually entered into the configurator 124 using the number pad.

In some implementations, the streetlight controller identification number can be assigned to the streetlight that the configurator 124 is closest to. In some implementations, the configurator 124 can use the GPS to make a latitude measurement and a longitude measurement at an installation site. The configurator 124 can use the latitude and longitude measurements to determine the streetlight that the streetlight controller 104 is being installed on. The configurator 124 can scan use the barcode reader to scan a barcode on the streetlight controller. The barcode can contain the streetlight controller's identification number. The configurator 124 can assign the streetlight controller identification number to the streetlight at the installation site.

For commissioning the streetlight controller 104, in some implementations, a maintenance person can arrive at a pole where the streetlight controller 104 is to be installed. Using the barcode reader on the configurator 124, the maintenance person can scan the streetlight controller's barcode to read the streetlight controller identification number into the configurator 124. The configurator 124 can assign the streetlight controller identification number to the streetlight that the streetlight controller is being installed on. The maintenance person can install the streetlight controller onto the streetlight. When the streetlight controller is powered on, the streetlight controller can search for the gateway 108 within its network range. The streetlight controller can search for gateways 108 by scanning the streetlight controller's channels. If the streetlight controller is able to find the gateway 108, the streetlight controller can establish a communication channel with that gateway 108. The streetlight controller can send its streetlight controller identification number and MAC address to the gateway 108. All gateways 108 can maintain a list of streetlight controllers 104 in their systems that are suitable for establishing a wireless connection with. If the streetlight controller 104 establishes a connection with a gateway 108 that does not have the connected streetlight controller on its list, the gateway 108 can recognize that the connection is not suitable. The gateway 108 may be unsuitable if the gateway 108 has reached its connection capacity. If the gateway 108 is not suitable, the gateway 108 can communicate with the server 116 to determine a suitable gateway 108 for the streetlight controller to establish a connection with. The unsuitable gateway 108 can communicate with the streetlight controller to instruct it to establish a connection with another gateway 108.

In some implementations, if the streetlight controller cannot establish a connection with the gateway 108, the streetlight controller can still be commissioned. The configurator 124 can establish a wireless connection with the streetlight controller. The streetlight controller can be switched to a manual control mode. The maintenance person can press a first dedicated button to trigger activation of the streetlight. The maintenance person can press a second dedicated button to trigger initiating transmission of a set of parameters related to commissioning the streetlight controller from the streetlight controller to the configurator 124. The maintenance person can press a third dedicated button to trigger initiating transmission of GPS data from the configurator 124 to the streetlight controller. The number of dedicated buttons and the information transmitted by the dedicated buttons can be configured based on, for example, the information exchange required for the commissioning.

In some implementations, the maintenance person can use the configurator 124 to select asset information pertaining to the streetlight. In some implementations, asset information can be selected using drop-down lists on the configurator 124. Asset information can include pole number, streetlight controller coordinates, streetlight controller type, lamp type, lamp wattage, ballast type, control information, driver information, burn time, and lamp mode.

Figure 46:
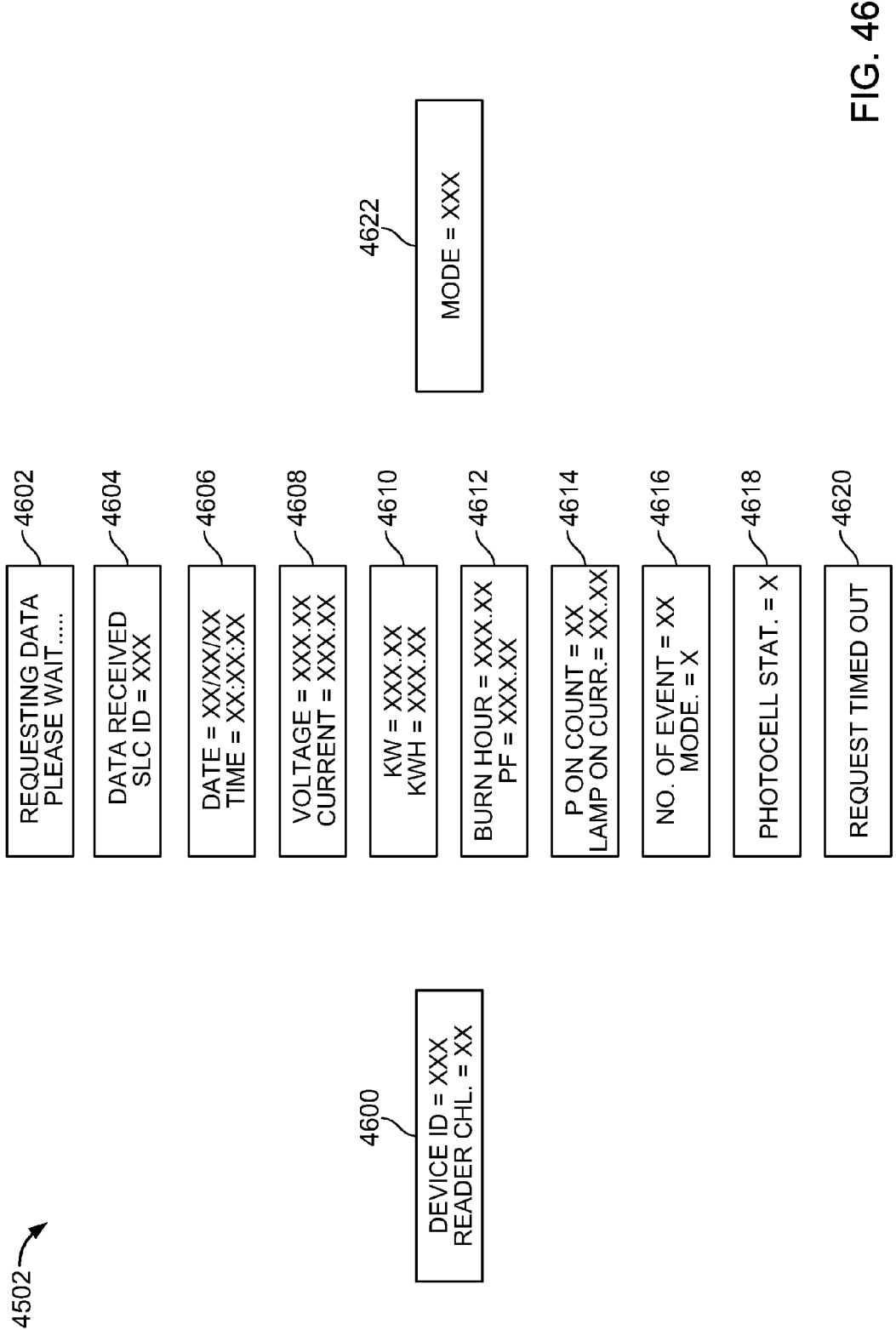
FIG. 46 shows examples of information displayed on a configurator.

Referring to FIG. 46, in some implementations, a maintenance person can press the "link to SLC" button 4508 on the configurator 124 to establish a wireless connection between the configurator 124 and the streetlight controller 104. The maintenance person can use the number pad 4504 to enter the streetlight controller identification number of the streetlight controller 104 into the device identification screen 4600. The maintenance person can press the "lamp on" button 4512 on the configurator 124 to switch on the streetlight controller lamp. The maintenance person can press the "read data" button 4510 on the configurator 124 to trigger initiating transmission of a set of parameters related to commissioning the streetlight controller from the streetlight controller to the configurator 124.

In some implementations, pressing the "read data" button 4510 can trigger the configurator 124 to request data from the streetlight controller. The display can show a screen indicating that the configurator 124 is requesting data 4602. If data is received, the configurator 124 can show a series of screens that include parameters related to commissioning the streetlight. In some implementations, the screens can include streetlight controller ID 4604, date and time 4606, voltage and current 4608, power 4610, burn hours and power factor 4612, P on count and lamp on current 4614, number of event and mode 4616, and photocell status 4618. The receipt of this information can verify that the streetlight controller can establish a wireless connection. The receipt of this information can verify that the streetlight controller's RF components are functional. The received measurements can assist the maintenance person in determining whether the streetlight controller's electronics are functional. If data is not received by the configurator 124, the configurator 124 can show a timeout screen 4620.

In some implementations, a maintenance person can press the "set mode" button 4514 on the configurator 124 to cause the configurator 124 to display a mode selection screen 4622. The maintenance person can press the arrow buttons 4506 on the configurator 124 to scroll between streetlight controller modes. In some implementations, streetlight controller modes can include astro, astro photo, astro with photocell override, and schedule. Some modes may require the input of additional information. In some implementations, a maintenance person may need to input latitude, longitude, sunset delay, sunrise delay, and coordinated universal time offset into the configurator 124. In some implementations, a maintenance person can use the configurator's GPS to make a latitude and longitude measurement.

The configurator 124 can include a number of commands for commissioning the streetlight controller 104. In some implementations, the commands can include: set time, set mode, read data, erase data, set parameters, enter RF parameters, lamp on, lamp off, lamp dim, set fault parameters, store asset information, get all fault parameters, reset the fault trip, get burn hour data, over the air programming, remote diagnostic, set yearly schedule, set pole asset details, set pole geo-mapping, connect to nearest pole, get pole asset information, get gateway status, read streetlight controller ID. In some implementations, the configurator 124 can have one or more dedicated button for executing one or more command. A maintenance person can execute a command by pressing the dedicated button for a command. Alternatively, in some implementations, a maintenance person can execute a command through the configurator 124's menu screens.

In some implementations, a maintenance person can execute a communication test with the gateway 108. The maintenance person can attempt to establish a connection between the configurator 124 and the gateway 108. In some implementations, the maintenance person can press the "link to SLC" button 4508 on the configurator 124 and enter "000000" in the streetlight controller identification number field to establish a wireless connection between the configurator 124 and the gateway 108. In some implementations, the configurator 124 can establish a wireless connection with the gateway 108 that the configurator 124 is closest to. In some implementations, the configurator 124 can identify the closest gateway 108 by making RF power measurements. The maintenance person can press the "read data" button on the configurator 124 to receive date and time information from the gateway 108. The receipt of the date and time information can verify that the gateway 108 can establish a wireless connection. The receipt of the date and time information can verify that the gateway's RF components are functional.

In some implementations, the configurator 124 can perform functionalities of the server 116. For example, in case of a communication failure between one or more streetlight controller and the gateway 108, or a communication failure between one or more gateways 108 and the server 116, the configurator 124 can support a set of functional and protocol commands that are typically performed by the server 116. When communication between the streetlight controllers 104 and the server 116 has been reestablished, the server 116 can synch with streetlight controllers 104 and fetch updated commissioning data from the streetlight controllers 104 via the gateway 108. In some implementations, the server 116 can synch with streetlight controllers 104 and fetch updated asset information, network information, fault information, scheduling information, and burn hour data.

In some implementations, the configurator 124 can have access to streetlight controller fault parameters. The configurator 124 can have the ability to set/reset flags and run fault scenarios. The configurator 124 can perform troubleshooting. In some implementations, the configurator 124 can perform fault parameter and protocol connectivity tests.

The configurator 124 can be used during maintenance of the streetlight controller 104 or the gateway 108. The configurator 124 can provide access to streetlight controller operational data that is useful for maintenance. In some implementations, the configurator 124 can provide access to burn hour information and fault history.

The configurator 124 can perform individual controller diagnostics and control functions. In some implementations, a maintenance person can cause the configurator 124 to connect to a streetlight controller 104 by entering the streetlight controller's identification number into the configurator 124. In some implementations, the configurator 124 can use RF power measurements to connect to the closest streetlight controller 104. In some implementations, the configurator 124 can use RF power measurements to connect to the closest streetlight controller 104 if the streetlight controller's identification number is not known. In some implementations, the configurator 124 can use RF power measurements to connect to the closest streetlight controller 104 before assigning GPS information to the streetlight controller 104 (e.g., to ensure the assigned GPS information correlates with the appropriate streetlight controller 104).

In some implementations, the configurator 124 can receive wireless software and firmware updates. In some implementations, the configurator 124 can receive updates from the internet. In some implementations, the configurator 124 can receive updates from the server 116 (e.g., via the network 110). In some implementations, the configurator 124 can receive updates via the gateway 108. In some implementations, the configurator 124 can also receive software and firmware updates directly (e.g., via a direct connection with a computer or a direct connection with the server 116).

In some implementations, information from configurator 124 can be transferred to the server 116 wirelessly. Information from the configurator 124 can be transferred to the server 116 directly by connecting the configurator 124 to a computer system and exporting the information as a computer file (e.g., a spreadsheet file). The computer file can be imported into the streetlight management application.

Streetlight Controller Mounting

Figure 47:
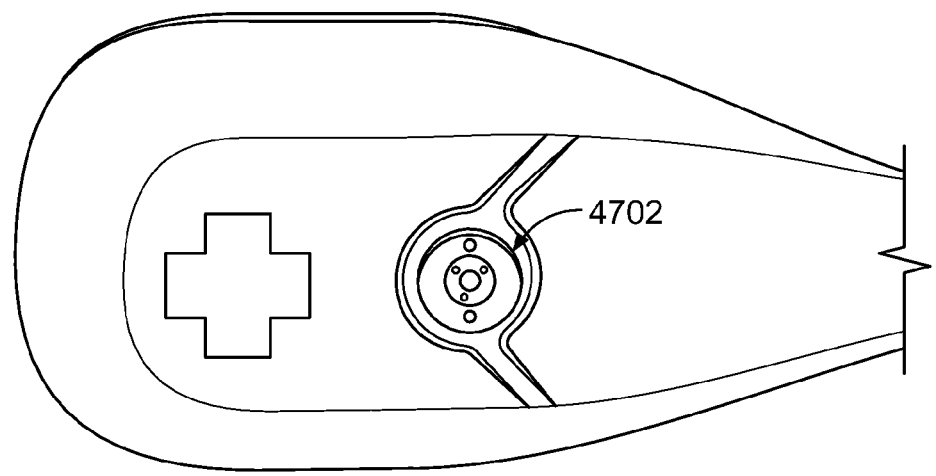
FIG. 47 shows an example of a streetlight.

FIG. 47 shows an example of a streetlight that includes a receptacle 4702. In some implementations, the receptacle can be configured to receive a photocell. The receptacle 4702 can be compliant with electrical connection standards for the country in which the streetlight is deployed. For example, in the United States, the receptacle 4702 can be a receptacle in accordance with standards set by NEMA, and capable of receiving a NEMA plug. In some implementations, the NEMA plug can be a three-pronged twist-locking plug.

A streetlight controller 104 having a plug may be unable to send dimming commands to the streetlight without additional electrical connections (e.g., wires). In some implementations, dimming commands may require two additional electrical connections from the streetlight controller to the streetlight. In some implementations, dimming can be controlled, for example, using a 1-10V lighting control or a Pulse Width Modulation (PWM) interface. Installation of a streetlight controller with two additional wires may entail drilling a hole through the streetlight housing to accept the two additional wires. The two additional wires can then be electrically connected to the streetlight.

One factor that drives installation cost is the cost of labor, and drilling a hole during installation can be a time consuming procedure. Drilling a hole through the streetlight housing can also reduce structural strength of the streetlight housing and can expose the streetlight components to damaging environmental factors (e.g., rain, snow, sleet, wind).

Figure 48:
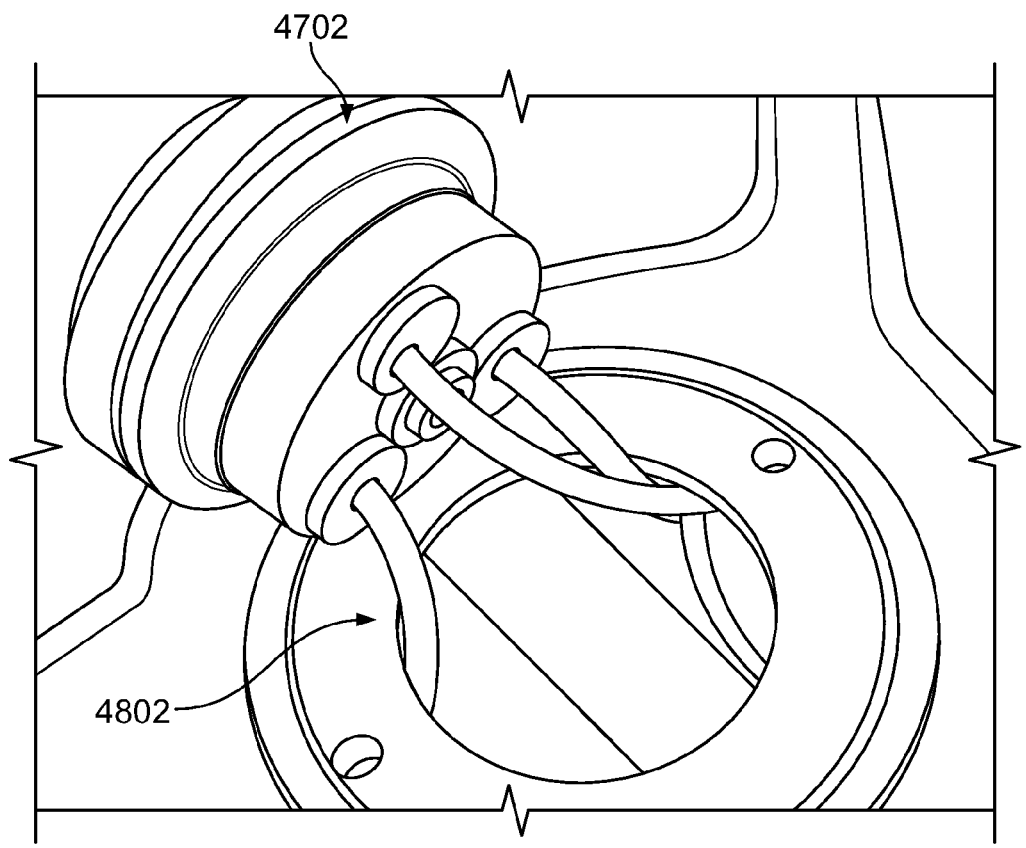
FIG. 48 shows an example of a receptacle on a streetlight.
Figure 49:
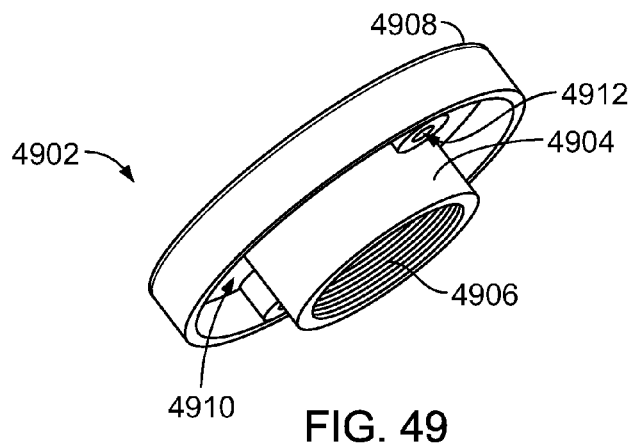
FIG. 49 shows an example of a threaded receptacle.
Figure 50:
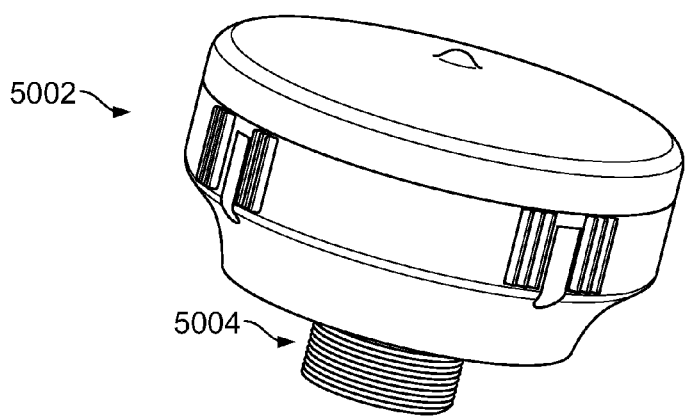
FIG. 50 shows an example of a streetlight controller housing.

As shown in FIG. 48, in some implementations, the receptacle 4702 can be removed and the attached wires 4802 can be disconnected from the receptacle 4702. A threaded receptacle 4902, as shown in FIG. 49, can be mounted to the streetlight housing over the opening created by the removal of the receptacle 4702. The threaded receptacle 4902 can have a cylindrical central portion 4904 that has an outside surface and a threaded inside surface 4906. The cylindrical central portion 4904 can be hollow. The threaded receptacle 4902 can have a cylindrical peripheral portion 4908 disposed concentric to the cylindrical central portion. In some implementations, the cylindrical peripheral portion 4908 is disposed concentric to and on the outside of the outside surface of the central portion 4904. The threaded receptacle 4902 can have a substantially flat surface 4910 that resides between the central 4904 and peripheral 4908 portions. The substantially flat surface 4910 can have one or more fastener receptacles 4912 for accepting fasteners for fastening the threaded receptacle 4902 to the streetlight housing. FIG. 50 shows an example of a streetlight controller housing 5002 that has a threaded portion 5004. The threaded portion 5004 can be a cylindrical protrusion with a threaded outside surface, attached to the streetlight controller housing 5002. The threaded inside surface 4906 of the threaded receptacle 4902 can be capable of receiving the threaded portion 5004 of the streetlight controller housing 5002.

In some implementations, the one or more fastener receptacles 4912 can be capable of accepting screws. In some implementations, the one or more fastener receptacles 4912 can be capable of accepting bolts. In some implementations, the one or more fastener receptacles 4912 can be capable of accepting any fastener that is appropriate for fastening the threaded receptacle 4902 to the streetlight housing.

Figure 51:
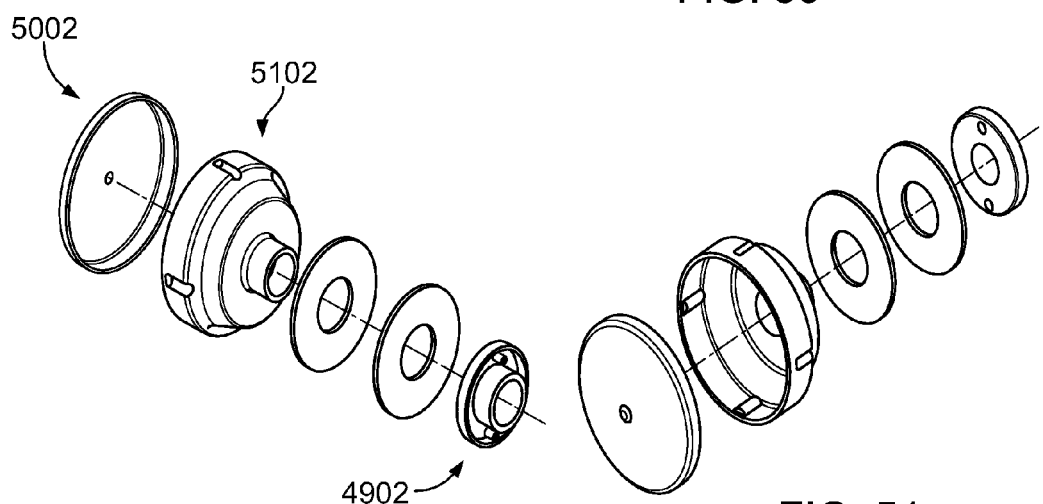
FIG. 51 shows examples of different parts of a streetlight controller housing.

Referring the FIG. 51, the streetlight controller housing 5002 can contain the streetlight controller 104. In some implementations, the streetlight controller can have dimming capabilities. The streetlight controller housing 5002 can be made from an injection molded plastic.

In some implementations, the threaded receptacle 4902 can have a form factor substantially similar to that of the receptacle 4702. The hole that the threaded receptacle 4902 is mounted over can be designed to receive the receptacle 4702. The threaded receptacle 4902 can be made from an injection molded plastic. The threaded receptacle 4902 can have an overall diameter substantially similar to that of the receptacle 4702. For example, when replacing a NEMA receptacle, the diameter of the threaded receptacle can be, for example, approximately 2.5 inches. The threaded receptacle 4902 can have one or more fastener receptacles 4912. In some implementations, the threaded receptacle 4902 can have two fastener receptacles.

Electrical connections (e.g., wires) can be attached to the streetlight controller 5102. The wires may be for controlling dimming. The wires can run through the treaded portion 5004 of the streetlight controller housing 5002, through the threaded receptacle 4902, into the hole on the streetlight housing, and connect to the streetlight. The wires that may have been disconnected from the streetlight's previous receptacle 4702 may still be connected to the streetlight. These wires can run out of the hole on the streetlight housing, through the threaded receptacle 4902, through the threaded portion 5004 of the streetlight controller housing 5002, and connect to the streetlight controller 5102. Any number of wires can run from the streetlight controller 5102 to the streetlight through this path formed by the threaded receptacle 4902.

Figure 52:
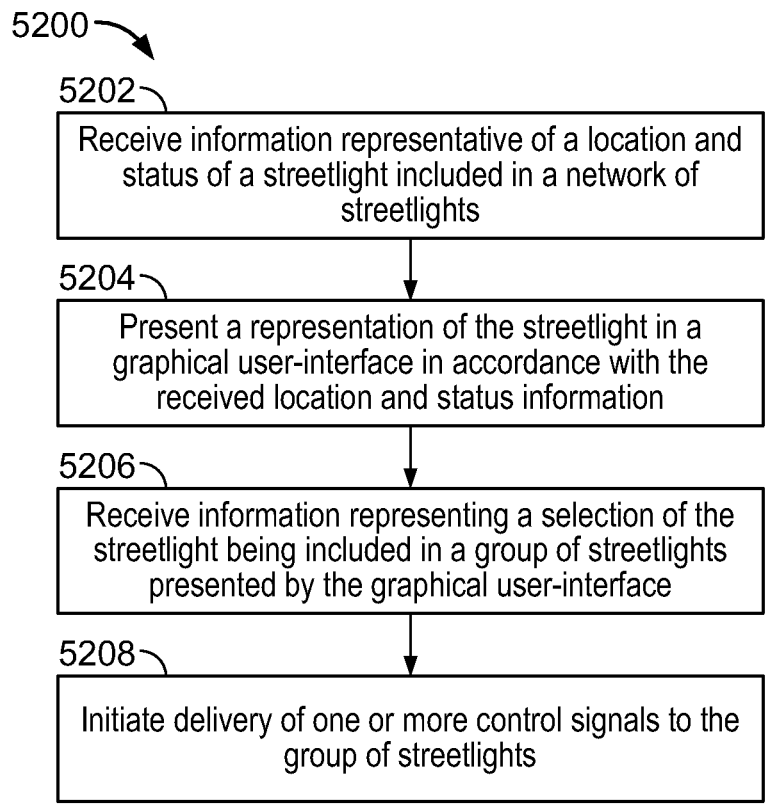
FIG. 52 shows a flowchart depicting an example of a sequence of operations for managing a group of streetlights.

FIG. 52 shows a flowchart 5200 depicting an example of a sequence of operations for managing a group of streetlights. The operations can be performed using a computing device such as the server 116, mobile device 120 or computing device 122 described with reference to FIG. 1. The operations include receiving information representative of a location and status of a streetlight included in a network of streetlights (5202). Operations also include presenting a representation of the streetlight in a graphical user-interface in accordance with the received location and status information (5204), receiving information representing a selection of the streetlight being included in a group of streetlights presented by the graphical user-interface (5206), and initiating delivery of one or more control signals to the group of streetlights (5208).

Figure 53:
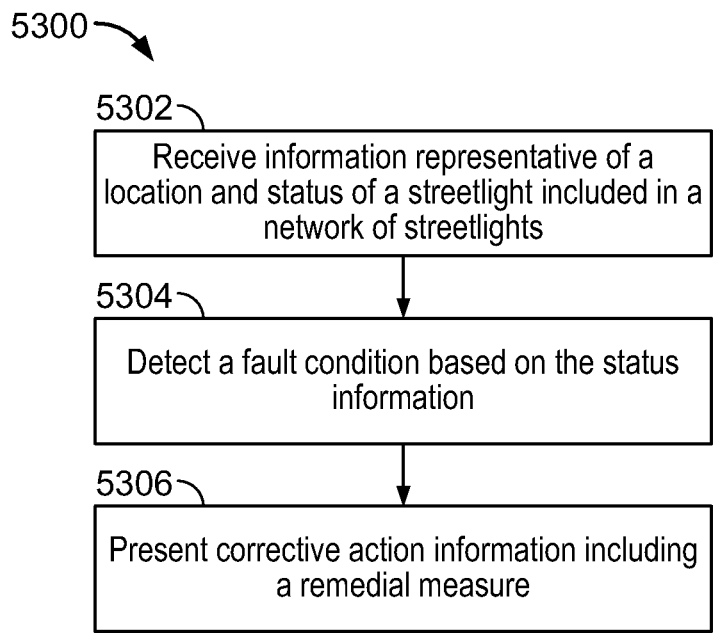
FIG. 53 shows a flowchart depicting an example of a sequence of operations related to managing a fault in a streetlight.

FIG. 53 shows a flowchart 5300 depicting an example of sequence of operations for managing a fault in a streetlight. The operations include: receiving information representative of a location and status of a streetlight included in a network of streetlights (5302). Operations also include detecting a fault condition based on the status information (5304), and presenting corrective action information including a remedial measure (5306).

An Example of a Computing Device

Figure 54:
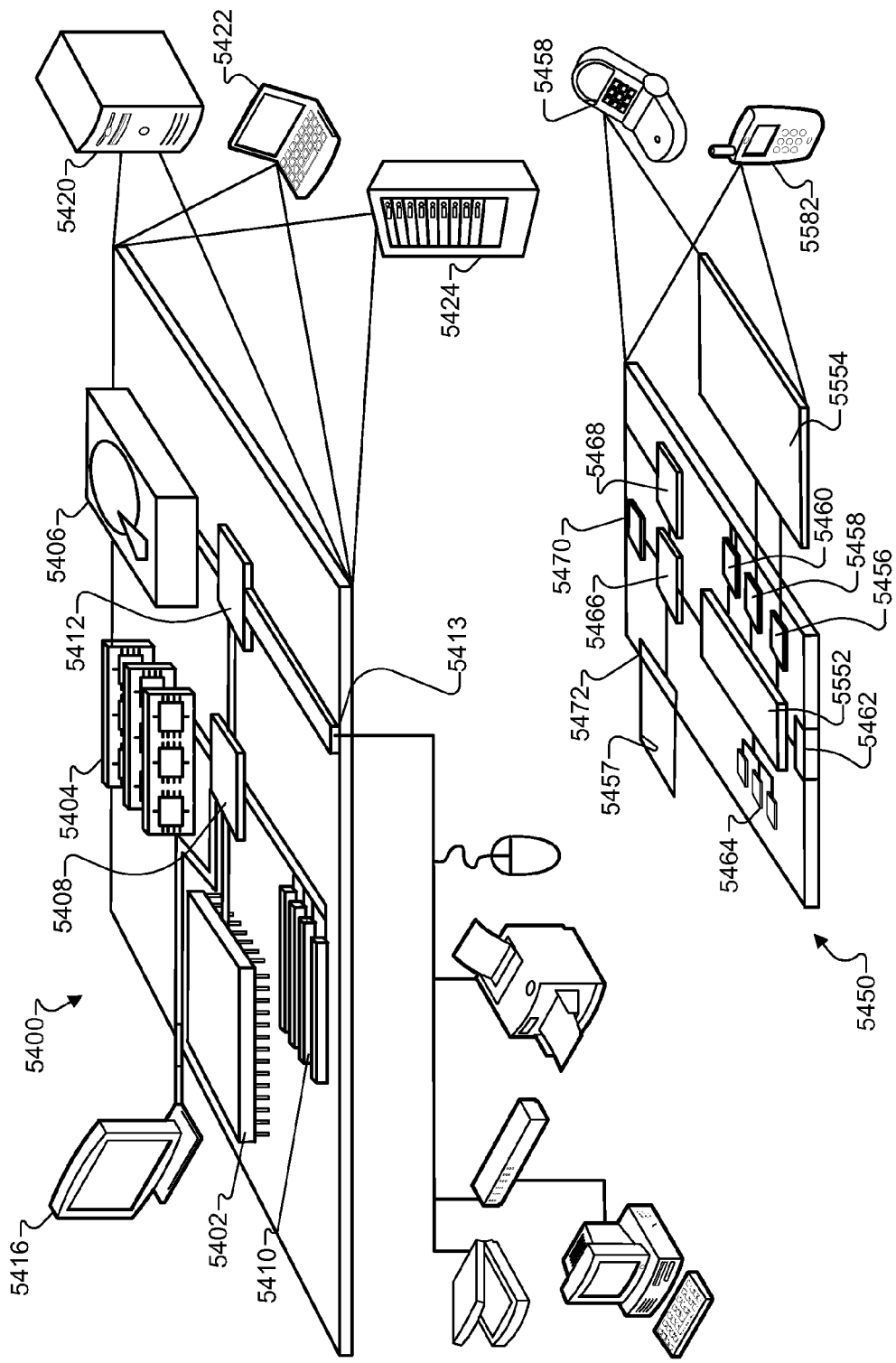
FIG. 54 is a block diagram showing an example of a computing device.

FIG. 54 shows an example of a computing device 5400 and a mobile device 5450, which may be used with the techniques described here. For example, referring to FIG. 1, the gateway device 108, streetlight controller 102, configurator 124, or devices 116, 120 or 122 could be examples of the computing device 5400 or the mobile device 5450. Computing device 5400 is intended to represent various forms of digital computers, such as laptops, desktops, workstations, personal digital assistants, servers, blade servers, mainframes, and other appropriate computers. Computing device 5450 is intended to represent various forms of mobile devices, such as personal digital assistants, cellular telephones, smartphones, and other similar computing devices. The components shown here, their connections and relationships, and their functions, are meant to be examples only, and are not meant to limit implementations of the techniques described and/or claimed in this document.

Computing device 5400 includes a processor 5402, memory 5404, a storage device 5406, a high-speed interface 5408 connecting to memory 5404 and high-speed expansion ports 5410, and a low speed interface 5412 connecting to low speed bus 5414 and storage device 5406. Each of the components 5402, 5404, 5406, 5408, 5410, and 5412, are interconnected using various busses, and may be mounted on a common motherboard or in other manners as appropriate. The processor 5402 can process instructions for execution within the computing device 5400, including instructions stored in the memory 5404 or on the storage device 5406 to display graphical information for a GUI on an external input/output device, such as display 5416 coupled to high speed interface 5408. In other implementations, multiple processors and/or multiple buses may be used, as appropriate, along with multiple memories and types of memory. Also, multiple computing devices 5400 may be connected, with each device providing portions of the necessary operations (e.g., as a server bank, a group of blade servers, or a multi-processor system).

The memory 5404 stores information within the computing device 5400. In one implementation, the memory 5404 is a volatile memory unit or units. In another implementation, the memory 5404 is a non-volatile memory unit or units. The memory 5404 may also be another form of computer-readable medium, such as a magnetic or optical disk.

The storage device 5406 is capable of providing mass storage for the computing device 5400. In one implementation, the storage device 5406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 5404, the storage device 5406, memory on processor 5402, or a propagated signal.

The high speed controller 5408 manages bandwidth-intensive operations for the computing device 5400, while the low speed controller 5412 manages lower bandwidth-intensive operations. Such allocation of functions is an example only. In one implementation, the high-speed controller 5408 is coupled to memory 5404, display 5416 (e.g., through a graphics processor or accelerator), and to high-speed expansion ports 5410, which may accept various expansion cards (not shown). In the implementation, low-speed controller 5412 is coupled to storage device 5406 and low-speed expansion port 5414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 5400 may be implemented in a number of different forms, as shown in the figure. For example, it may be implemented as a standard server 5420, or multiple times in a group of such servers. It may also be implemented as part of a rack server system 5424. In addition, it may be implemented in a personal computer such as a laptop computer 5422. Alternatively, components from computing device 5400 may be combined with other components in a mobile device (not shown), such as device 5450. Each of such devices may contain one or more of computing device 5400, 5450, and an entire system may be made up of multiple computing devices 5400, 5450 communicating with each other.

Computing device 5450 includes a processor 5452, memory 5464, an input/output device such as a display 5454, a communication interface 5466, and a transceiver 5468, among other components. The device 5450 may also be provided with a storage device, such as a microdrive or other device, to provide additional storage. Each of the components 5450, 5452, 5464, 5454, 5466, and 5468, are interconnected using various buses, and several of the components may be mounted on a common motherboard or in other manners as appropriate.

The processor 5452 can execute instructions within the computing device 5450, including instructions stored in the memory 5464. The processor may be implemented as a chipset of chips that include separate and multiple analog and digital processors. The processor may provide, for example, for coordination of the other components of the device 5450, such as control of user interfaces, applications run by device 5450, and wireless communication by device 5450.

Processor 5452 may communicate with a user through control interface 5458 and display interface 5456 coupled to a display 5454. The display 5454 may be, for example, a TFT LCD (Thin-Film-Transistor Liquid Crystal Display) or an OLED (Organic Light Emitting Diode) display, or other appropriate display technology. The display interface 5456 may comprise appropriate circuitry for driving the display 5454 to present graphical and other information to a user. The control interface 5458 may receive commands from a user and convert them for submission to the processor 5452. In addition, an external interface 5462 may be provide in communication with processor 5452, so as to enable near area communication of device 5450 with other devices. External interface 5462 may provide, for example, for wired communication in some implementations, or for wireless communication in other implementations, and multiple interfaces may also be used.

The memory 5464 stores information within the computing device 5450. The memory 5464 can be implemented as one or more of a computer-readable medium or media, a volatile memory unit or units, or a non-volatile memory unit or units. Expansion memory 5474 may also be provided and connected to device 5450 through expansion interface 5472, which may include, for example, a SIMM (Single In Line Memory Module) card interface. Such expansion memory 5474 may provide extra storage space for device 5450, or may also store applications or other information for device 5450. Specifically, expansion memory 5474 may include instructions to carry out or supplement the processes described above, and may include secure information also. Thus, for example, expansion memory 5474 may be provide as a security module for device 5450, and may be programmed with instructions that permit secure use of device 5450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 5464, expansion memory 5474, memory on processor 5452, or a propagated signal that may be received, for example, over transceiver 5468 or external interface 5462.

Device 5450 may communicate wirelessly through communication interface 5466, which may include digital signal processing circuitry where necessary. Communication interface 5466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 5468. In addition, short-range communication may occur, such as using a Bluetooth, WiFi, or other such transceiver (not shown). In addition, GPS (Global Positioning System) receiver module 5470 may provide additional navigation- and location-related wireless data to device 5450, which may be used as appropriate by applications running on device 5450.

Device 5450 may also communicate audibly using audio codec 5460, which may receive spoken information from a user and convert it to usable digital information. Audio codec 5460 may likewise generate audible sound for a user, such as through a speaker, e.g., in a handset of device 5450. Such sound may include sound from voice telephone calls, may include recorded sound (e.g., voice messages, music files, and so forth) and may also include sound generated by applications operating on device 5450.

The computing device 5450 may be implemented in a number of different forms, as shown in the figure. For example, it may be implemented as a cellular telephone 5480. It may also be implemented as part of a smartphone 5482, personal digital assistant, tablet computer, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well. For example, feedback provided to the user can be any form of sensory feedback (e.g., visual feedback, auditory feedback, or tactile feedback).

Input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Other implementations are also within the scope of the following claims.

What is claimed is:

1. A method comprising:
    receiving, at a computing device, information representative of a location and status of a streetlight included in a network of streetlights;
    identifying a plurality of streetlights from the network for inclusion in a group of streetlights, wherein the group of streetlights is identified to achieve a particular level of illumination in a surrounding ground area where the group of streetlights is located, wherein the particular level of illumination in the surrounding ground area is estimated based on geographic features of the surrounding ground area; and
    initiating delivery of one or more control signals to the group of streetlights.

2. The method of claim 1, wherein each streetlight in the group of streetlights is identified based on at least one of the location of the streetlight, a time of day, a time of year, and one or more geographic features of an area in which the streetlight is located.

3. The method of claim 1, further comprising receiving the geographic features as user-inputs.

4. The method of claim 1, wherein the group of streetlights is identified based on one or more parameters associated with the group, the parameters being selected from a set including: location of neighboring trees or buildings, lamp wattages, lamp life, and lamp light patterns.

5. The method of claim 1, wherein the one or more control signals are initiated based on user-defined conditional logic related to the received location and status information from one or more streetlights.

6. The method of claim 1, wherein each streetlight in the group is identified to also achieve a particular energy consumption level.

7. The method of claim 1, wherein the one or more control signals can be configured to activate the group of streetlights upon detecting motion in the area.

8. The method of claim 1, wherein the particular level of illumination is estimated based also on locations of one or more obstructions that prevent light from one or more streetlights in the plurality of streetlights from reaching the surrounding ground area.

9. The method of claim 1, wherein the geographic features include changes in elevations in the surrounding ground area.

10. A system comprising:
    memory; and
    one or more processors configured to:
        receive information representative of a location and status of a streetlight included in a network of streetlights;
        identify a plurality of streetlights from the network for inclusion in a group of streetlights, wherein the group of streetlights is identified to achieve a particular level of illumination in a surrounding ground area where the group of streetlights is located, wherein the particular level of illumination in the surrounding ground area is estimated based on geographic features of the surrounding ground area; and
        initiate delivery of one or more control signals to the group of streetlights.

11. The system of claim 10, wherein the one or more processors are configured to identify each streetlight in the group of streetlights based on at least one of the location of the streetlight, a time of day, a time of year, and one or more geographic features of an area in which the streetlight is located.

12. The system of claim 10, wherein the one or more processors are configured to identify the group of streetlights based on one or more parameters associated with the group, the parameters being selected from a set including: location of neighboring trees or buildings, lamp wattages, lamp life, and lamp light patterns.

13. The system of claim 10, wherein the one or more control signals are initiated based on user-defined conditional logic related to the received location and status information from one or more streetlights.

14. The system of claim 10, wherein the one or more processors are configured to identify each streetlight in the group to also achieve a particular energy consumption level.

15. The system of claim 10, wherein the one or more control signals can be configured to activate the group of streetlights upon detecting motion in the area.

16. The system of claim 10, wherein the one or more processors are configured to receive the geographic features as user-inputs.

17. The system of claim 10, wherein the particular level of illumination is estimated based also on locations of one or more obstructions that prevent light from one or more streetlights in the plurality of streetlights from reaching the surrounding ground area.

18. The system of claim 10, wherein the geographic features include changes in elevations in the surrounding ground area.

19. A computer-readable storage device storing software comprising instructions executable by one or more computing devices which, upon execution, causes the one or more computing devices to perform operations comprising:
    receiving information representative of a location and status of a streetlight included in a network of streetlights;
    identifying a plurality of streetlights from the network for inclusion in a group of streetlights, wherein the group of streetlights is identified to achieve a particular level of illumination in a surrounding ground area where the group of streetlights is located, wherein the particular level of illumination in the surrounding ground area is estimated based on geographic features of the surrounding ground area; and
    initiating delivery of one or more control signals to the group of streetlights.

20. The computer-readable storage device of claim 19, wherein the particular level of illumination is estimated based also on locations of one or more obstructions that prevent light from one or more streetlights in the plurality of streetlights from reaching the surrounding ground area.

\* \* \* \* \*